US012350993B2

(12) United States Patent
Vaughan et al.

(10) Patent No.: US 12,350,993 B2
(45) Date of Patent: *Jul. 8, 2025

(54) SYMMETRICALLY DYNAMIC EQUALIZED VOLUME AND PRESSURE AIR MANAGEMENT SYSTEM

(71) Applicant: BASE Air Management Limited, Sydney (AU)

(72) Inventors: Matthew Vaughan, Sydney (AU); David Bryan Lewis, Amelia Court House, VA (US); Joseph Calaway, Camden, MI (US); George Arrants, Richmond, VA (US)

(73) Assignee: BASE Air Management Limited, Sydney (AU)

( * ) Notice: Subject to any disclaimer, the term of this patent is extended or adjusted under 35 U.S.C. 154(b) by 0 days.

This patent is subject to a terminal disclaimer.

(21) Appl. No.: 18/512,997

(22) Filed: Nov. 17, 2023

(65) Prior Publication Data

US 2024/0083212 A1 Mar. 14, 2024

Related U.S. Application Data

(63) Continuation of application No. 17/817,386, filed on Aug. 4, 2022, now Pat. No. 11,858,307, which is a
(Continued)

(51) Int. Cl.
*B60G 17/015* (2006.01)
*B60G 17/016* (2006.01)
(Continued)

(52) U.S. Cl.
CPC ....... *B60G 21/067* (2013.01); *B60G 17/0155* (2013.01); *B60G 17/0162* (2013.01);
(Continued)

(58) Field of Classification Search
CPC .. B60G 21/067; B60G 21/005; B60G 21/026; B60G 17/0155; B60G 17/0525;
(Continued)

(56) References Cited

U.S. PATENT DOCUMENTS 2,111,169 A * 3/1938 Clark ............... F16K 11/072
137/625.29
2,361,575 A 10/1944 Thompson
(Continued)

FOREIGN PATENT DOCUMENTS

CN 1572550 A 2/2005
CN 101445028 A 6/2009
(Continued)

OTHER PUBLICATIONS

Examination Adverse Report issued Nov. 30, 2023 in Malaysian application PI2019007429, 3 pgs.
(Continued)

*Primary Examiner* — James A English
(74) *Attorney, Agent, or Firm* — Rothwell, Figg, Ernst and Manbeck, P.C.

(57) ABSTRACT

An air management system for a vehicle having a first pneumatic circuit and a second pneumatic circuit, in which the first and second pneumatic circuits are pneumatically connected in a neutral position via a cross-flow mechanism. The first pneumatic circuit is configured to independently adjust air pressure of a first side of the vehicle. The second pneumatic circuit is configured to independently adjust air pressure of a second side of the vehicle. The system is configured to establish pneumatic communication between the first and second pneumatic circuits when the air management system is not independently adjusting the adjust air pressure of the first side of the vehicle and the air pressure of the second side of the vehicle in the cross-flow mode.

20 Claims, 36 Drawing Sheets

Related U.S. Application Data continuation of application No. 17/134,937, filed on Dec. 28, 2020, now Pat. No. 11,465,462, which is a continuation of application No. 16/009,803, filed on Jun. 15, 2018, now Pat. No. 10,875,378.

(60) Provisional application No. 62/626,373, filed on Feb. 5, 2018, provisional application No. 62/573,587, filed on Oct. 17, 2017, provisional application No. 62/520,918, filed on Jun. 16, 2017.

(51) Int. Cl.
| | |
|---|---|
| *B60G 17/019* | (2006.01) |
| *B60G 17/052* | (2006.01) |
| *B60G 21/00* | (2006.01) |
| *B60G 21/02* | (2006.01) |
| *B60G 21/067* | (2006.01) |
| *B60G 21/10* | (2006.01) |
| *F16K 11/074* | (2006.01) |
| *B62D 65/12* | (2006.01) |

(52) U.S. Cl.
CPC ....... *B60G 17/019* (2013.01); *B60G 17/0525* (2013.01); *B60G 21/005* (2013.01); *B60G 21/026* (2013.01); *B60G 21/106* (2013.01); *F16K 11/074* (2013.01); *B60G 2202/1524* (2013.01); *B60G 2202/42* (2013.01); *B60G 2204/111* (2013.01); *B60G 2204/82* (2013.01); *B60G 2204/8304* (2013.01); *B60G 2400/05162* (2013.01); *B60G 2400/257* (2013.01); *B60G 2400/51222* (2013.01); *B60G 2500/202* (2013.01); *B60G 2500/2021* (2013.01); *B60G 2500/2046* (2013.01); *B60G 2500/30* (2013.01); *B60G 2800/012* (2013.01); *B60G 2800/914* (2013.01); *B62D 65/12* (2013.01)

(58) Field of Classification Search
CPC .... B60G 2500/2046; B60G 2500/2021; B60G 2500/202; B60G 2204/111; B60G 2204/82; B60G 2800/914; B60G 2400/51222

See application file for complete search history.

(56) References Cited

U.S. PATENT DOCUMENTS

| | | |
|---|---|---|
| 2,784,978 A | 3/1957 | Seale |
| 2,862,725 A | 12/1958 | Jackson |
| 2,950,124 A | 8/1960 | Pribonic |
| 2,962,296 A | 11/1960 | Jackson |
| 2,986,404 A | 5/1961 | Chuba et al. |
| 3,022,749 A | 2/1962 | Voertman et al. |
| 3,061,330 A | 10/1962 | Alfieri |
| 3,104,114 A | 9/1963 | Vogel |
| 4,586,728 A | 5/1986 | Tokunaga et al. |
| 4,787,644 A | 11/1988 | Yokote |
| 4,798,369 A | 1/1989 | Geno et al. |
| 5,087,072 A | 2/1992 | Kawarasaki |
| 5,193,849 A | 3/1993 | Holzmann |
| 5,465,209 A | 11/1995 | Sammut et al. |
| 6,036,179 A | 3/2000 | Rensel |
| 6,089,551 A | 7/2000 | Haviland et al. |
| 6,250,659 B1 | 6/2001 | Morris |
| 6,412,790 B2 | 7/2002 | Mckenzie et al. |
| 6,669,216 B1 | 12/2003 | Elser et al. |
| 6,799,768 B2 | 10/2004 | Jin |
| 6,811,171 B2 | 11/2004 | Sakai |
| 6,945,275 B2 * | 9/2005 | Krechmery ........... B60R 21/239 137/625.21 |
| 6,983,201 B2 | 1/2006 | Misawa |
| 7,420,462 B2 | 9/2008 | Nordmeyer |
| 7,621,538 B2 | 11/2009 | Nordmeyer et al. |
| 7,938,418 B1 | 5/2011 | Coombs et al. |
| 7,946,599 B2 | 5/2011 | Lloyd |
| 7,950,674 B2 | 5/2011 | Honig et al. |
| 8,047,551 B2 | 11/2011 | Morris et al. |
| 8,172,237 B2 | 5/2012 | Peterson |
| 8,413,977 B2 | 4/2013 | Coombs et al. |
| 8,434,773 B2 | 5/2013 | Morris et al. |
| 8,868,294 B2 | 10/2014 | Gambrall |
| 8,905,071 B2 | 12/2014 | Coombs et al. |
| 8,936,043 B2 | 1/2015 | Costin et al. |
| 8,973,922 B2 | 3/2015 | Koelzer |
| 9,168,807 B2 | 10/2015 | Lloyd |
| 9,211,776 B2 | 12/2015 | May |
| 9,272,599 B1 | 3/2016 | Cook, Jr. et al. |
| 9,283,959 B2 | 3/2016 | Nakatsu |
| 9,302,731 B2 | 4/2016 | Mochizuki |
| 9,358,855 B2 | 6/2016 | Gomann et al. |
| 9,428,022 B2 | 8/2016 | Coombs et al. |
| 9,440,506 B2 | 9/2016 | Coombs et al. |
| 9,452,655 B2 | 9/2016 | Hiebert et al. |
| 9,616,726 B2 | 4/2017 | Harla et al. |
| 9,879,745 B2 | 1/2018 | Prams |
| 9,975,392 B2 | 5/2018 | Ahmadian |
| 10,040,331 B2 | 8/2018 | Gandhi |
| 10,093,145 B1 * | 10/2018 | Vaughan ............ B60G 17/0155 |
| 10,179,496 B1 | 1/2019 | Vaughan |
| 10,479,159 B2 * | 11/2019 | Gandhi ................ F16K 11/074 |
| 10,875,378 B2 | 12/2020 | Vaughan et al. |
| 2001/0015538 A1 | 8/2001 | Schoop |
| 2003/0067103 A1 | 4/2003 | Easter |
| 2003/0075883 A1 * | 4/2003 | Jin ......... B60G 11/27 280/5.508 |
| 2004/0245732 A1 | 12/2004 | Kotulla |
| 2007/0052141 A1 | 3/2007 | Li |
| 2007/0073461 A1 | 3/2007 | Fielder |
| 2007/0200304 A1 | 8/2007 | Brookes |
| 2008/0054537 A1 | 3/2008 | Harrison |
| 2009/0194179 A1 * | 8/2009 | Morris ............... B60G 17/0525 137/625.11 |
| 2011/0187070 A1 | 8/2011 | Hammond |
| 2012/0227662 A1 | 9/2012 | Coombs |
| 2015/0251515 A1 | 9/2015 | Joachim |
| 2016/0167473 A1 | 6/2016 | Coombs et al. |
| 2016/0185179 A1 | 6/2016 | May |
| 2017/0106710 A1 | 4/2017 | Giuliani |
| 2017/0361672 A1 * | 12/2017 | Ahmadian ........... B60G 17/019 |
| 2017/0361673 A1 * | 12/2017 | Ahmadian ............. B60G 11/27 |
| 2017/0361674 A1 * | 12/2017 | Ahmadian ........... B60G 17/052 |
| 2018/0147905 A1 | 5/2018 | MacNamara |

FOREIGN PATENT DOCUMENTS

| | | |
|---|---|---|
| CN | 103419590 A | 12/2013 |
| CN | 104105609 A | 10/2014 |
| CN | 107933234 A | 4/2018 |
| CN | 107953736 A | 4/2018 |
| EP | 0779168 A2 | 6/1997 |
| JP | 55-9746 S | 1/1980 |
| TW | 201446560 A | 12/2014 |
| TW | 201446560 B | 12/2014 |
| WO | 03/029687 A1 | 4/2003 |
| WO | 2013000014 A1 | 1/2013 |

OTHER PUBLICATIONS

Notice of Acceptance for corresponding Australia patent application No. 2019210591 dated Apr. 6, 2021, 3 pages.

Communication pursuant to Article 94(3) EPC issued in EP Application No. 18 738 122.3-1009 dated May 18, 2022, 6 pages.

Translation of Notice of Reasons for Refusal cited in Japanese Application No. 2020-519009 dated Aug. 31, 2021, 10 pages.

Decision to Grant a Patent issued in Japanese Application No. 2020-521450 mailed Apr. 26, 2022, 6 pages.

Office Action issued in Taiwan Patent Application No. 107120694 dated Apr. 11, 2022, 19 pages.

Notification of Transmittal of the InternationalSearch Report and

(56) References Cited

OTHER PUBLICATIONS the Written Opinion of the International Search Authority, dated Oct. 1, 2018, 14 pages.
Examination Report No. 1 cited in Australian Application No. 20182717242 dated Oct. 5, 2018, 9 pages.
Patent Examination Report issued in New Zealand Patent Application No. 774449 dated Jan. 16, 2024 (7 pages).

* cited by examiner

900

---

Adjust independently the air pressure of a first pneumatic circuit by a first leveling valve — 910

↓

Adjust independently the air pressure of a second pneumatic circuit by a second leveling valve — 920

↓

Establish pneumatic communication between the first and second pneumatic circuits when both the first and second leveling valves are in a neutral mode — 930

FIG. 44

SYMMETRICALLY DYNAMIC EQUALIZED VOLUME AND PRESSURE AIR MANAGEMENT SYSTEM

CROSS REFERENCE TO RELATED APPLICATIONS

This application is a continuation of U.S. Ser. No. 17/817,386 filed Aug. 4, 2022, which is a continuation of U.S. Ser. No. 17/134,937 filed Dec. 28, 2020, now U.S. Pat. No. 11,465,462 issued Oct. 11, 2022, which is a continuation of U.S. Ser. No. 16/009,803, filed Jun. 15, 2018, now U.S. Pat. No. 10,875,378 issued Dec. 29, 2020, which claims the benefit of provisional patent application Ser. No. 62/520,918 filed Jun. 16, 2017, provisional patent application Ser. No. 62/573,587 filed Oct. 17, 2017, and provisional patent application Ser. No. 62/626,373 filed Feb. 5, 2018, the disclosures of which are incorporated herein by reference in their entireties.

FIELD OF THE DISCLOSURE

This disclosure relates to improvements in air management systems for vehicles, trailers, and towables of any type, including load carrying prime mover and trailer vehicles having one or more axles supported by air springs.

BACKGROUND

Air suspension systems for vehicles have a plurality of air suspension bags supporting one or more vehicle axles in pairs on either side of each axle. In one well-known vehicle, the pairs of air springs are connected by a common large diameter air lines extending between correspondingly positioned air springs on adjacent axles. The common air lines are each connected by an air line to a height control valve directed to a respective side of a vehicle. The height control valve controls the air supply to the common air lines to adjust the inflation of the air springs to ensure that the vehicle is kept level as it is driven over variable road conditions. Unless defined otherwise, the term "height control valve" is used as equivalent to the term "leveling valve," such that the terms "height control valve" and "leveling valve" may be used inter-changeably.

For example, when a vehicle negotiates a turn, the vehicle's center of gravity shifts along its width away from the turn. Due to the weight shift, the air springs on the side of the vehicle facing away from the turn start to contract, while the air springs on the side of the vehicle facing the turn start to extend. Consequently, the vehicle becomes unleveled from side-to-side. In response, one of the leveling valves on the lowered side of the vehicle supplies air to the contracted air springs, while the other leveling valve on the elevated side of the vehicle removes air from the extended air springs to keep the vehicle level. Through testing, it has now been found that leveling valves often overcompensate in responding to dynamic weight shifts of the vehicle, in which the air springs that were supplied air from the leveling valve tend to have a greater air pressure than the air springs that were purged by the leveling valve. As a result, a pressure difference persists between the two sides of the air suspensions system ever after the leveling valves attempt to level the vehicle. Even though a pressure differential remains between the air springs on opposite sides of the vehicle, the leveling valves return to a neutral mode (e.g., the rotary disk is set within a dead band range), in which there is a lack of pneumatic communication between the air springs on opposite sides of the vehicle. Due to this pressure differential between the air springs, the vehicle remains unlevel even after the leveling valves have adjusted the pressure of the air springs in response to the vehicle weight shift.

Other types of air suspension systems have replaced mechanical leveling valves with electronic-actuated valves to the control the height of the air bags. While some electronic-actuated valves have been designed to respond to vehicle weight shifts or vehicle rolling, electronic-actuated valves fail to account for pressure differentials between the air springs that persist after the heights of the air springs have been adjusted in response to vehicle weight shifts.

Accordingly, the present inventors have recognized that there is a need for an air management system that solves the problem of persistent pressure imbalance so that the vehicle may be restored to equilibrium air pressure, level and ride height.

SUMMARY

The present invention provides for an enhanced pneumatic suspension system for a vehicle in which the air management system includes a first pneumatic circuit, a second pneumatic circuit, and a cross-flow mechanism pneumatically connecting the first pneumatic circuit with the second pneumatic circuit. The first pneumatic circuit includes a first leveling valve configured to adjust independently the height of a first side of the vehicle. The second pneumatic circuit includes a second leveling valve configured to adjust independently the height of a second side of the vehicle. The first and second leveling valves are configured to establish pneumatic communication between the first and second pneumatic circuits when the first leveling valve is not independently adjusting the height of the first side of the vehicle and the second leveling valve is not independently adjusting the height of the second side of the vehicle. According to the various examples of the air management systems described herein, all air management systems are amenable to modification such that each air management system may be utilized under mechanical or electronic operations (e.g., an actuator for a leveling valve may be switched from a mechanical mechanism to an electronic component).

The first pneumatic circuit includes a first set of air springs disposed on a first side of the vehicle, a first supply tank, a first plurality of air lines pneumatically connecting the first set of air springs with the first leveling valve, and a first supply line pneumatically connecting the first leveling valve with the first supply tank. The second pneumatic circuit includes a second set of air springs disposed on a second side of the vehicle, a second supply tank, a second plurality of air lines pneumatically connecting the second set of air springs with the second leveling valve, and a second supply line pneumatically connecting the second leveling valve with the second supply tank. The cross-flow connections extend from the first leveling valve to the second leveling valve. In another example, the first and second pneumatic circuits may be supplied air by a common air supply tank such that the air management system only includes only one air supply tank to provide air flow to air springs on both sides of the vehicle. In one example, the first plurality of air lines and the second plurality of air lines may be of substantially the same diameter and length, and the first supply line and the second supply line may be of substantially the same diameter and length.

In one configuration, each leveling valve may include a housing and a control arm pivotably connected to the leveling valve, in which the control arm is configured to pivot between a neutral position and one or more response positions in response to compression or extension of the air springs. The first and second leveling valves may be configured to establish pneumatic communication between the first and second pneumatic circuits when the control arm of both the first and second level valves are set in the neutral position. The first and second leveling valves may be configured to prevent pneumatic communication between the first and second pneumatic circuits when the control arm of one of the first and second leveling valves is set to the one or more response positions. The first and second leveling valves may include a control arm sensor configured to detect the position of the control arm. The air management system may include a control unit in electrical communication with each control arm sensor. Each control arm sensor may be configured to transmit the position of the control arm as a control arm position input to the control unit. The control unit may be configured to determine a vehicle height relative to the axle at the first and second sides of the vehicle based on the control arm position input.

In one example, the first and second leveling valves may each be a rotary valve comprising a housing body and a rotary disk configured to rotate within the housing body to alter communication between the between the first and second pneumatic circuits. Each housing body may comprise a supply port configured to receive air from an air source, an exhaust port configured to exhaust air into an atmosphere, one or more spring ports configured to receive or supply air to one of the first or second pneumatic circuits, and a cross-flow port configured to receive or supply air to one of the first or second leveling valves. In one configuration, the rotary disk may be configured to establish communication between the one or more spring ports and the cross-flow port while neither establishing communication between the one or more spring ports and the supply port nor the one or more spring ports and the exhaust port. In one configuration, the first and second leveling valves may each comprise a control arm pivotably connected to the housing body and configured to rotate about the valve in response to a height change by one of the first or second pneumatic circuits. In one configuration, rotation of the control arm may induce the rotary disk to rotate between a plurality of angular positions to alter communication between the supply port, the exhaust port, the one or more spring ports, and the cross-flow port.

In one example, the first and second leveling valves may each include a manifold housing, a valve element disposed in a bore of the manifold housing, and an electronic actuator. The valve element may be configured to move in the bore of the manifold housing to one or more positions including at least a neutral position to establish pneumatic communication between the first and second pneumatic circuits and a supply position to supply air to a respective pneumatic circuit from an air supply tank, and an exhaust position to remove air from the respective pneumatic circuit into the atmosphere. The electronic actuator is configured to trigger movement of the plunger between the one or more positions. The valve element may be selected from the group consisting of a plunger, a rotary disk, and a poppet. The electronic actuator is, e.g., a solenoid, a servomotor, and a stepper motor.

In one example, the air management system may include a control module in electrical communication with the electronic actuator of each leveling valve. The control module may be configured to transmit a command to each electronic actuator to trigger movement of the valve element between the neutral, supply, and exhaust positions. The air management system may include one or more leveling sensors. Each leveling sensor may be configured to detect a vehicle height relative to the axle along a position of the vehicle and transmit the detected vehicle height to the control module as a vehicle leveling input. The control module may be configured to determine a vehicle height relative to the axle at the first and second sides of the vehicle based on the vehicle leveling input.

In one configuration each leveling valve may include a cylindrical-shaped manifold, a valve member disposed in the manifold and in sliding engagement with an interior surface of the manifold, and an electronic actuator operatively linked to the valve member. The manifold may comprise a plurality of openings disposed along a side surface of the manifold. The electronic actuator may be configured to actuate the valve member to slide along the longitudinal axis of the manifold to control the exposure of the plurality of openings such that a respective leveling valve is configured to selectively: (i) supply air to a respective pneumatic circuit, (ii) remove air from a respective pneumatic circuit, or (iii) establish cross-flow between the first and second pneumatic circuits.

The present invention includes a leveling valve. The leveling valve may comprise an upper housing mounted on a lower housing to form a valve body, in which the valve body defines a chamber extending between the upper housing and the lower housing. The lower housing may include a plurality of ports communicating with the chamber, in which the plurality of ports include a supply port, an exhaust port, one or more spring ports, and a cross-flow port. In one configuration, the lower housing may further comprise a dump port, wherein the cross-flow port is disposed on a first end of the lower housing and the dump port is disposed on a second end of the lower housing opposite to the first end. In one configuration, the supply port may be disposed on a first side of the lower housing, and the exhaust port may be disposed on a second side of the lower housing opposite to the first side of the lower housing. In one configuration, the cross-flow port may be disposed on a first end of the lower housing, and the first end may extend between the first and second sides of the lower housing. In one configuration, the one or more spring ports may comprise a first spring port located on one of the first side or the second side of the lower housing. The leveling valve may include a control arm having a first end attached to a shaft extending through an upper surface of the upper housing, in which the control arm is configured to rotate about the valve body in response to extension or compression of the vehicle suspension. The leveling valve may include a rotary disk positioned in the chamber of the valve body and connected to the control arm by the shaft extending through the upper housing, in which the rotary disk is configured to rotate about the supporting element within the chamber of the valve body. The rotary disk may be configured to establish pneumatic communication between the one or more spring ports and the cross-flow port while neither establishing pneumatic communication between the one or more spring ports and the supply port nor the one or more spring ports and the exhaust port.

The present invention may include a method for controlling stability of a vehicle. The method may comprise the step of providing an air management system comprising a first pneumatic circuit and a second pneumatic circuit. The first pneumatic circuit may include a first leveling valve configured to adjust independently the height of a first side of the vehicle. The second pneumatic circuit may include a second leveling valve configured to adjust independently the height of a second side of the vehicle. The air management system may include a cross-flow line connecting the first leveling valve with the second leveling valve. The method may comprise the step of establishing, by the first and second leveling valves, pneumatic communication between the first and second pneumatic circuits when the first leveling valve is not independently adjusting the height of the first side of the vehicle and the second leveling valve is not independently adjusting the height of the second side of the vehicle.

The present invention may include a method for adjusting air pressure of an air management system of a vehicle comprising one or more air supply tanks, a first pneumatic circuit disposed on a first side of the vehicle, and a second pneumatic circuit disposed on a second side of the vehicle. The method may comprise a step of adjusting independently the air pressure of the first pneumatic circuit by a first leveling valve such that the first leveling valve is either supplying air from the one or more air supply tanks to the first pneumatic circuit or removing air from the first pneumatic circuit to the atmosphere. The method may comprise the step of adjusting independently the air pressure of the second pneumatic circuit by a second leveling valve such that the second leveling valve is either supplying air from the one or more air supply tanks to the second pneumatic circuit or removing air from the second pneumatic circuit to the atmosphere. The method may comprise the step of establishing pneumatic communication between the first pneumatic circuit and the second pneumatic circuit only when both the first leveling valve and the second leveling valve are set in a neutral mode such that each leveling valve is neither supplying air from the one or more air supply tanks or removing air into the atmosphere.

The present invention may include a control unit associated with an air spring of an air management system for a vehicle. The control unit may comprise a housing configured to be mounted to a top plate of the air spring, wherein the housing comprises a valve chamber. The control unit may comprise a valve disposed in the valve chamber. The valve may be configured to switch between a plurality of modes including: (i) an active mode wherein the valve is adjusting independently a height of the associated air spring, and (ii) a neutral mode wherein the valve is establishing pneumatic communication between the associated air spring and a cross-flow line connected to a second air spring of the air management system when the valve is not in the active mode. The control unit may comprise one or more sensors configured to monitor at least one condition of the air spring and generate a measurement signal indicating the at least one condition of the air spring. The control unit may comprise a communication interface configured to transmit and receive data signals to and from a second control unit associated with the second air spring of the air management system. The control unit may comprise a processing module operatively linked to the valve, the one or more sensors, and the communication interface, wherein the processing module is configured to: (i) receive measurement signals from the one or more sensors and data signals from the communication interface, and (ii) actuate the valve to switch between the active mode and the neutral mode based on the received measurement signals from the one or more sensors and the data signals from the communication interface.

The present invention may include an air management system for a vehicle. The air management system may comprise a first pneumatic circuit having one or more air springs disposed at a first side of a vehicle. The air management system may comprise a second pneumatic circuit having one or more air springs disposed on a second side of a vehicle. The air management system may comprise one or more cross-flow lines, wherein each cross-flow line extends from an air spring associated with the first pneumatic circuit to an air spring associated with the second pneumatic circuit. Each air spring may comprise a control unit. Each control unit may comprise a housing configured to be mounted to a top plate of an associated air spring, wherein the housing comprises a valve chamber. Each control unit may comprise a valve disposed in the valve chamber, wherein the valve is configured to switch between a plurality of modes including: (i) an active mode wherein the valve is adjusting independently a height of the associated air spring, and (ii) a neutral mode wherein the valve is establishing pneumatic communication between the associated air spring and a respective cross-flow line when the valve is not in the active mode. Each control unit may comprise one or more sensors configured to monitor at least one condition of the associated air spring and generate a measurement signal indicating the at least one condition of the associated air spring. Each control unit may comprise a communication interface configured to directly transmit and receive data signals to and from other control units associated with other air springs of the air management system. Each control unit may comprise a processing module operatively linked to the valve, the one or more sensors, and the communication interface, wherein the processing module is configured to: (i) receive measurement signals from the one or more sensors and data signals from the communication interface, and (ii) actuate the valve to switch between the active mode and the neutral mode based on the received measurement signals from the one or more sensors and the data signals from the communication interface.

The present invention may include a method for controlling the stability of a vehicle comprising an air management system, in which the air management system may comprise a first pneumatic circuit having one or more air springs disposed at a first side of a vehicle, a second pneumatic circuit having one or more air springs disposed on a second side of a vehicle, and one or more cross-flow lines, in which each cross-flow line extends from an air spring associated with the first pneumatic circuit to an air spring associated with the second pneumatic circuit. The method may comprise the step of monitoring, by a height sensor and an air pressure sensor, a height and an air pressure of a respective air spring. The method may comprise the step of generating, by the height sensor and the air pressure sensor, a signal indicating the height and the air pressure of the respective air spring. The method may comprise the step of receiving, by a processing module, the signal indicating the height and the air pressure of the respective air spring. The method may comprise the step of calculating, by the processing module, a height differential rate and pressure differential rate of the respective air spring based on the received signal indicating the height of the respective air spring. The method may comprise the step of determining, by the processing module, whether to adjust the height of the air spring independently or establish pneumatic communication between the air spring and a respective cross-flow line. The method may comprise the step of actuating, by the processing module, a valve to switch to one of the modes: (i) an active mode wherein the valve is adjusting independently a height of the associated air spring, and (ii) a neutral mode wherein the valve is establishing pneumatic communication between the associated air spring and a respective cross-flow line when the valve is not in the active mode. In one configuration, the height sensor, processing module, and the valve are disposed in a chamber of the air spring.

According to the various examples of the air management systems described herein, all air management systems include at least two independent pneumatic circuits, in which each independent pneumatic circuit is configured to adjust independently the height of one side of vehicle in response to dynamic vehicle weight shifts. In a state of adjusting independently the height of one side of the vehicle, the respective pneumatic circuit is not in pneumatic communication with the other pneumatic circuit disposed on the opposite of the vehicle such that the air springs on one side of the vehicle are not in pneumatic communication with air springs disposed on the opposite side of the vehicle. According to the various examples of the air management systems described herein, all air management systems may selectively establish cross-flow between the two independent circuits so that the air springs disposed on one side of the vehicle are in pneumatic communication with the air springs disposed on the other side of the vehicle when all the leveling valves are set in a neutral position or neutral mode. In the present context, the leveling valve is set in a neutral position or neutral mode when leveling valve is neither supplying air from the air supply tank to the air springs nor purging air from the air springs to the atmosphere (e.g., the rotary disk is set within a dead band range).

Other features and characteristics of the subject matter of this disclosure, as well as the methods of operation, functions of related elements of structure and the combination of parts, and economies of manufacture, will become more apparent upon consideration of the following description and the appended claims with reference to the accompanying drawings, all of which form a part of this specification, wherein like reference numerals designate corresponding parts in the various figures.

BRIEF DESCRIPTION OF THE DRAWINGS

The accompanying drawings, which are incorporated herein and form part of the specification, illustrate various embodiments of the subject matter of this disclosure. In the drawings, like reference numbers indicate identical or functionally similar elements.

FIG. 44 is a flow chart illustrating a method for adjusting air pressure of an air management system comprising first and second pneumatic circuits according to the present invention.

DETAILED DESCRIPTION

Figure 1A:
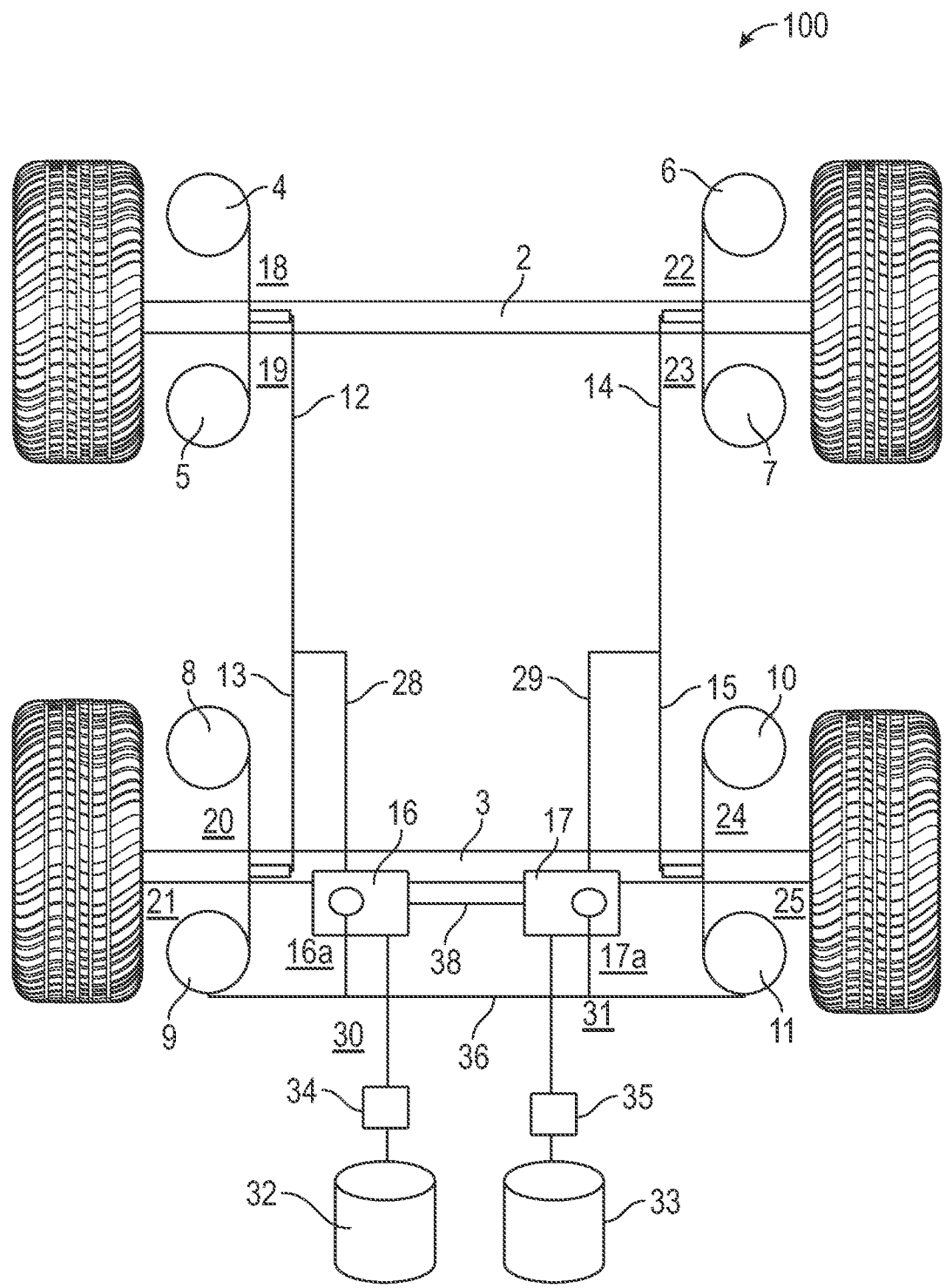
FIG. 1A is a schematic view of an air management system according to one configuration of the present invention.

While aspects of the subject matter of the present disclosure may be embodied in a variety of forms, the following description and accompanying drawings are merely intended to disclose some of these forms as specific examples of the subject matter. Accordingly, the subject matter of this disclosure is not intended to be limited to the forms or embodiments so described and illustrated.

The present disclosure includes an air management system for a vehicle having a first pneumatic circuit having a first leveling valve configured to adjust independently the height of a first side of the vehicle, a second pneumatic circuit having a second leveling valve configured to adjust independently the height of a second side of the vehicle, and a cross-flow mechanism connecting the first leveling valve with the second leveling valve. The first and second leveling valves establish pneumatic communication between the first and second pneumatic circuits when the first leveling valve is not independently adjusting the height of the first side of the vehicle and the second leveling valve is not independently adjusting the height of the second side of the vehicle, e.g., when the ride height control arms on both sides of the vehicle are in a neutral position or when an electronic-actuated valve is set in a neutral mode. The first and second leveling valves are configured to be set to the neutral position or neutral mode under all driving conditions including when the vehicle is traveling at a velocity substantially above zero miles-per-hour.

As used herein, the terms "neutral position" and "neutral mode" are defined as the state in which neither leveling valve is supplying air from the air supply tank to the air springs or removing air from the air springs to the atmosphere, and each of the leveling valves are in pneumatic communication with each other.

As used herein, the term "active mode" is defined as the state in which the valve is independently adjusting the height or air pressure of one or more air springs in one pneumatic circuit while the valve is not in pneumatic communication with any components of another pneumatic circuit.

As used herein, a "cross-flow mechanism" or "cross-flow system" includes any components necessary to establish pneumatic communication between a first pneumatic circuit and a second pneumatic circuit, wherein the first and second pneumatic circuits are provided on opposite sides of a vehicle, i.e., left and right sides. The cross-flow mechanism or cross-flow system may include a cross-flow air line connecting a first leveling valve and a second leveling valve connected to a cross-flow port on each leveling valve, in which the cross-flow air line is not directly connected to a supply tank or a supply line connected to the supply tank. The cross-flow mechanism or cross-flow system may also include a cross-flow controller device connected to each of the first leveling valve and the second leveling valve. The cross-flow mechanism or cross-flow system may also include electrical sensors, e.g., air pressure sensors 631, air flow sensors 632, ride height sensors, stability control sensors.

As used herein, the "response position" is defined as the state in which one or more leveling valves on each side of the vehicle are adjusting the air pressure of air springs independently in the pneumatic circuits.

As used herein, "dead band" refers to range of rotation in which a disk surface of a rotary disk completely overlies the reservoir cavity of the lower housing such that the leveling valve is neither supplying air from the air supply tank to the air springs or removing air from the air springs to the atmosphere.

In one example, each leveling valve includes a housing, a valve element disposed in a bore of the housing, and a control arm pivotably connected to the housing such that it pivots from a neutral position to one or more response positions to induce rotation or movement of the valve element. In another example, each leveling valve includes a housing and a ride height sensor electrically connected thereto instead of a control arm. In another example, each leveling valve includes a housing, a valve element disposed in a bore of the housing, a control arm pivotably connected to the housing to induce movement or rotation of the valve element, and a sensor disposed in the housing to detect movement of the control arm. In another example, each leveling valve may include a housing, a valve element, and a motor (e.g., stepper motor) to induce rotation or movement of the valve element. The valve element may be selected from the group consisting of a plunger, a rotary disk, and a poppet.

In one example, the first and second leveling valves establish pneumatic communication between the first and second pneumatic circuits when the control arm of both the first and second level valves are set in the neutral position, and the first and second leveling valves are configured to prevent pneumatic communication between the first and second pneumatic circuits when the control arm of one of the first and second leveling valves is set to the one or more response positions.

In one example, the first pneumatic circuit includes a first set of air springs disposed on a first side of the vehicle, a first supply tank, a first plurality of air lines pneumatically connecting the first set of air springs with the first leveling valve, and a first supply line pneumatically connecting the first leveling valve with the first supply tank; and the second pneumatic circuit includes a second set of air springs disposed on a second side of the vehicle, a second supply tank, a second plurality of air lines pneumatically connecting the second set of air springs with the second leveling valve, and a second supply line pneumatically connecting the second leveling valve with the second supply tank. In another example, the first and second pneumatic circuits may be supplied air by a common air supply tank such that the air management system only includes only one air supply tank to provide air flow to air springs on both sides of the vehicle.

In one example, the air lines are provided to supply equal volumes of air to maintain symmetry within the pneumatic circuits on both sides of the vehicle. The air lines are of substantially the same (e.g., within ±10% or ±5% or ±2% or ±1%) or equal diameter and/or length. The supply lines are of substantially the same (e.g., within ±10% or ±5% or ±2% or ±1%) or equal diameter and/or length.

Figure 1B:
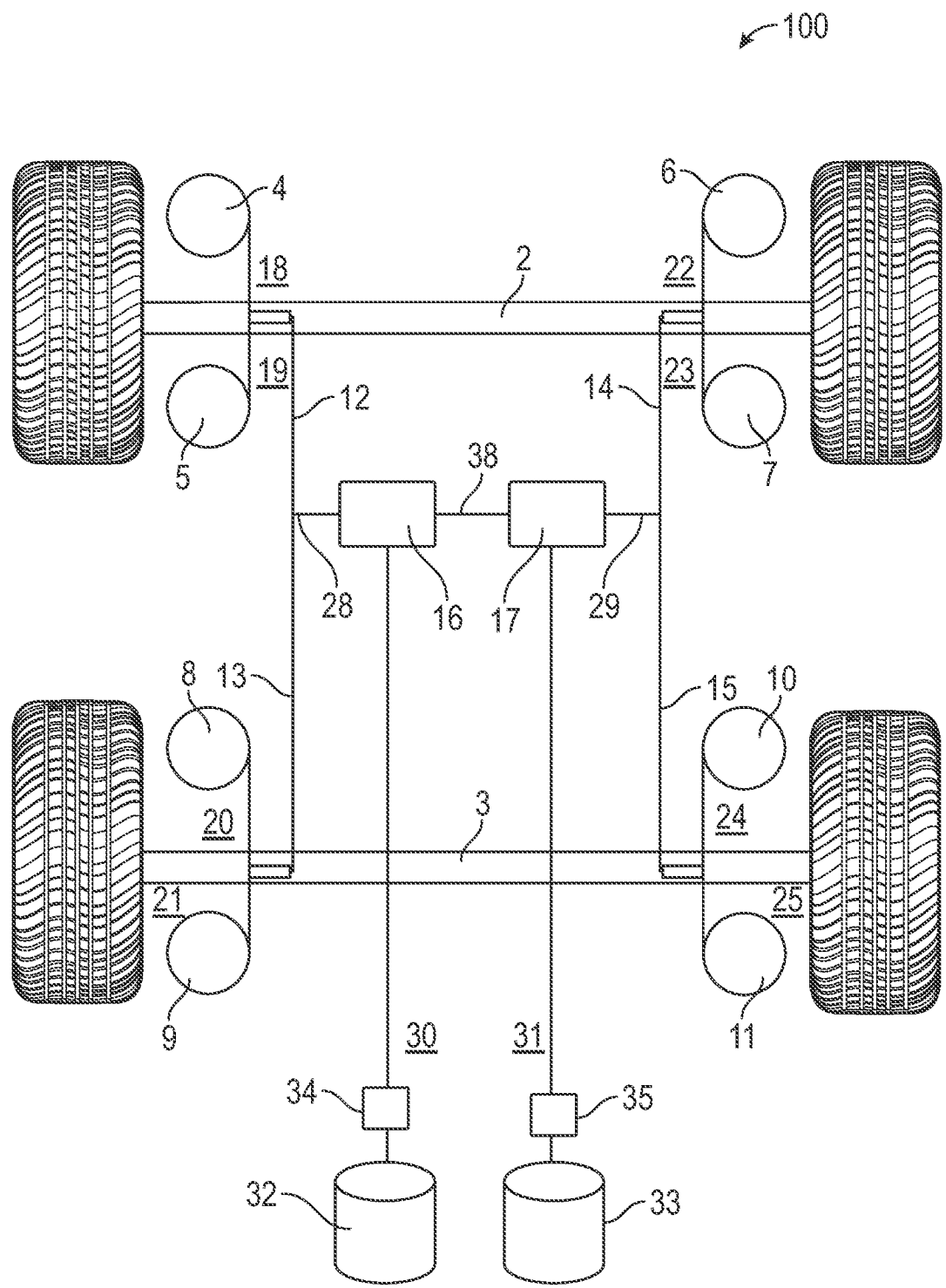
FIG. 1B is a schematic view of an air management system comprising leveling valves disposed at a central portion of a vehicle according to one configuration of the present invention.
Figure 1C:
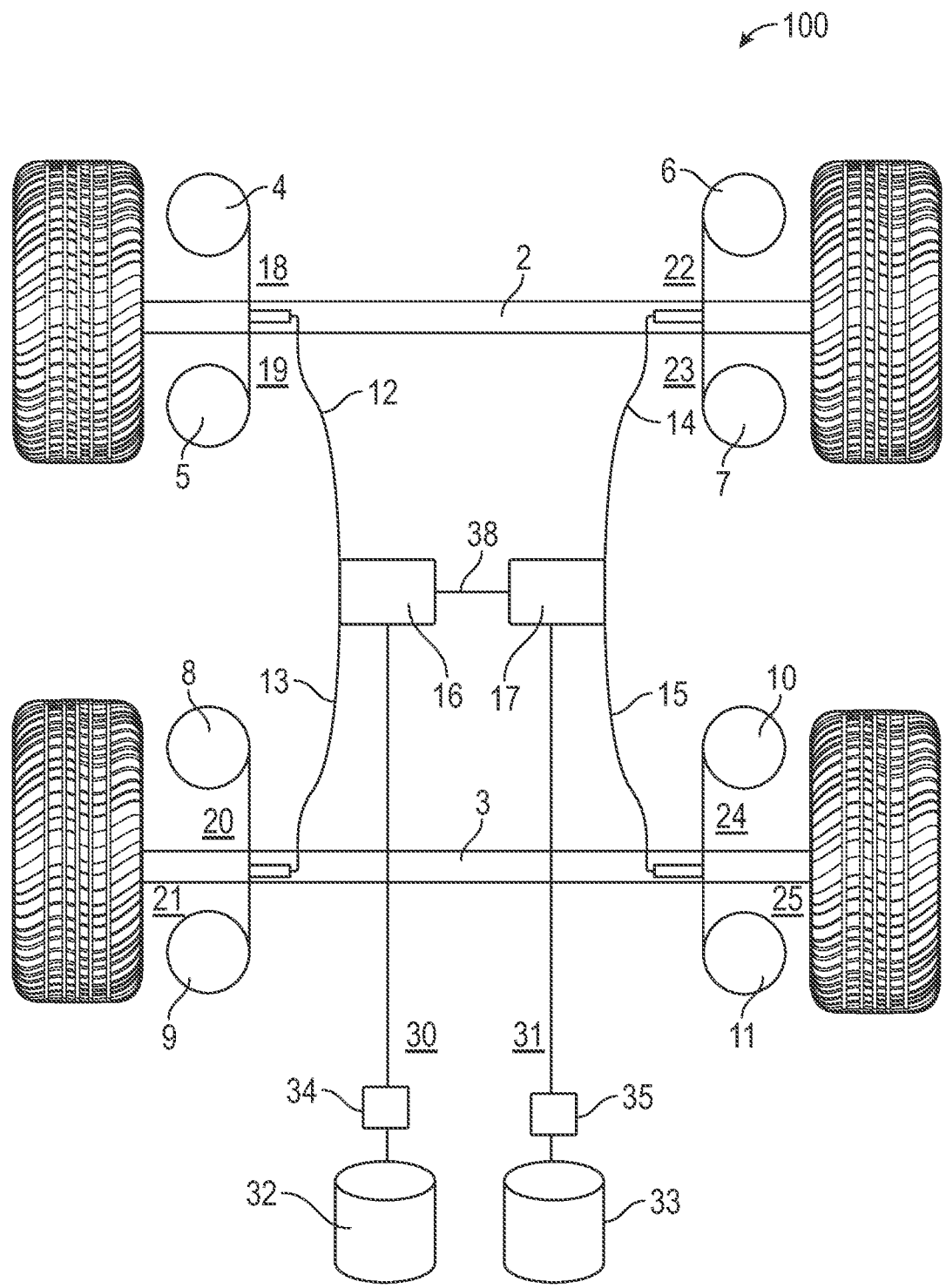
FIG. 1C is a schematic view of an air management system comprising leveling valves, in which each leveling valve has a plurality of air bag ports, according to one configuration of the present invention.

FIGS. 1A-C show configurations of air management systems for a vehicle as disclosed herein, indicated by reference number 100. The air management assembly 100 includes a first pneumatic circuit disposed on a first side of a vehicle 1, a second pneumatic circuit disposed on a second side of the vehicle 1, and a cross-flow line 38 pneumatically connecting the first and second pneumatic circuits. The vehicle 1 can have front and rear driven and/or non-driven wheeled axles 2 and 3, which are supported in a known manner on the chassis 1 by pairs of air bags (also referred to interchangeably as air springs) 4 and 5, 6 and 7, 8 and 9 and 10 and 11, positioned as illustrated on either side of the axles 2 and 3. The present invention is not limited to having the particular number of axle(s), air bags (air springs), air lines/hoses, air supply tank(s) that are shown in the drawings, as these elements vary depending on the type of vehicle that is used as would be immediately clear to a person skilled in the art. In another example, the first and second pneumatic circuits may be supplied air by a common air supply tank such that the air management system 100 only includes only one air supply tank to provide air flow to air springs 4-11 on both sides of the vehicle 1.

In FIGS. 1A-C, air springs 4, 5, 8, and 9 are positioned on the first side of the vehicle 1 and connected together by separate air lines 12, 13, and 18-21 to form a first set of air springs. Air springs 4, 5, 8 and 9 and separate air lines 12, 13, and 18-21 are supplied air by a valve hose 28, which is connected to a first leveling valve 16. A supply hose 30 extends directly from the first leveling valve 16 to a first supply tank 32 for supplying air to the first leveling valve 16. The supply hose 30 is also provided with a pressure protection valve 34. Accordingly, air springs 4, 5, 8, and 9, separate air lines 12, 13, and 18-21, valve hose 28, first leveling valve 16, supply hose 30, pressure protection valve 34 (not required in some vehicles or air management systems), and the first supply tank 32 form the first pneumatic circuit adapted for adjusting independently the height of the first side of the vehicle 1.

In some embodiments (not shown), the air management assembly 100 may comprise a single air supply tank to deliver air simultaneously to both the first and second pneumatic circuits and a single pressure protection valve connected to the air supply tank by a single hose and connected to the first and second pneumatic circuits through two supply hoses. The single pressure protection valve is configured to supply sufficient air pressure to both the first and second pneumatic circuits in the event of a leak or failure within the air management system 100. The single pressure protection valve is configured to have a larger air capacity to the dual pressure protection valves 34 in order to provide sufficient air to both the first and second pneumatic circuits simultaneously.

Air springs 6, 7, 10, and 11 are positioned on a second side of the vehicle 1 and connected together by separate air lines 14, 15, and 22-25 to form a second set of air springs. Air springs 6, 7, 10, and 11 and separate air lines 14, 15, and 22-25 are supplied air by a valve hose 29, which is connected to a second level valve 17. A supply hose 31 extends directly from the second leveling valve 17 to a second supply tank 33 for supplying air to the second leveling valve 17. The supply hose 31 is also provided with a pressure protection valve 35. Accordingly, air springs 6, 7, 10, 11, separate air lines 14, 15, and 22-25, valve hose 29, second leveling valve 17, supply hose 31, the pressure protection valve 35, and the second supply tank 33 form the second pneumatic circuit adapted for adjusting independently the height of the second side of the vehicle 1. Both the first pneumatic circuit and the second pneumatic circuit are independently operable so that the first leveling valve 16 independently delivers air to or purges air from the first side of the vehicle 1 and the second leveling valve 17 independently delivers air to or purges air from the second side of vehicle 1.

To ensure a balanced supply air of substantially the same volume and pressure to each air spring, the separate air lines 12, 13, and 18-21 on the first side of the vehicle 1 and the separate air lines 14, 15, and 22-25 on the second side of the vehicle 1 are of substantially the same size (internal diameter) and length. In the illustrated configuration, the separate air lines 18-21 and 22-25 each have a bore diameter of about 12 mm (½ inch). Other sizes may be used with similar results provided the size and length of the air lines in each set or group (e.g. 18 to 25, 28 and 29, 30 and 30 31 etc.) are the same. For similar reasons, the valve hoses 28 and 29 are of substantially the same size or internal diameter and length, and the supply hoses 30 and 31 are of substantially the same size or internal diameter and length. The provision of the separate air lines 18-21 and 21-25 and the connection of these lines to the separately supplied leveling valves 16 and 17 ensure that an equal volume of air is rapidly supplied to each of the air springs so that the internal pressure of the air springs respond appropriately to changes in road conditions relayed to the valves 16 and 17. Thus, the rate of change for the internal pressure of the first set of air springs is substantially symmetrical to the rate of change for the internal pressure of the second set of air springs.

The first control valve 16 and the second control valve 17 each include control arms 16a, 17a linked to a rigid bar 36 mounted underneath the air springs 9 and 11. The control arms 16a, 17a are each configured to move up and down in response to compression and extension of the air springs, which actuates the first and second control valves 16, 17 to either supply or purge air to and from the air springs. Both the first and second leveling valves 16, 17 neither supply air from the supply tank to the air springs nor remove air from the air springs to the atmosphere when the control arms 16a, 17a are in a neutral position. A cross-flow line 38 extends from the first leveling valve 16 to the second leveling valve 17 to connect the first and second leveling valves. As shown in FIG. 1A, the cross-flow line 38 is not directly connected supply lines 30, 31 or the air supply tanks 32, 33. When the control arms 16a, 17a are both in the neutral position, the first and second leveling valves 16, 17 are in pneumatic communication with each other such that there is pneumatic communication between the first and second pneumatic circuits via the cross-flow line 38 to equalize air pressure between air springs 4, 5, 8, and 9 on the first side of the vehicle 1 and air springs 6, 7, 10, 11 on the second side of the vehicle. As a result, the first and second pneumatic circuits are linked together as a common circuit when the control arms 16a, 17a are both in the neutral position. By maintaining equal air pressure between the first and second sets of air springs, the first and second leveling valves 16, 17 equilibrate the pressure between the two sides of the vehicle when both control arms 16a, 17a are in the neutral position. In the illustrated embodiment, only a single cross-flow line 38 is needed to establish pneumatic communication between the first and second pneumatic circuits such that air flows between the left and right sides of the vehicle.

The first and second leveling valves 16, 17 only permit pneumatic communication with each other via the cross-flow line 38 when the control arms 16*a*, 17*a* are both in the neutral position. In other words, the first and second leveling valves 16*a*, 17*a* prevent pneumatic communication between the first and second pneumatic circuits when either one of the control arms 16*a*, 17*a* is not in the neutral position. By not establishing communication between the first and second pneumatic circuits when either one of the control arms 16*a*, 17*a* are moving up and down from the neutral position, the first and second leveling valves 16, 17 are able to purge air from or supply air to the air springs independently. Accordingly, when the vehicle 1 is negotiating a sharp turn that shifts the vehicle's center of gravity, one of the first and second leveling valves 16, 17 supplies air to the set of air springs that have been contracted from the weight shift of the vehicle 1, while the other one of the first and second leveling valves 16, 17 purges air from the other set of air springs that have been extended from the weight shift of the vehicle without any cross-flow between the first 16 and second 17 leveling valves. In this state, the first and second leveling valves 16, 17 may overcompensate for the dynamic weight shift of the vehicle by either supplying too much air to one set of air springs or removing too much air from the other set of air springs, resulting in a slight pressure difference between the first and second sets of air springs. This slight pressure difference between the first and second sets of air springs may not trigger either control arm 16*a*, 17*a* to pivot away from the neutral position as the vehicle 1 pulls away from the turn, which would keep the vehicle 1 in an unlevel state if not for the mechanism described in the present disclosure. According to the present disclosure, because the first and second leveling valves 16, 17 communicate with each other when both control arms 16*a*, 17*a* are in the neutral position via cross-flow 38, the slight pressure difference between first and second sets of air springs is eliminated as air passes via the cross-flow line 38 from the set of air springs at higher pressure to the set of air springs at lower pressure, thereby reaching an equilibrium state.

Figure 2:
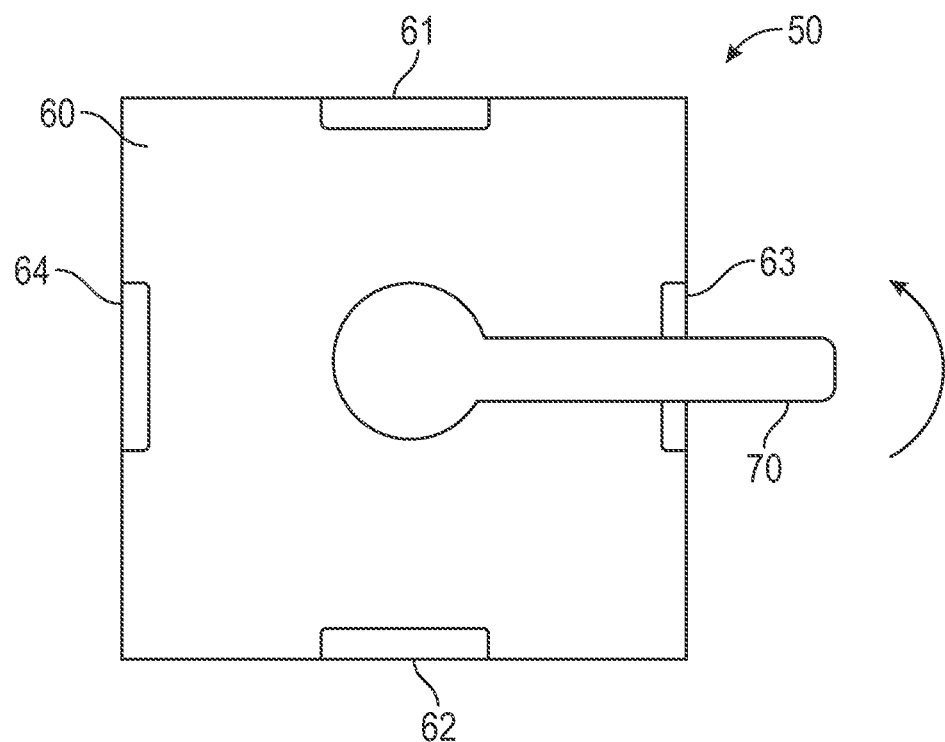
FIG. 2 is a top view of a leveling valve according to one configuration of the present invention.

FIG. 2 schematically illustrates a leveling valve 50 according to one configuration of the present invention. The leveling valve 50 includes a housing 60 and a control arm 70. The housing 60 includes a supply port 61 connected to the supply tank, an exhaust port 62 connected to the atmosphere, an air spring port 63 connected to the air springs on one respective side of the vehicle, and a cross-flow port 64 connected to a second leveling valve on another side of the vehicle. While FIG. 2 illustrates the housing 60 having one air spring port, the housing 60 may include two or more air spring ports to communicate with multiple sets of air springs disposed on a respective side of the vehicle. Further, the relative positioning of the ports with respect to each other and with respect to the control arm may be varied and is not intended to be limited to the configuration illustrated in FIG. 2.

As shown in FIG. 2, the control arm 70 is connected to the housing 60 and pivots about the housing 60 between a plurality of positions in response to compression and extension of the air springs disposed on one side of the vehicle. When the air springs compress, the control arm 70 pivots upward from a horizontal position to a first position, which establishes communication between the supply port 61 and the air spring port 63 of the housing. Consequently, air is supplied from the supply tank to the respective air springs, thereby increasing the air pressure of the air springs. When the respective air springs extend, the control arm 70 pivots downward from a horizontal position to a second position, which establishes communication between the exhaust port 62 and the air spring port 63 of the housing 60. Accordingly, air is removed from the air springs and released to the atmosphere, thereby decreasing the air pressure of the air springs. When the control arm 70 pivots away from the neutral position in either direction, the air spring port 63 does not communicate with the cross-flow port 64. At the neutral position, the control arm 70 is substantially oriented in a horizontal position such that the control arm 70 extends parallel to the ground surface. When the control arm 70 is set in the neutral position, the air spring port 63 communicates neither with the supply port 61 nor the exhaust port 62. The air spring port 63, instead, communicates with the cross-flow port 64 when the control arm 70 is set in the neutral position so that the leveling valve 50 may communicate with another leveling valve disposed on an opposite side of the vehicle (as shown in FIG. 1A-C).

According to one exemplary configuration, the leveling valve may include a rotary member (not shown), such as a disk, received in a central bore (not shown) of the housing, in which the central bore is pneumatically connected to each port of the housing. The rotary member is rotatably connected to the control arm so that pivoting movement of the control arm induces rotation of the rotary member. The rotary member may rotate between a plurality of positions to alter communication between the ports of the housing. Each leveling valve is a symmetrically dynamic equalized volume and pressure distributing valve having at least one rotary member (not shown) having different sized grooves or through holes so as to deliver or purge air to the air springs when actuated in a response position, or to cut off air flow to the purge and supply ports when actuated in a neutral position and to open pneumatic communication at the cross-flow port in the neutral position. Accordingly, if a leveling valve on one side of the vehicle is in a neutral position, but the leveling valve on the opposite side of the vehicle is not in a neutral position, then there is no pneumatic communication between the two leveling valves. Only once both leveling valves are actuated to the neutral position is pneumatic communication between the pneumatic circuits on the opposite sides of the vehicle established.

Establishing cross-flow when neither leveling valve is independently adjusting the height of a respective side of vehicle mitigates the imbalanced pressure differentials between the air springs on each side of the vehicle. It has been discovered that one factor contributing to these pressure differentials is gravity. For example, when a vehicle is negotiating a turn and experiences a dynamic lateral weight shift, one of the leveling valves responds by supplying air to the compressed air springs, whereas the other one of the leveling valves removes air from the extended air springs. However, the leveling valve that supplies air in response to the lateral weight shift tends to supply air with much greater force to overcome the force of gravity acting against the compressed air springs. As a result, the leveling valve often supplies more air to its set of air springs than the volume of air removed from the other set of air springs on the opposite of the vehicle. Although a pressure differential remains between the air springs on opposite sides of the vehicle, the control arms return to a horizontal, neutral position, in which the supply and purge ports of each leveling valve are closed (e.g., within dead band position), thereby not accounting for the overcompensated air supplied to one of the sets of air springs.

The air management system of the present invention provides the unexpected advantage of mitigating the pressure differential between the air springs on each side of the vehicle by linking at least two independent pneumatic circuits to form one common pneumatic circuit when both leveling valves are in a neutral mode. In the present context, a leveling valve is in a "neutral mode" when the leveling valve is neither supplying air from an air supply tank nor purging air into the atmosphere. Accordingly, the air management system of the present invention may adjust each side of the vehicle independently by preventing communication between the first and second pneumatic circuits when at least one of the leveling valves is not in a neutral mode. The air management system of the present invention may also link the first and second pneumatic circuits into one common circuit by establishing cross-flow communication between the first and second pneumatic circuits only when both leveling valves are in a neutral mode. Establishing cross-flow between the air springs on each side of the vehicle allows the overcompensated air springs having greater pressure to release air to the air springs on the other side of the vehicle via the cross-flow line, thereby promoting equilibrium between air springs on both sides of the vehicle. Ultimately, the ability to selectively provide cross-flow when all the leveling valves are set in a neutral mode allows the air management system to maintain a highly stable, safer and more comfortable vehicle ride with better traction.

Figure 3:
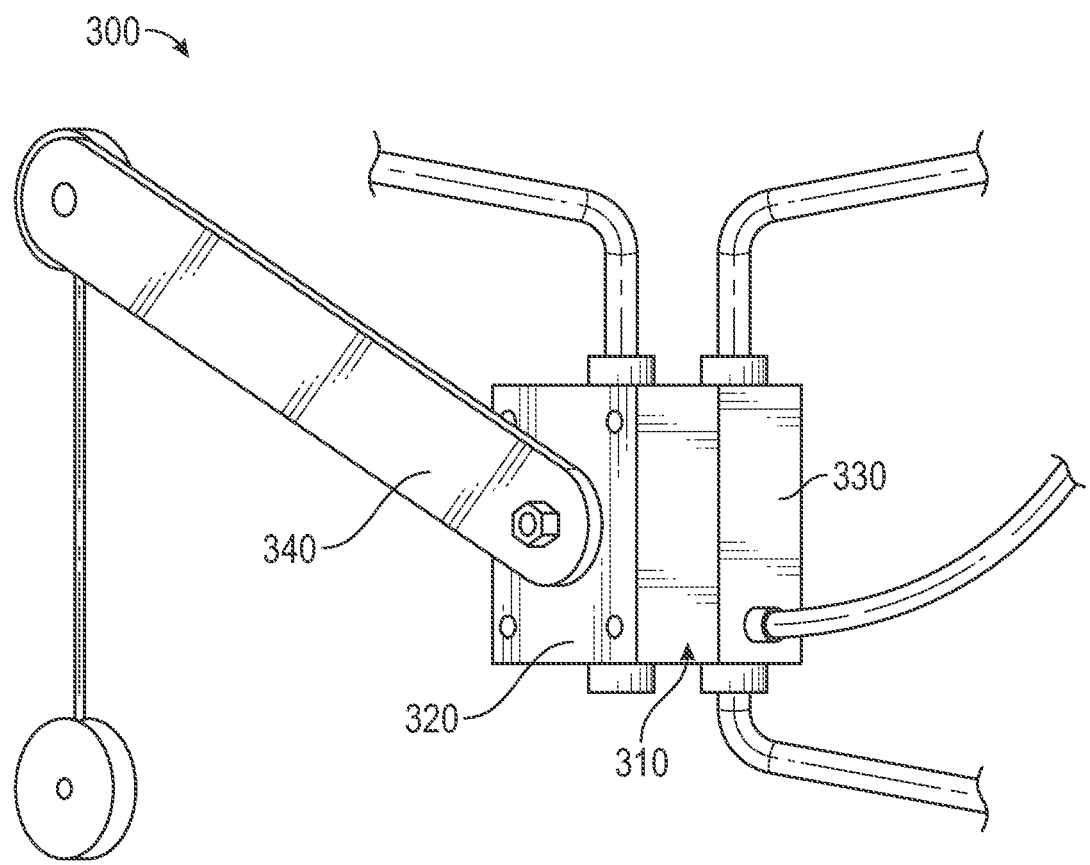
FIG. 3 is a perspective of a leveling valve according to one configuration of the present invention.
Figure 4:
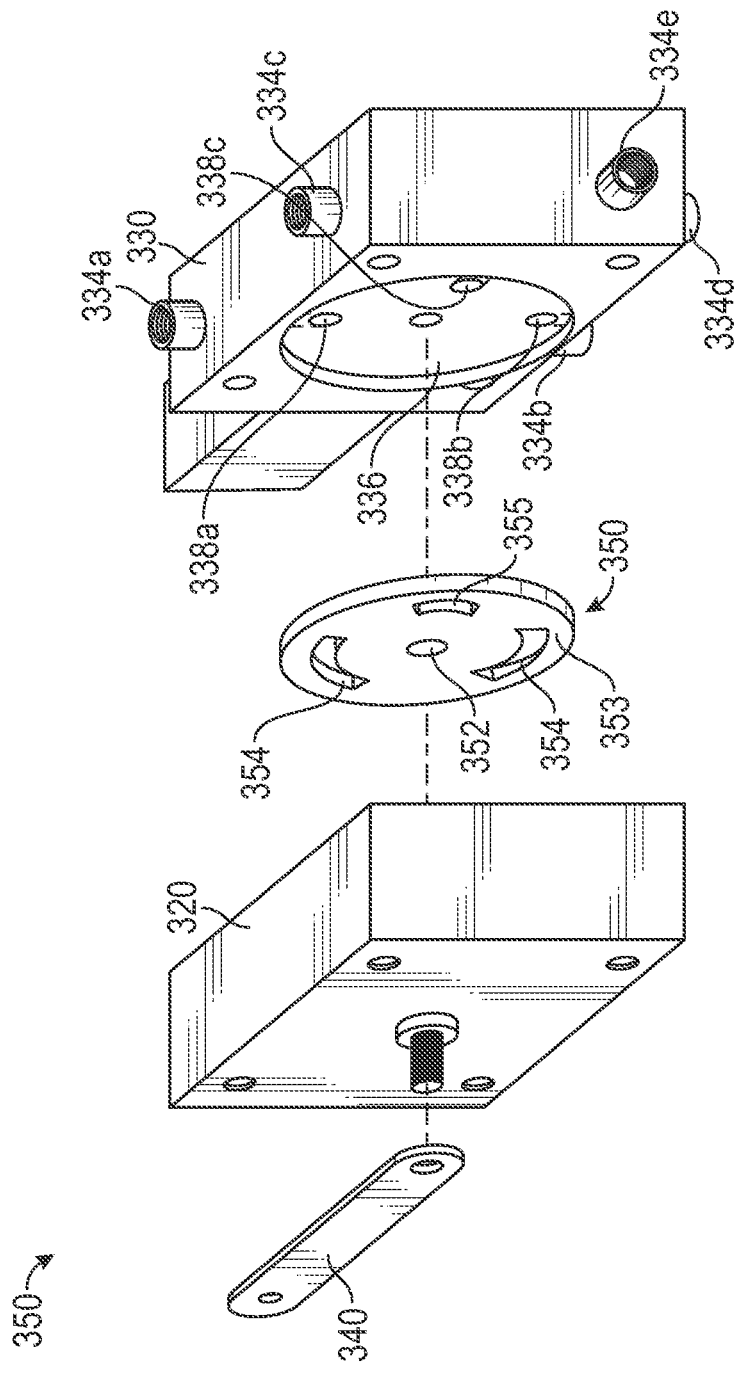
FIG. 4 is an exploded view of a leveling valve according to one embodiment of the present invention.

FIGS. 3 and 4 show different views of a mechanical-actuated valve according to one configuration of the present invention. The leveling valve 300 shown in FIGS. 3 and 4 includes a valve body 310 comprising an upper housing 320 mounted to a lower housing 330, wherein a control arm 340 is attached to a shaft extending through the upper housing 320. The upper housing 320 is mounted to the lower housing 330 by fasteners (not shown) that are received in mounting holes that extend through corners of the upper housing 320 and the lower housing 330.

Figure 5:
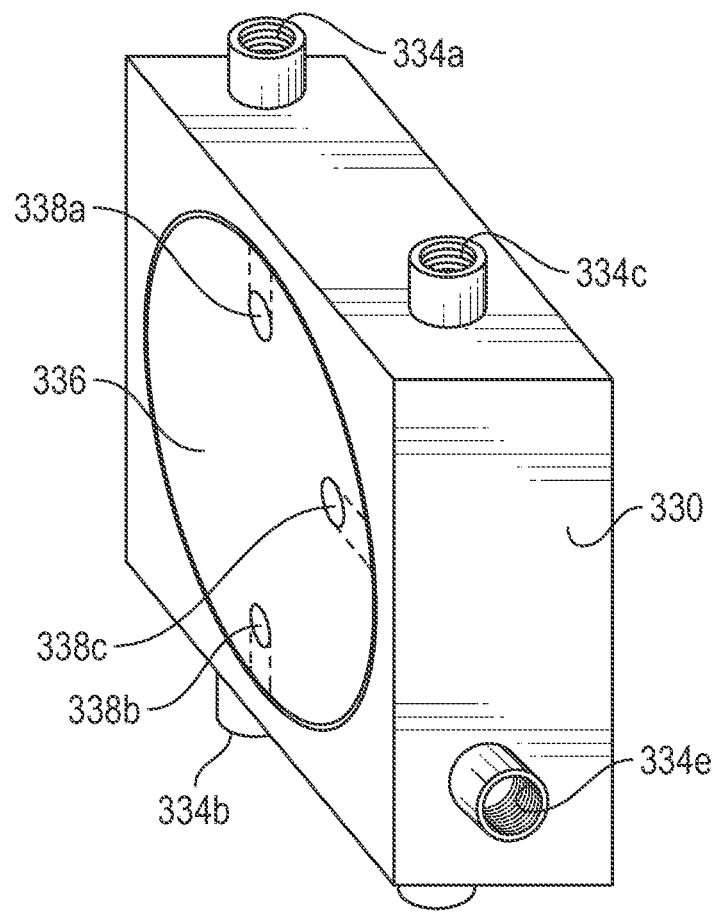
FIG. 5 is a perspective of a lower housing according to an embodiment of the present invention.

Referring to FIGS. 4 and 5, the lower housing 330 comprises at least five ports 334a-e, including a supply port 334a, which connects to an air tank (not shown), an exhaust port 334b for purging air from the air springs (not shown), a first port 334c that connects to a first set of air springs (not shown), a second port 334d that connects to a second set of air springs (not shown), and a cross-flow port 334e that connects to another leveling valve (not shown). The first and second ports 334c and 334d are arranged so that first spring port 334c on one side of the lower housing 330 coincides with a second spring port 334d on the other side of the lower housing 330. The ports 334a-d are further arranged so that supply port 334a on one side of the lower housing 330 coincides with the exhaust port 334b on an opposite side of lower housing 330.

The lower housing 330 includes separate airflow passages (not shown) to each port 334a-e of the lower housing 330, so that air supplied from the supply port 334a or air purged to the exhaust port 334b occurs independently from air flowing through the cross-flow port 334e. Referring to FIG. 5, the lower housing 330 includes a first surface 336 defining a plurality of circular-shaped cavities 338a-c. The supply port 334a is linked to a supply cavity 338a by one airflow passage formed in the lower housing 330, and the exhaust port 334b is linked to an exhaust cavity 338b by a second airflow passed formed in the lower housing 330. The cross-flow port 334e is linked to a cross-flow cavity 338c by a third air flow passage formed in the lower housing 330. The first and second spring ports 334c, 334d may be linked by a reservoir cavity (not shown) formed in the lowered housing 330.

FIGS. 4 and 6A-C show a rotary disk 350 according to one configuration of the present invention. Referring to FIG. 4, the rotary disk 350 is received in a central bore defined between the lower and upper housing. The rotary disk 350 includes a central aperture 352 configured to rotatably receive a post (not shown), which extends from the lower housing 330 and through the upper housing 320 to connect to the control arm. The rotary disk 350 is configured to rotate about the post (not shown) within a central bore of the lower housing 330, thereby defining the central aperture 352 as a pivot point. The rotary disk 350 includes two oblong-shaped slots 354 spaced around the central aperture 352 with disk surface 353 defined therebetween and along the periphery of the rotary disk 350. The disk surface 353 corresponds to regions of the rotary disk 350 that only includes the solid surface of the rotary disk 350, not any void spaces defined by the slots. Accordingly, when the disk surface 353 of the rotary disk 350 completely overlaps a respective cavity, air flow is restricted from entering through the respective cavity. The rotary disk 350 further includes a cross-flow slot 355, which is smaller than both the oblong-shaped slots 354.

Figure 6A:
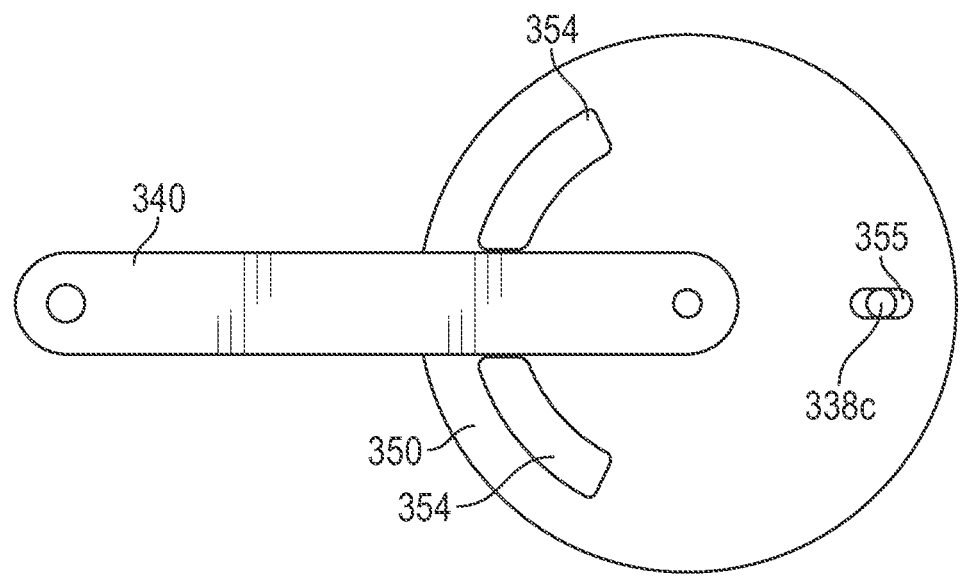
FIGS. 6A-C are schematic views of a rotary disk according to an embodiment of the present invention.
Figure 6B:
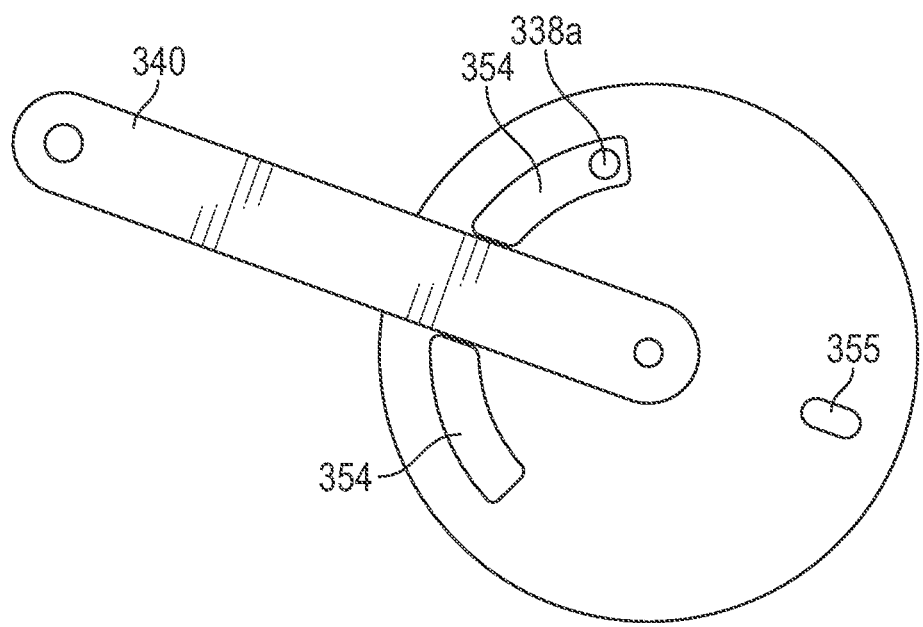
Figure 6C:
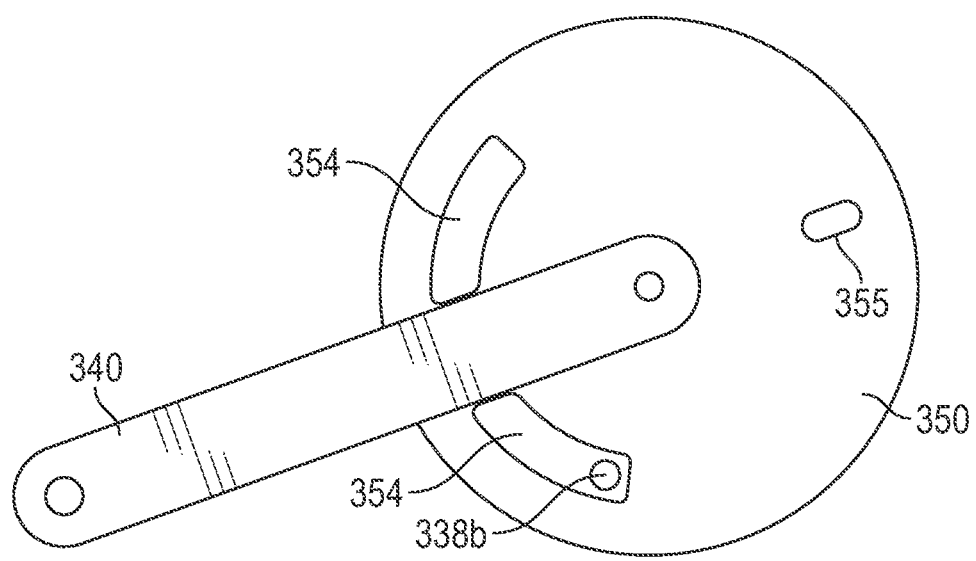

The angular position of the rotary disk 350 changes as the control arm 340 pivots about the valve body 310 of the valve 300. As shown in FIG. 6A, when the control arm 340 is set to a horizontal position, the rotary disk 350 is set to a neutral position, in which the disk surface 353 of the rotary disk 350 overlies both the supply cavity 338a and the exhaust cavity 338b of the lower housing 330. Thus, at the neutral position, the rotary disk 350 is set within the dead band range of rotation. Consequently, when the rotary disk 350 is set at the neutral position, the air springs are connected to neither the supply port 334a nor the exhaust port 334b. However, the cross-flow slot 355 overlies the cross-flow cavity so that the first and second springs are in communication with the cross-flow port 334e. As shown in FIG. 6B, due to clockwise rotation of the control arm 340, the rotary disk 350 rotates to an angular position in which the arrangement of slots 354, 355 connects the supply cavity 338a with the reservoir cavity (not shown) so that the air springs receive air from the supply tank, thereby increasing the air pressure of the air springs. As shown in FIGS. 6C, due to counterclockwise rotation of the control arm 340, the rotary disk 350 rotates to an angular position in which the arrangement of slots 354, 355 connects the exhaust cavity 338b with the reservoir cavity (not shown) so that air is removed from the air springs into the atmosphere. In other configurations, one condition for clockwise movement of one rotary disk 350 may correspond to counterclockwise rotation of another rotary disk 350 according to the present invention. For example, clockwise rotation of the rotary arm may induce the rotary disk 350 to rotate to an angular position in which the arrangement of slots 354, 355 connects the exhaust cavity 338b with the spring reservoir cavity (not shown) so that the air springs purge air into the atmosphere, thereby decreasing the air pressure of the air springs. Furthermore, counterclockwise rotation of the rotary arm may induce the rotary disk to rotate to an angular position in which the arrangement of slots 354, 355 connects the supply cavity 338a with the spring reservoir cavity (not shown) so that air is supplied from the supply tank to the air springs.

FIGS. 10, 11, and 12A-C illustrate a lower housing 430 according one configuration of the present invention. The lower housing 430 is configured to mount to the upper housing 320 shown in FIGS. 3 and 4 to form a valve body of a leveling valve. Similar to the configuration shown in FIGS. 3-5, the lower housing 430 comprises at least five ports 434a-e, including a supply port 434a that connects to an air tank (not shown), an exhaust port 434b for purging air from the air springs (not shown), a first port 434c that connects to a first set of air springs (not shown), a second port 434*d* that connects to a second set of air springs (not shown), and a cross-flow port 434*e* that connects to another leveling valve (950). The lower housing 430 can optionally further include a sixth port 434*f* (shown in FIGS. 12A and 12B) that connects to a dump valve (not shown), wherein the dump valve is configured to remove all of the air from each air spring of the air management system simultaneously.

Figure 12A:
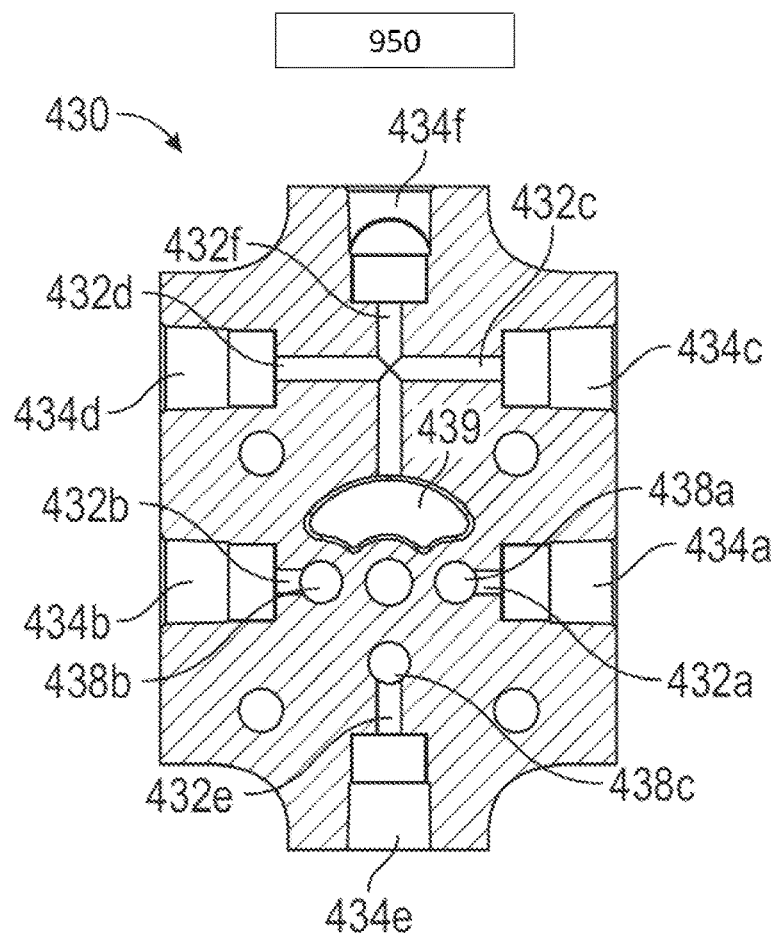
FIG. 12A is a top cross-sectional view of the lower housing taken along line Z-Z according to the present invention.
Figure 12B:
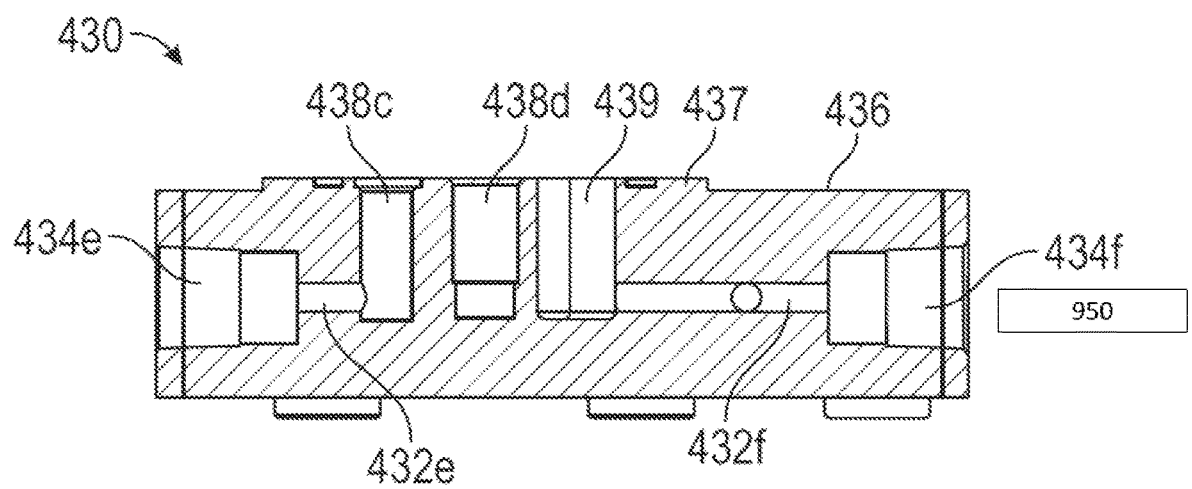
FIG. 12B is a side cross-sectional view of the lower housing taken along line Y-Y according to the present invention.
Figure 12C:
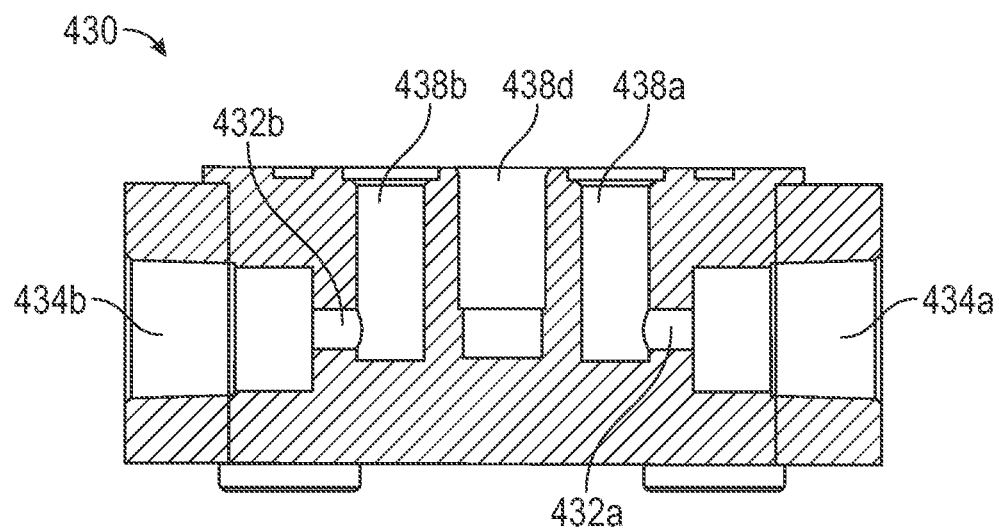
FIG. 12C is a side cross-sectional view of the lower housing taken along line X-X according to the present invention.

As shown in FIGS. 12A-C, the lower housing 430 includes separate airflow passages to each port 434*a-f*, including a supply passage 432*a* connected to the supply port 434*a*, an exhaust passage 432*b* connected to the exhaust port 434*b*, a first passage 432*c* connected to the first port 434*c*, a second passage 432*d* connected to the second port 434*d*, a cross-flow passage 432*e* connected to the cross-flow port 434*e*, and a dump passage 432*f* connected to the dump port 434*f*. The lower housing 430 includes a first surface 436 defining a plurality of circular-shaped blind holes 438*a-c* and a reservoir cavity 439. The blind holes 438*a-c* include a supply hole 438*a* linked to the supply port 434*a* by the supply passage 432*a*, an exhaust hole 438*b* linked to the exhaust port 434*b* by the exhaust passage 432*b*, and a cross-flow hole 438*c* linked to the cross-flow port 434*e* by the cross-flow passage 432*e*. The lower housing 430 further includes a central hole 438*d* configured to receive a post (not shown) that extends through the upper housing 320 to receive the control arm. The first passage 432*c*, the second passage 432*d*, and the dump passage 432*f* are interconnected together and extend from the reservoir cavity 439. In one example shown in FIG. 10, the lower housing 430 may include an elevated surface 437 protruded from the first surface 436, in which the holes 438*a-c* and cavity 439 are defined along the elevated surface 437. The elevated surface 437 of the lower housing 430 is configured to engage a lower surface of the upper housing 320 to define a chamber therein.

Figure 13:
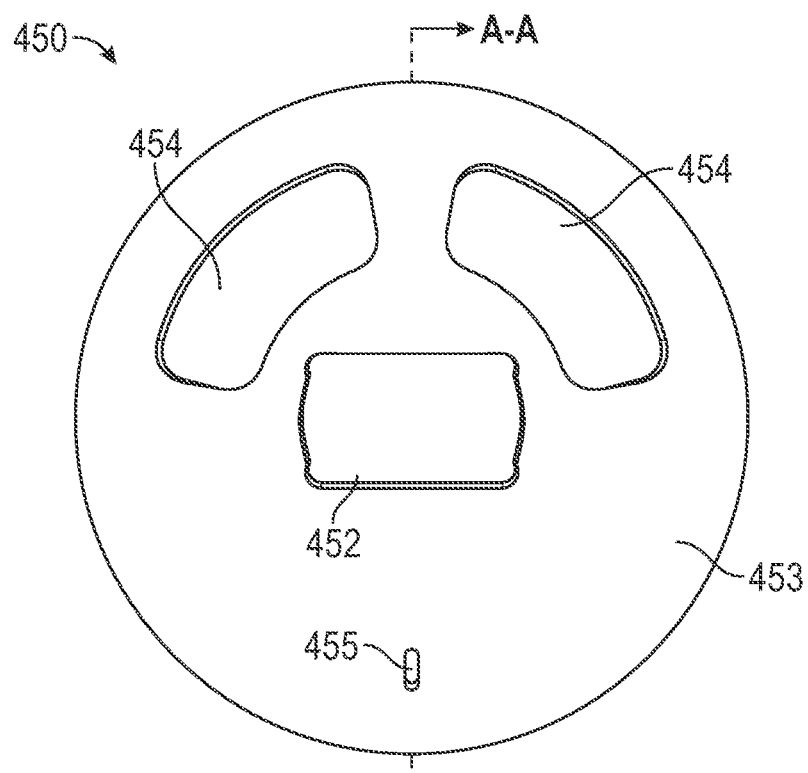
FIG. 13 is a top view of a rotary disk according to the present invention.

FIG. 13 illustrates a rotary disk 450 according to a configuration of the present invention. Similar to the configuration shown in FIGS. 4 and 6A-C, the rotary disk 450 includes a central aperture 452, two oblong-shaped slots 454, and a cross-flow slot 455 with disk surface 453 extending therebetween and along the periphery of the rotary disk 450. The central aperture 452 is disposed between the two oblong-shaped slots 454 and the cross-flow slot 455. The two oblong-shaped slots 454 are symmetrically spaced from a central axis A-A of the rotary disk 455, and the cross-flow slot 455 overlies the central axis A-A of the rotary disk 450, in which the central aperture 452 is disposed between the oblong-shaped slots 454 and the cross-flow slot 455. The cross-sectional area of the cross-flow slot 455 is substantially smaller than the cross-sectional area of each oblong-shaped slot 454. For example, the cross-sectional area of the cross-flow slot 455 is at least three, four, five, ten, twenty, thirty, forty or more times smaller than the cross-sectional area of the oblong-shaped slots 454. In some non-limiting embodiments (e.g., FIGS. 33-36), the width or diameter of the cross-flow slot 455 may vary across its depth thereof such that the width or diameter of the cross-flow slot 455 has a first transverse dimension at a first face of the rotary disk 450 and a second transverse dimension at a second face of the rotary disk 450, in which the first transverse dimension is greater than the second transverse dimension.

The rotary disk 450 is received on the elevated surface 437 of the lower housing 430, and the central aperture 452 receives a shaft (not shown) extending from the first surface 436 of the lower housing 430 to the upper housing (not shown) of the rotary valve. Similar to the configuration shown in FIGS. 4 and 6A-C, the rotary disk 450 is configured to rotate about the shaft between a plurality of positions including a neutral position, a first angular position, and a second angular position. At the neutral position, the disk surface 453 of the rotary disk 450 overlies both the supply hole 438*a* and the exhaust hole 438*b* of the lower housing 430 such that the air springs are connected to neither the supply port 434*a* nor the exhaust port 434*b*. Thus, the rotary disk 450 is set within the dead band range of rotation when set at a neutral position. At the neutral position, the cross-flow slot 455 overlies the cross-flow hole 438*c* so that the first and second springs are in communication with the cross-flow port 434*e*.

When the rotary disk 450 is rotated away from the neutral position in a clockwise direction to the first angular position, the oblong-shaped slots 454 connect the supply hole 438*a* with the reservoir cavity 439 so that the air springs receive air from the supply tank, thereby increasing the air pressure of the air springs. When the rotary disk 450 is set at the first angular position, the cross-flow slot 455 is rotated away from the cross-flow hole 438, such that the dead band 453 overlies the cross-flow hole 438*c*. When the rotary disk 450 is rotated away from the neutral position in a counter-clockwise direction to the second angular position, the oblong-shaped slots 454 connect the exhaust hole 438*b* with the reservoir cavity 439 so that air is removed from the air springs. When the rotary disk 450 is set at the second angular position, the cross-flow slot 455 is rotated away from the cross-flow hole 438*c*, such that dead band 453 overlies the cross-flow hole 438*c*.

Due to the sizing of the cross-flow slot 455, the rotary disk 450 only needs to be slightly rotated about 1° to 2° in either the clockwise or the counter-clockwise direction from the neutral position for the dead band 453 to completely overlie the cross-flow hole 438*c*. Thus, the rotary disk may transition quickly from allowing cross-flow between the first and second pneumatic circuits to controlling the air flow to one side of the vehicle independently without cross-flow taking place. While the rotary disk is rotating about 1° to 2° in either the clockwise or the counter-clockwise direction from the neutral position, the oblong-shaped slots 454 are neither in communication with the supply hole 438*a* nor the exhaust hole 438*b* of the lower housing 430. When the rotation speed of the rotary disk exceeds a predetermined threshold speed, the rotary disk 450 may rotate from the first angular position to the second angular position without allowing air to flow through the cross-flow hole 438*c* and the cross-flow port 434*e* during the transition. Accordingly, when the vehicle experiences subsequent dynamic weight shifts, the rotary disk may switch between supplying and removing air to and from the air springs without allowing cross-flow to take place between the first and second pneumatic circuits during the transition.

Figure 14A:
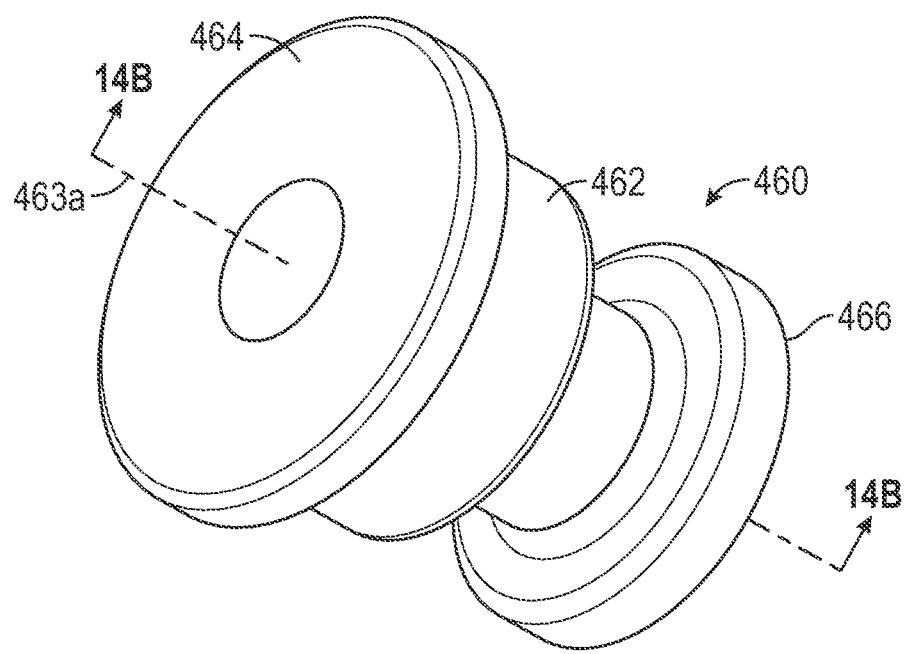
FIG. 14A is a perspective view of a first poppet to be used in the present invention.
Figure 14B:
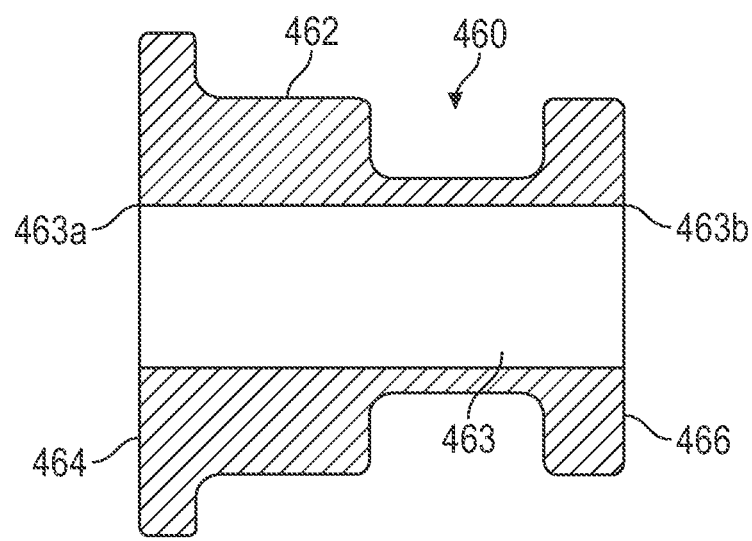
FIG. 14B is a cross-sectional view taken along line B-B of the first poppet to be used in the present invention.

FIGS. 14A and 14B illustrate a first poppet 460 according to one configuration used in the present invention. The first poppet 460 includes a cylindrical-shaped body 462 extending from a first end 464 to a second end 466. The first poppet 460 includes a passage 463 extending through the body 462 from an first opening 463*a* defined along the first end 464 to a second opening 463*b* defined along the second end 466. The size of the first opening 463*a* is equivalent to the size of the second opening 463*b*. The first poppet 460 is disposed in both the supply hole 438*a* and the exhaust hole 438*b* of the lower housing 430, in which the first end 464 projects out of the first surface 436 of the lower housing 430 and engages the rotary disk 450 to provide an air tight seal between the supply and exhaust holes 438*a*, 438*b* and the oblong-shaped slots 454. In some other configurations (not shown), the size of the first opening 463a may be different than the size of the second opening 463b such that the diameter or width of the passage 463 varies through its length thereof. In one example, the first opening 463a may comprise a first diameter, and the second opening 463b may comprise a second diameter, in which the second diameter is less than the first diameter.

Figure 15A:
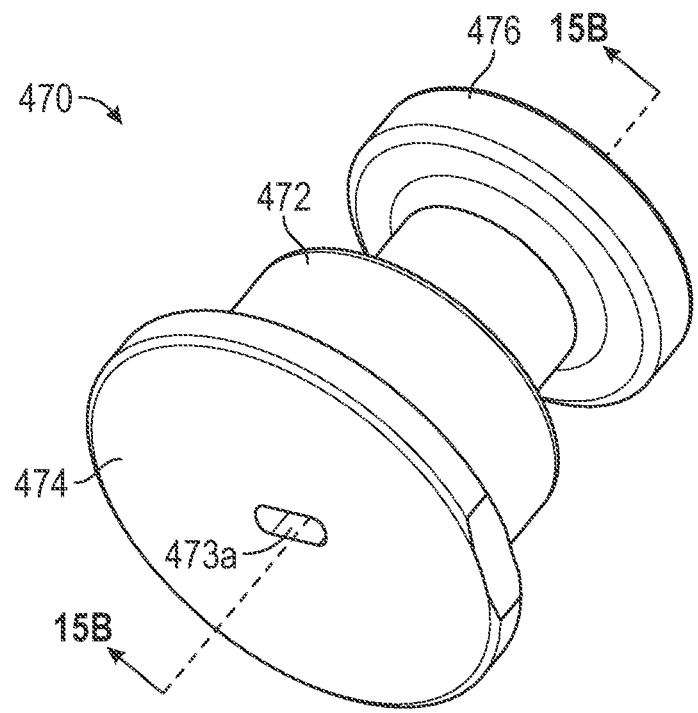
FIG. 15A is a perspective view of a second poppet according to the present invention.
Figure 15B:
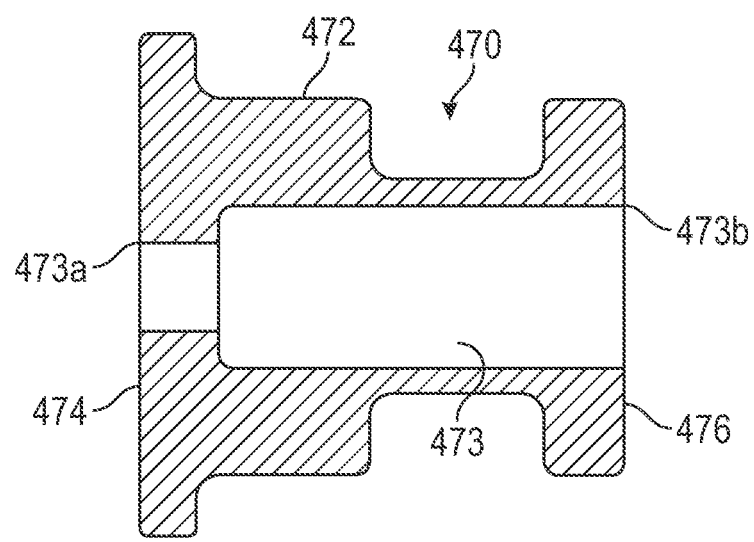
FIG. 15B is a cross-sectional view taken along line C-C of the second poppet according to the present invention.

FIGS. 15A and 15B illustrate a second poppet 470 according to one configuration of the present invention. Similar to the first poppet 460, the second poppet 470 includes a cylindrical-shaped body 472 extending from a first end 474 to a second end 476. The first poppet 470 includes a passage 473 extending through the body 472 from an first opening 473a defined along the first end 474 to a second opening 473b defined along the second end 476. Unlike the first poppet 460, the size of the first opening 473a in the second poppet 470 is smaller than the size of the second opening 473b. The size and shape of the first opening 473a of the second poppet 470 corresponds to the size and shape of the cross-flow slot 455 in the rotary disk 450. The second poppet 470 is disposed in the cross-flow hole 438c of the lower housing, in which the first end 474 projects of the first surface 436 of the lower housing 436 and engages the rotary disk 450 to provide an air tight seal between the cross-flow slot 455 of the rotary disk 450 and the cross-flow hole 438c.

In one non-limiting embodiment, the lower housing 430 may comprise a fourth blind hole (not shown) disposed along the first surface 436, whereby the fourth blind hole is aligned with the cross-flow hole 438c and the reservoir cavity 439 is disposed between the fourth blind hole and the cross-flow hole 438c. In some embodiments, the fourth blind hole is ninety degrees separated from the supply and exhaust holes 438a, 438b with respect to the central hole 438d and one-hundred-eighty degrees separated from the cross-flow hole 438c with respect to the central hole 438d. The fourth blind hole is not in pneumatic communication with any one of the supply passage 432a, exhaust passage 432b, first passage 432c, second passage 432d, cross-flow passage 432e, and the dump passage 432f. In some embodiments, a third poppet (not shown) may be disposed in the fourth blind hole. In some embodiments, the third poppet may comprise the same configuration as the first poppet 460 received in the cross-flow hole 438c such that the third poppet comprises a first end configured to project above the first surface 436 of the lower housing 430. When the rotary disk 450 is received on the first surface 436 of the lower housing 430, the third poppet is configured to engage the rotary disk 450 such that a bottom surface of the rotary disk 450 engages four poppets: the pair of first poppets 460 received in the supply and exhaust holes 438a, 438b, the second poppet 470 received in the cross-flow hole, and the third poppet received in the fourth blind hole. By engaging the four poppets that are displaced from each ninety degrees with respect to the center hole 438d, the rotary disk 450 is maintained at a level position.

Figure 43:
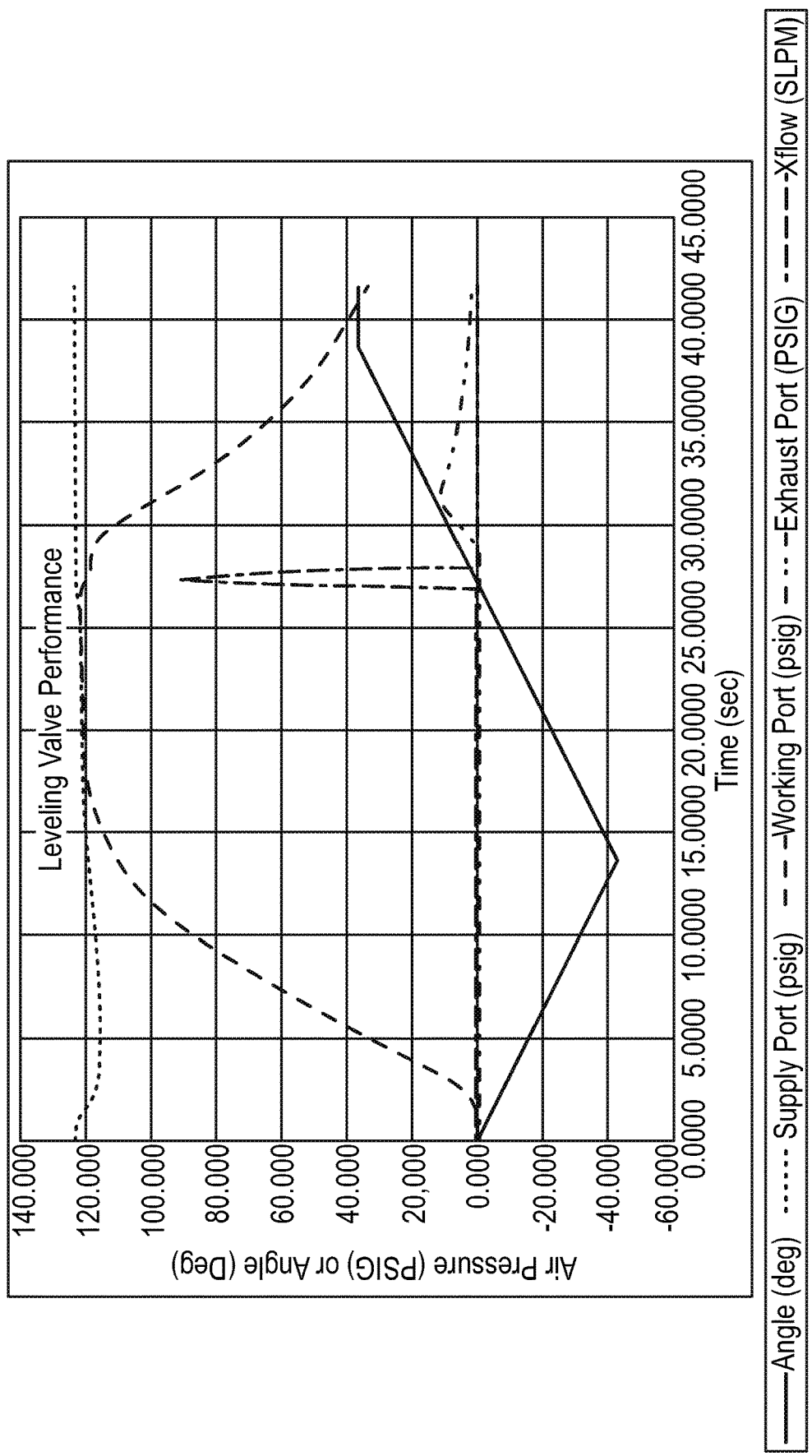
FIG. 43 is a graph showing the air pressure of the various valve ports at various operation stages of the leveling valve according to the present invention.

FIG. 43 illustrates the relationship between the angle of the control arm and the air pressure at the various ports of the lower housing of a leveling valve in an exemplary embodiment according to the present invention. As shown in FIG. 43, the x-axis reflects the time of motorized operation in seconds, and the y-axis indicates both the angle of the control arm in degrees (i.e., represented by the solid line) and the air pressure in pressure-per-square-inch-gauge (PSIG) of the various valve ports in response to the changing control arm angle (represented by the dotted or dashed lines). Referring to FIG. 43, as the vehicle dynamically encounters a changing road condition, i.e., when the control arm pivots initially away from the neutral position, indicated by the x-axis, the air pressure at the working port (i.e., spring port connected to the air spring) increases exponentially, while the air pressure at the supply port slightly dips. Accordingly, the leveling valve is configured to respond quickly at supplying air pressure to the air spring when the control arm pivots away from the neutral position to a supply position. Then, as the control arm initially pivots back toward the neutral positon, as indicated at about 14 seconds on the x-axis in FIG. 43, the air pressure at the spring port levels is maintained at a constant level. Once the leveling arm returns back to the neutral position, as indicated at about 28 seconds on the x-axis in FIG. 43, the air pressure at the cross-flow port spikes to about 90 PSIG and the air pressure at the spring port decreases slightly. As a result, the pressure in the connected air spring decreases slightly so that air springs disposed on opposite sides of the vehicle become equal. Then, as the vehicle continues driving and encounters a different changing road condition, i.e., as the control arm rotates away from the neutral position in the opposite direction, starting about 29 seconds on the x-axis in FIG. 43, the air pressure at the exhaust port increases such that the air pressure at the spring port decreases exponentially, at a faster rate, compared to the decrease of air pressure when the control arm is set in the neutral position. Accordingly, the air pressure in the connected air spring reduces significantly in response to the control arm switching to an exhaust position. Thus, FIG. 43 demonstrates that the leveling valve according to the present invention operates according to three unique stages: (i) a supply mode, (ii) an exhaust mode, and (iii) a cross-flow mode. In addition, FIG. 43 demonstrates that there is no bleed over between the separate stages such that the leveling valve may operate in only one of the three modes at a single time.

According to various embodiments, FIG. 44 illustrates a method 900 for adjusting air pressure of an air management system 100 comprising one or more air supply tanks 32, 33, a first pneumatic circuit disposed on a first side of a vehicle, and a second pneumatic circuit disposed on a second side of the vehicle. As shown in FIG. 44, the method 900 comprises a step 910 of adjusting independently the air pressure of the first pneumatic circuit by a first leveling valve 16. In various embodiments, adjusting independently the air pressure of the first pneumatic circuit includes either supplying air from the one or more air supply tanks 32, 33 to the first pneumatic circuit or removing air from the first pneumatic circuit to the atmosphere. As shown in FIG. 44, the method 900 comprises a step 920 of adjusting independently the air pressure of the second pneumatic circuit by a second leveling valve 17. In various embodiments, adjusting independently the air pressure of the second pneumatic circuit includes either supplying air from the one or more air supply tanks 32, 33 to the second pneumatic circuit or removing air from the second pneumatic circuit to the atmosphere. As shown in FIG. 44, the method 900 comprises a step 930 of establishing pneumatic communication between the first pneumatic circuit and the second pneumatic circuit only when both the first leveling valve 16 and the second leveling valve 17 are set in a neutral mode. In various embodiments, the leveling valve in the neutral mode is neither supplying air from the one or more air supply tanks or removing air into the atmosphere.

The air management system may include mechanically- or electronically-actuated leveling valves to control communication between the first and second pneumatic circuits. In one exemplary configuration, the air management system may include a leveling valve disposed at each air spring, in which each leveling valve includes a manifold and a plunger disposed in a chamber of the manifold. The plunger is configured to move in the chamber of the manifold between one or more positions including at least a first position to establish cross-flow between the first and second pneumatic circuits and a second position to adjust independently the height of a respective side of the vehicle. Rather than having a control arm to actuate air flow, the manifold may include an electronic actuator to move the plunger between the one or more positions so that air flow may be supplied or removed from the respective air spring. In one exemplary configuration, the air management system may have a central manifold that includes individual ports connected to each air spring of the air management system.

In one exemplary configuration, the leveling valves may consist of one or more solenoid valves that allow air to be adjusted to each side of the vehicle independently while selectively allowing cross-flow between the first and second pneumatic circuits to equalize air pressure between the first and second sets of air springs. The air management system may further include a controller in electrical communication (e.g. wireless or wired) with the leveling valves to control the operation of the electronically-actuated leveling valves. The air management system may further include air pressure sensors 631 provided in the air lines to sense pressure changes and imbalances and communicate such data to a controller in electrical communication (e.g. wireless or wired) with the leveling valves or to one or more leveling valves themselves. The air management system may further include inputs based on ride height sensors for height control, flow sensors 632 at one or more of the ports, and communication with electronic systems, e.g., any electronic stability control (ESC), including, but not limited to electronic stability program (ESP), dynamic stability control (DSC), vehicle stability control (VSC), automatic traction control (ATC), and/or roll stability control systems of the vehicle 1. Linking actuation of the air management system to a controller that also linked to the ESP, DSC ATC, or VSC of the vehicle enhances the overall safety of the vehicle by syncing braking and steering control with the operation of the air management system.

In various configurations, the controller of the air management system is in electrical communication with the leveling valves, sensors, and other vehicle electronic systems (e.g., ESC, ESP, DSC, VSC, ATC, etc). In various embodiments, the controller may receive measurement signals, such as height and pressure measurements of the air springs, transmitted from the sensors. Based on the measurement and data signals, the controller is configured to calculate a current state of each air spring of the air management system and a dynamic operating state of the vehicle. In one configuration, the controller is configured to calculate a pressure differential or a height differential between the air springs of the air management system based on the received measurement and data signals. The controller is configured to actuate the valve in the active mode when the pressure differential or the height differential between the air springs is above a predetermined threshold and actuate the valve in a neutral mode when the pressure differential or height differential is below a predetermined threshold. Accordingly, when there is a substantial height difference between respective sides of the vehicle, the controller is configured to transmit commands to the leveling valves to independently adjust the height of the air springs of its respective pneumatic circuit to bring the vehicle to a level condition at a faster rate. In various embodiments, the controller may transmit commands to the leveling valve to operate in an active mode at any vehicle speed. When there is only a slight height differential between the respective sides of the vehicle that does not trigger a rolling condition, the controller is configured to transmit a command to the leveling valves to be set in the neutral mode and mitigate any pressure differential between the air springs by establishing cross-flow between the air springs. In various embodiments, the controller transmit commands to the leveling valves to operate in the neutral mode at any vehicle speed, including speeds substantially above zero miles-per-hour or kilometers-per-hour.

Figure 7:
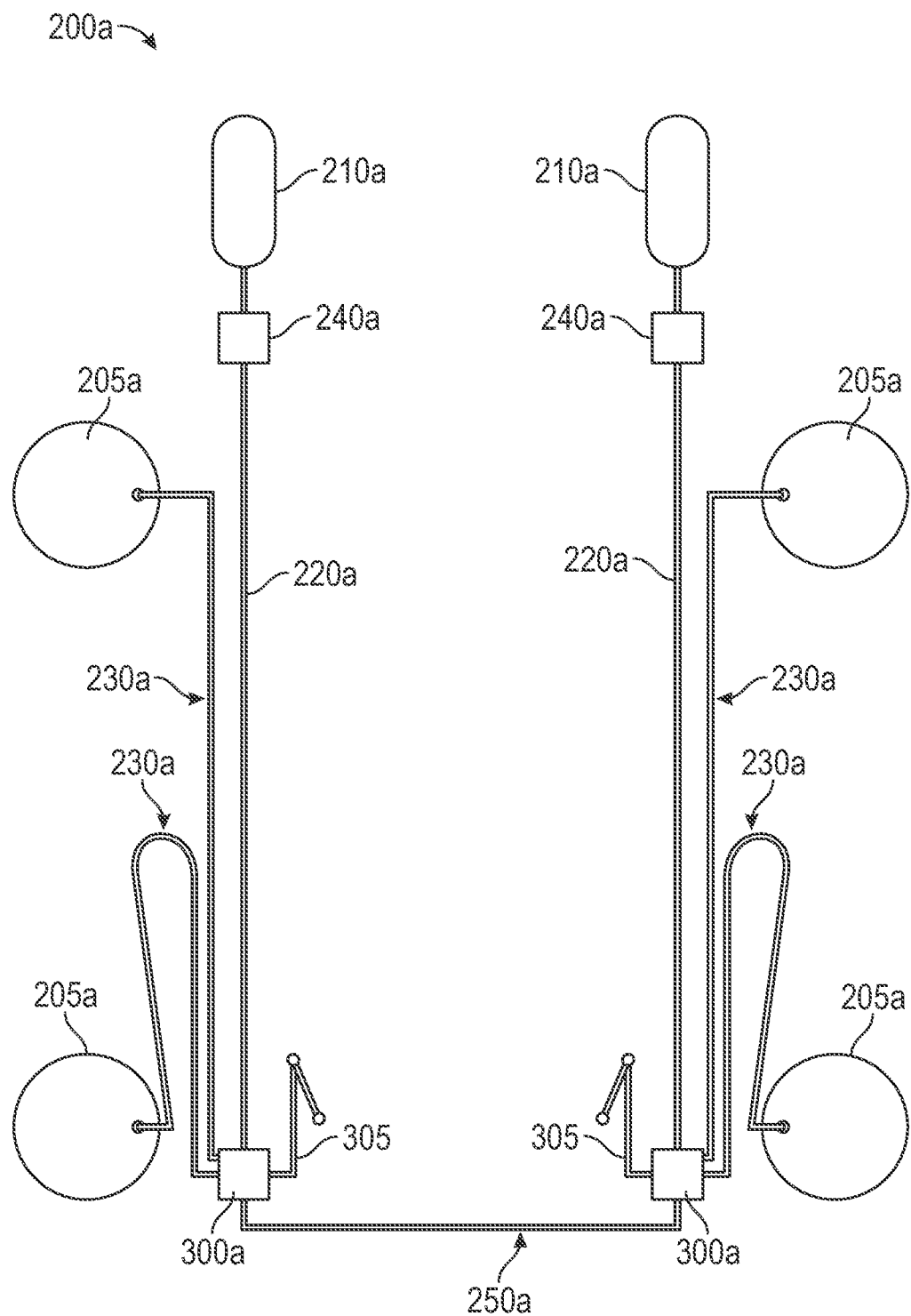
FIG. 7 is a schematic view of an air management system according to the present invention.
Figure 8:
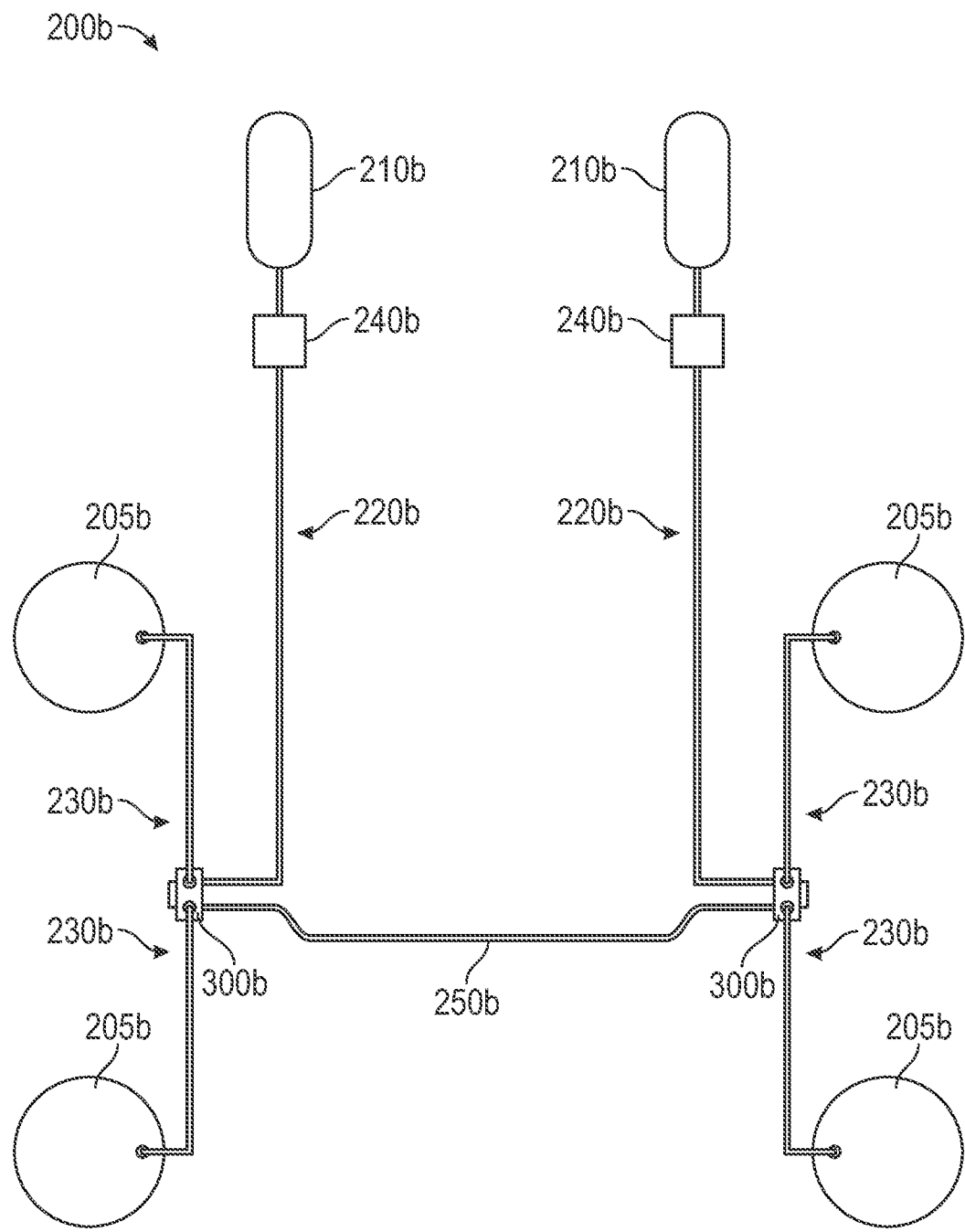
FIG. 8 is a schematic view of an air management system according to the present invention.
Figure 9:
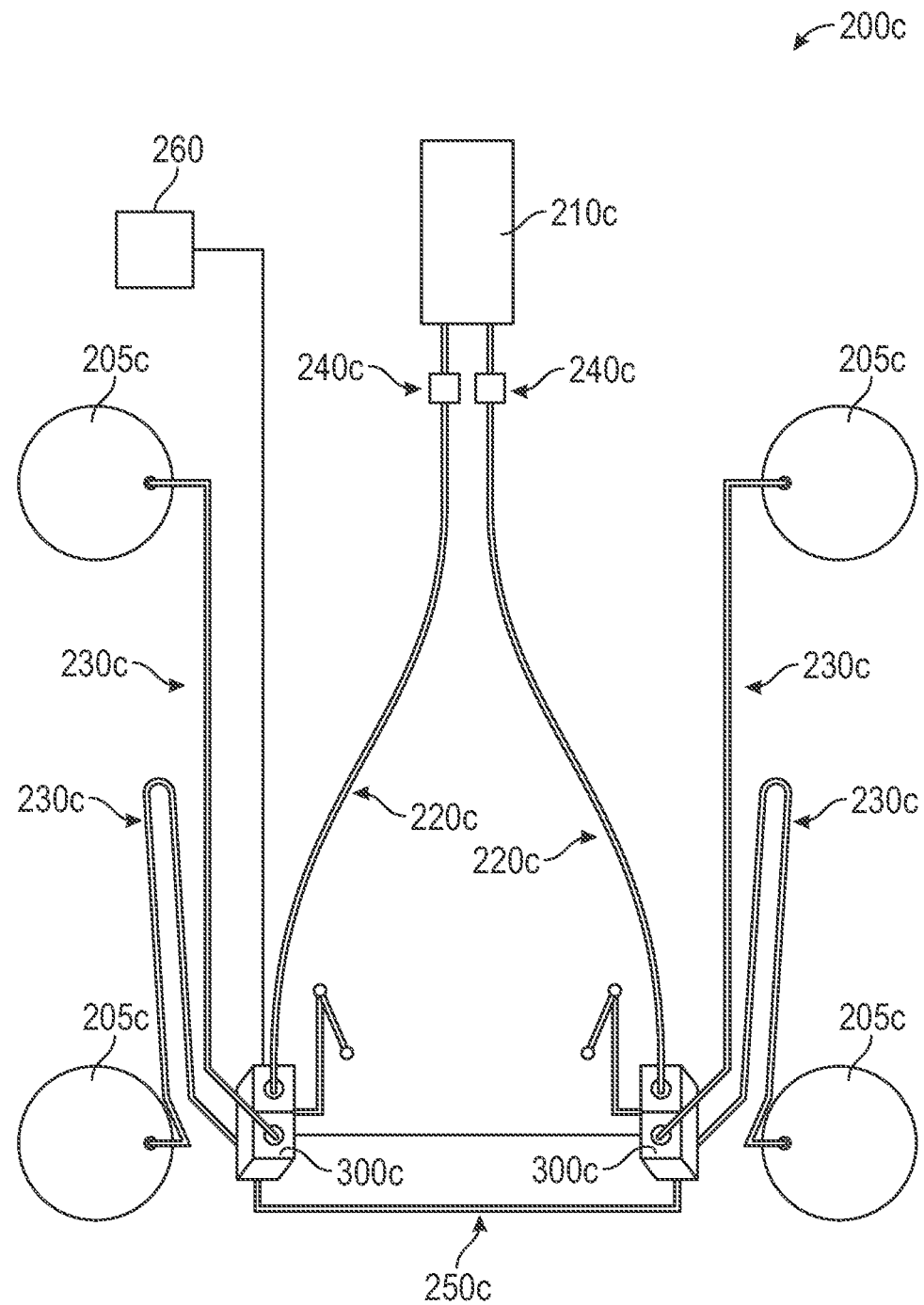
FIG. 9 is a schematic view of an air management system according to the present invention.
Figure 10:
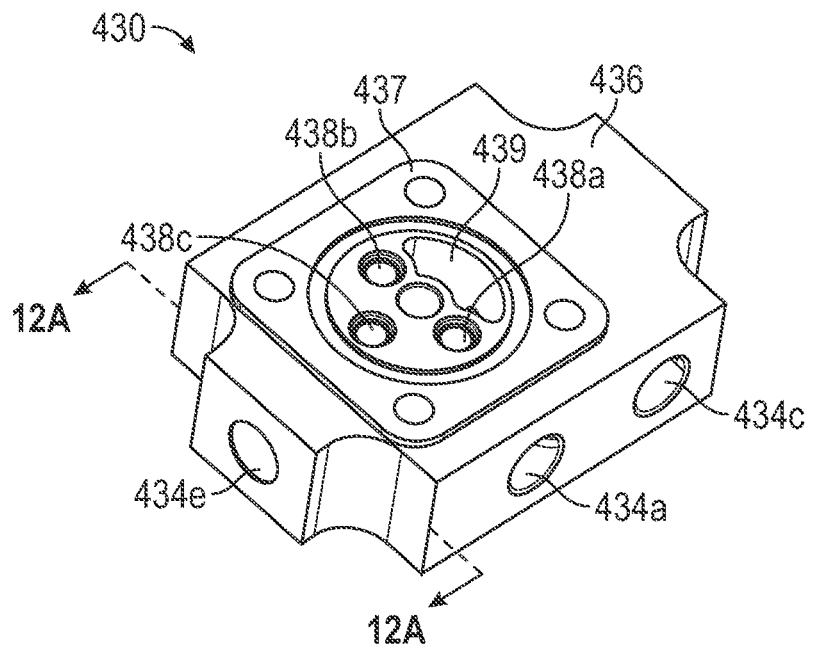
FIG. 10 is a perspective view of a lower housing according to the present invention.
Figure 11:
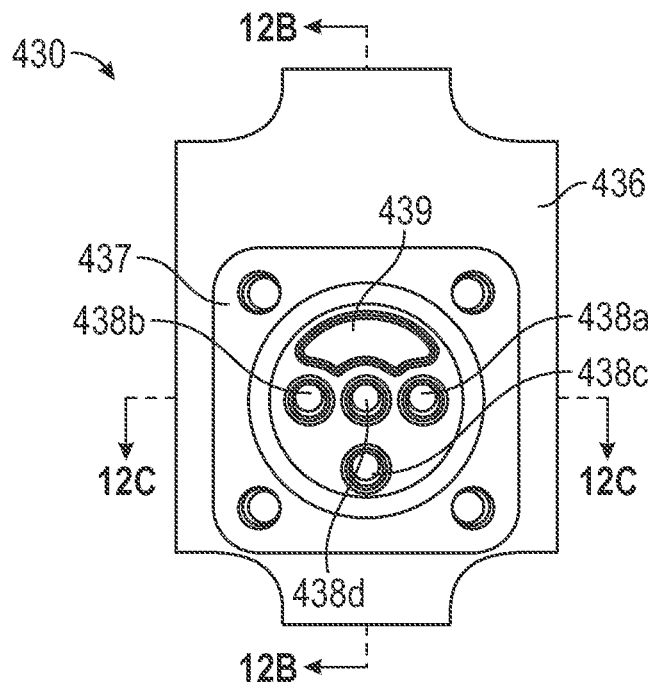
FIG. 11 is a top view of a lower housing according to the present invention.

FIGS. 7-9 illustrate air managements systems comprising a series of air lines, in which the lengths of all the airlines extending between a respective air spring and a control valve have an equal length and internal diameter. FIG. 7 illustrates an air management system 200a comprising a first pneumatic circuit, a second pneumatic circuit, and at least two leveling valves 300a. Each pneumatic circuit includes one or more air springs 205a, an air supply tank 210a, a supply line 220a extending between the leveling valve 300a and the supply tank 210a, and a set of spring lines 230a connecting the one or more air springs 205a to the leveling valve 300a. The air management system 200a further includes a pressure protection valve 240a (not required for all air management systems) connected to each supply line 220a. In some configurations of the air management system 200a, the spring lines 230a may have equal lengths and diameters, and the supply lines 220a may have equal lengths and diameters. Each leveling valve 300a is mechanically actuated by a control arm 305 and configured to independently adjust the air flow to one of the first or second pneumatic circuits. The leveling valves 300a are linked together by a cross-flow line 250a to establish fluid communication between the first and second pneumatic circuits when all leveling valves are set in the neutral mode. Thus, the leveling valves 300a are configured to provide cross-flow between first and second pneumatic circuits when neither air is supplied from the air tank to the air springs nor air is removed from the air springs to the atmosphere.

FIG. 8 illustrates an air management system 200b comprising a first pneumatic circuit, a second pneumatic circuit, and at least two leveling valves 300b. Each pneumatic circuit includes one or more air springs 205b, an air supply tank 210b, a supply line 220b extending between the leveling valve 300b and the supply tank 210b, and a set of spring lines 230b connecting the one or more air springs 205b to the leveling valve 300b. In some configurations of the air management system 200b, the spring lines 230b may have equal lengths and diameters, and the supply lines 220b may have equal lengths and diameters. The air management system 200b further includes a pressure protection valve 240b connected to each supply line 220b. As shown in FIG. 8, the leveling valves 300b are electronically-actuated leveling valves connected together by a cross-flow line 250b. The electronically-actuated leveling valve is configured to provide cross-flow between first and second pneumatic circuits when neither air is supplied from the air tank to the air springs nor air is removed from the air springs to the atmosphere, i.e., in the neutral mode.

FIG. 9 illustrates an air management system 200c comprising a first pneumatic circuit, a second pneumatic circuit, and at least two leveling valves 300c. The air management system 200c comprises one or more air springs 205c, a supply air tank 210c that is connected to each leveling valve 300c by a respective supply line 220c, in which a pressure protection valve 240c is incorporated into the supply line 220c. Each leveling valve 300c is connected to the one or more air springs 205*c* by a series of spring lines 230*c*. In some configurations of the air management system 200*c*, the spring lines 230*c* may have equal lengths and diameters, and the supply lines 220*c* may have equal lengths and diameters. The leveling valves 300*c* are connected together by a cross-flow line 250*c*. As shown in FIG. 9, the leveling valves 300*c* are electronically-actuated leveling valves and are in electrical communication with a control unit 260. The electrical communication may be established by a wired connection or a wireless connection. The electronically-actuated leveling valve is configured to provide cross-flow between first and second pneumatic circuits when neither air is supplied from the air tank to the air springs nor air is removed from the air springs to the atmosphere, i.e., in the neutral mode.

Figure 16:
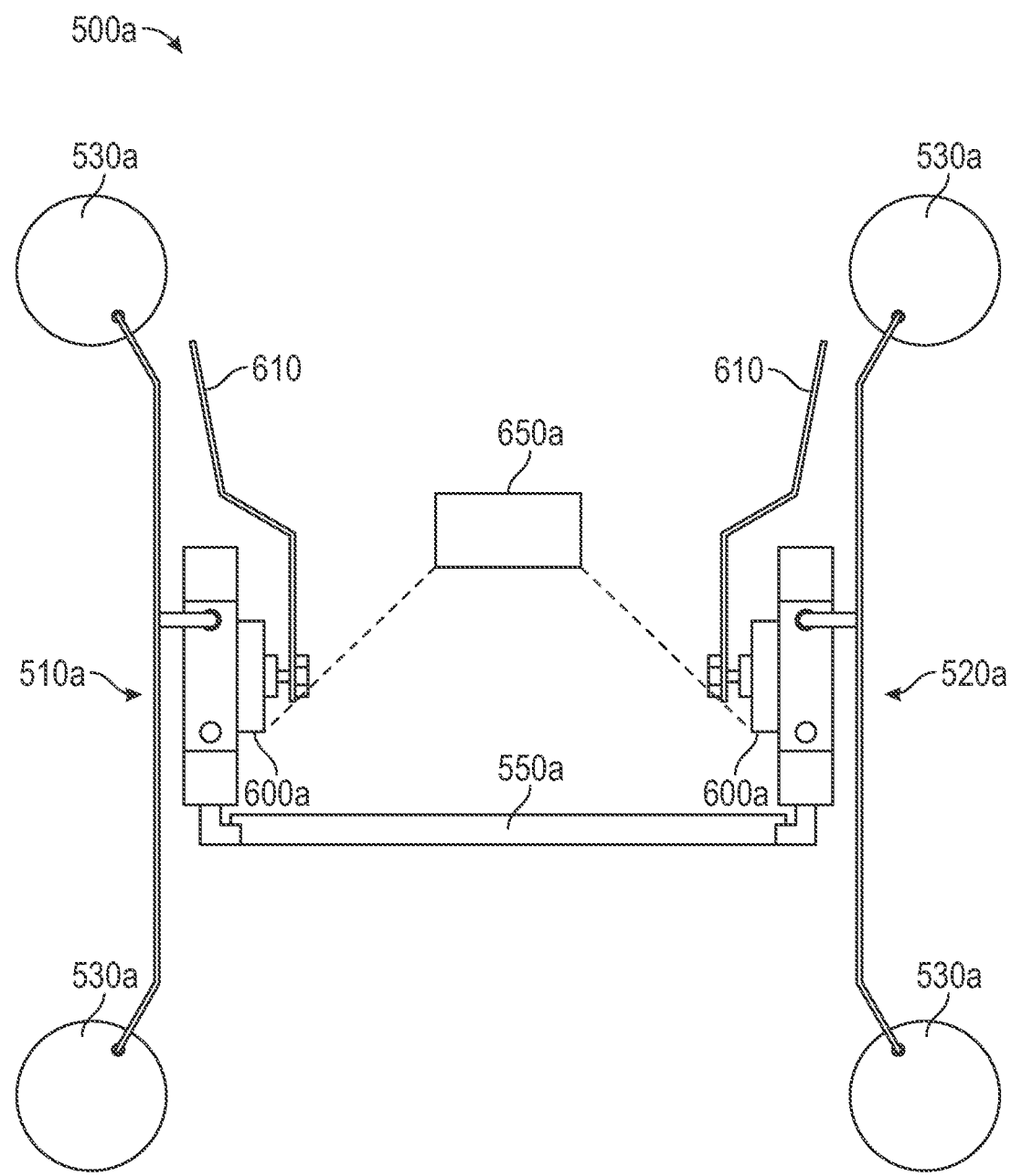
FIG. 16 is a schematic view of an air management system according to the present invention.
Figure 17:
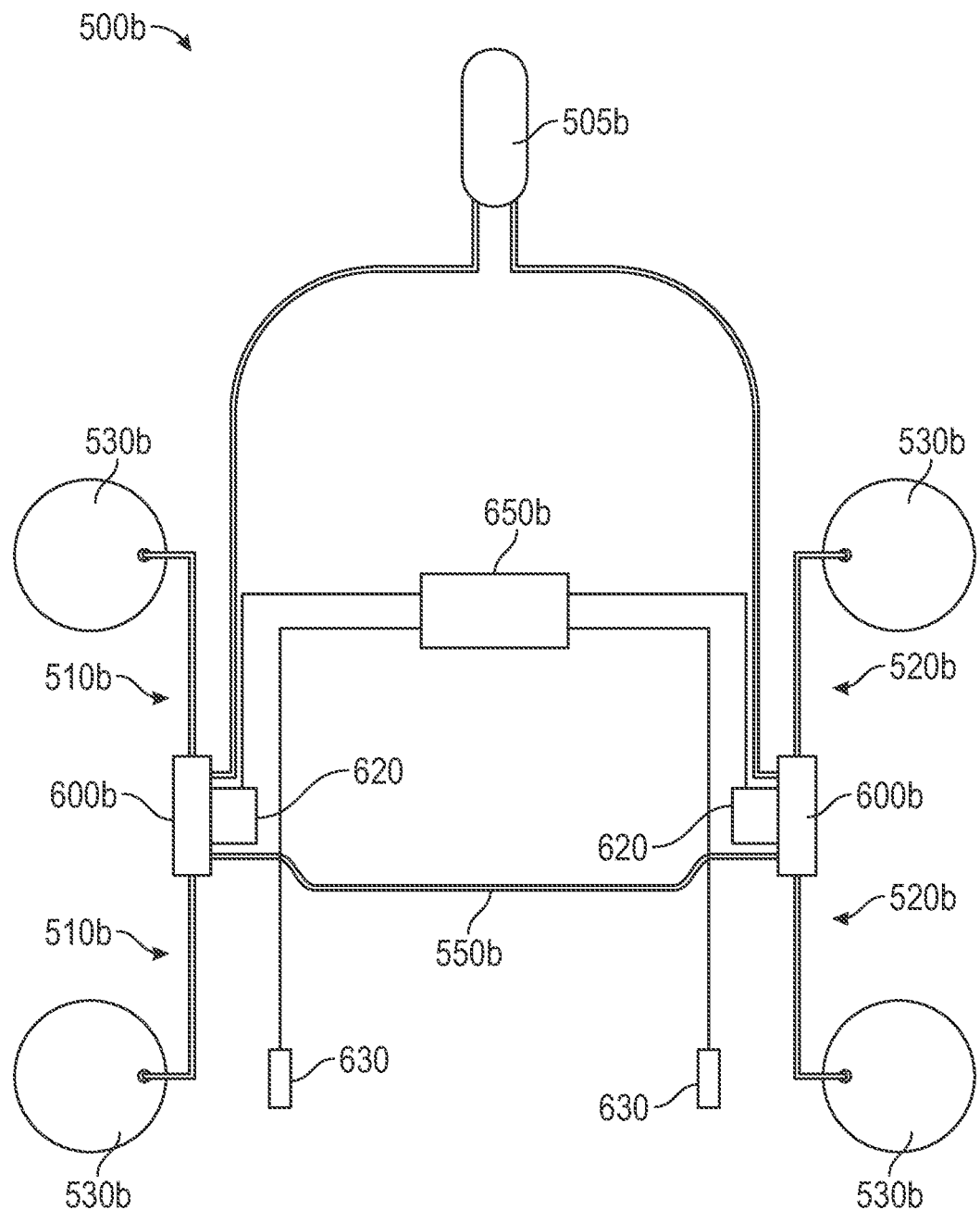
FIG. 17 is a schematic view of an air management system according to the present invention.
Figure 18:
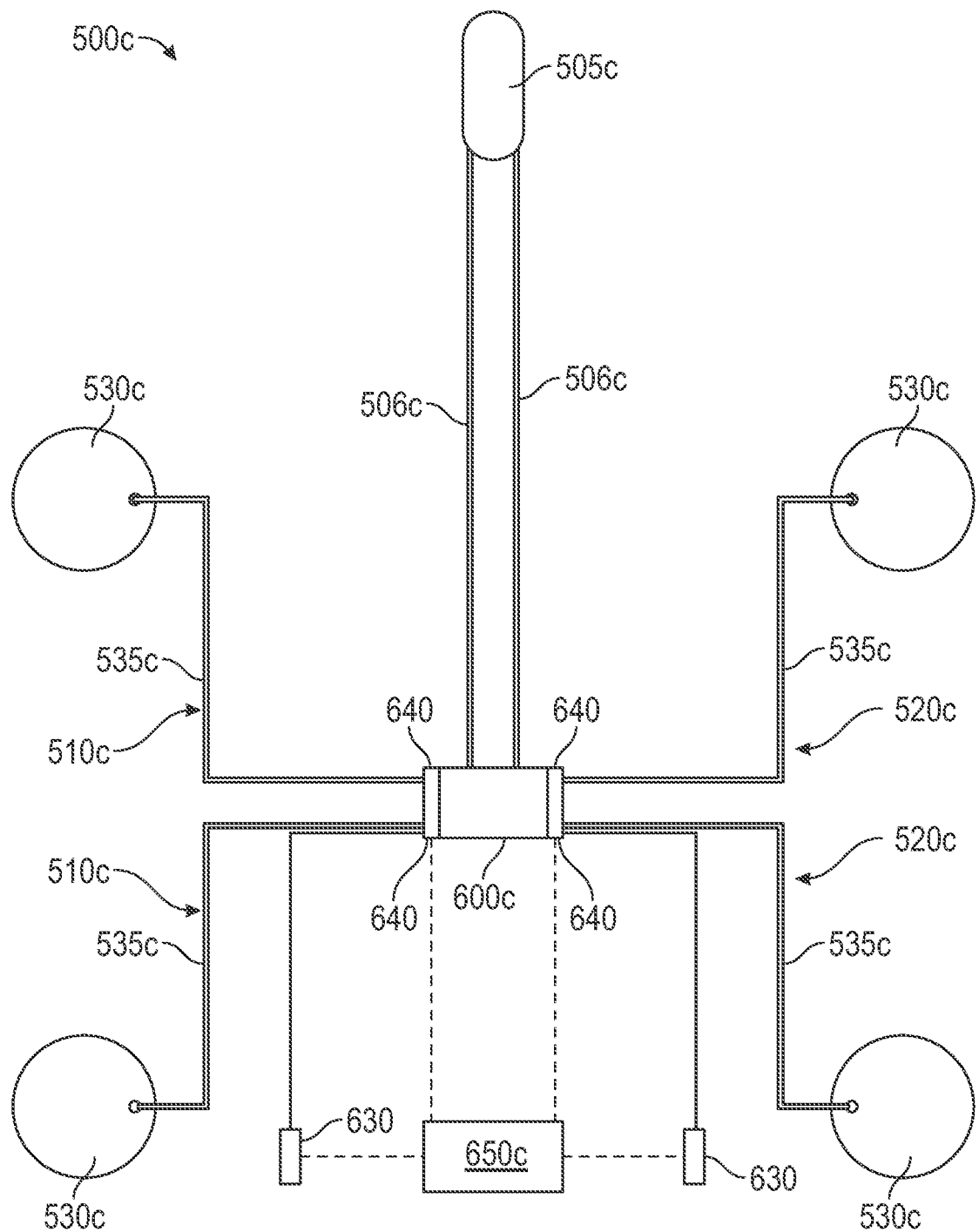
FIG. 18 is a schematic view of an air management system according to the present invention.

FIGS. 16-18 illustrate air management systems that sync control of air flow with an electronic control unit. FIG. 16 shows an air management system 500*a* comprising a first pneumatic circuit 510*a*, a second pneumatic circuit 520*a*, and at least two leveling valves 600*a*. Each pneumatic circuit 510*a*, 520*a*, includes one or more air springs 530*a*. Each leveling valve 600*a* is configured to independently adjust the air flow to one of the first or second pneumatic circuits. The leveling valves 600*a* are linked together by a cross-flow line 550*a* to establish fluid communication between the first and second pneumatic circuits 510*a*, 520*a* when all leveling valves 600*a* are set in the neutral mode. Each leveling valve 600*a* is mechanically actuated by a control arm 610 and includes a control arm sensor (not shown) disposed in the housing of the leveling valve 600*a* to detect the position of the control arm. In one example, the control arm sensor may be a potentiometer. The control arm sensor is in electrical communication with a control unit 650*a*, which may be integrated into ESP, DSC or VSC of the vehicle. The electrical communication may be established by a wired connection or a wireless connection. The control arm sensor is configured to detect the position of the control arm and transmit the position of the control arm to the control unit 650*a* as a control arm position input. The control unit 650*a* is configured to determine vehicle height at each respective side of the vehicle based on the control arm position input.

FIG. 17 shows an air management system 500*b* comprising an air supply tank 505*b*, a first pneumatic circuit 510*b* connected to the supply tank 505*b*, a second pneumatic circuit 520*b* connected to the supply tank 505*b*, and at least two leveling valves 600*b*, in which each leveling valve is configured to control independently the air flow to one of the first or second pneumatic circuits 510*b*, 520*b*. In other configurations of the air management system 500*b*, the air management system may have more than one air supply tank 505*b*. Each pneumatic circuit 510*b*, 520*b*, includes one or more air springs 530*b*. Each leveling valve 600*b* includes a valve element (not shown) configured to move between a plurality of positions including a neutral position, a supply position, and an exhaust position. In one example, the valve element may be a poppet, a plunger, etc. When the valve element is set in the neutral position, the port neither supplies air to the air springs from the air tank nor removes air from the air springs to the atmosphere. Each leveling valve 600*b* is electronically actuated by an electronic actuator 620. In one example, the electronic actuator 620 may be a solenoid, a motor, etc. As shown in FIG. 17, the leveling valves 600*b* are connected together by a cross-flow line 550*b* to establish fluid communication between the first and second pneumatic circuits 510*b*, 520*b* when all valve elements are set in the neutral position. The air management system further includes a plurality of leveling sensors 630, including at least one leveling sensor 630 disposed at each side of the vehicle to detect vehicle height positions, air pressure of a respective air spring, or any other information pertinent to vehicle stability. The level sensors 630 are in electrical communication with a control unit 650*b*. The electrical communication may be established by a wired connection or a wireless connection. Each leveling sensor 630 is configured to transmit measurements to the control unit 650*b* as a vehicle leveling input. The control unit 650*b* is configured to determine vehicle height at each respective side of the vehicle based on the vehicle leveling input. The control unit 650*b* is further configured to control the electronic actuators 620 at each leveling valve 600*b* to trigger movement of the valve element to a desired position, thereby controlling the air flow to the first and second pneumatic circuits.

In one configuration, the control unit 650*b* is configured to actuate the leveling valves 600*b* to establish cross-flow when the pressure differential or height differential between the air springs of the first and second pneumatic circuits 510*b*, 520*b* are within a predetermined threshold. The control unit 650 is configured to actuate the valves 600*b* in the active mode to independently adjust the air pressure of its associated pneumatic circuit when the pressure differential or height differential between the air springs of the first and second pneumatic circuits 510*b*, 520*b* are greater than a predetermined threshold. The control unit 650*b* may determine the pressure or height differential of the air springs 530*b* based on measurement signals received from the sensors 630.

FIG. 18 shows an air management system comprising an air supply tank 505*c*, a first pneumatic circuit 510*c*, a second pneumatic circuit 520*c*, and a manifold 600*c* that, in certain embodiments, is disposed at or near the center of the vehicle. In other configurations of the air management system 500*c*, the air management system may have more than one air supply tank 505*c*. The manifold 600*c* is connected to the supply tank 505*c* by one or more supply lines 506*c*. Each pneumatic circuit 510*c*, 520*c*, includes one or more air springs 530*c*. The manifold 600*c* includes a plurality of ports 640, including at least one port 640 connected to each air spring 530*c* by a spring line 535*c*. The manifold 600*c* includes a valve element (not shown) disposed at each port 640 to control the flow of air through the port. In one example, the valve element may be a poppet, a plunger, etc. The valve element is configured to move between a plurality of positions including a neutral position, a supply position, and an exhaust position. When the valve element is set in the neutral position, the port neither supplies air to the air springs from the air tank nor removes air from the air springs to the atmosphere. The manifold 600*c* further includes a cross-flow passage (not shown) to establish fluid communication between the first and second pneumatic circuits 510*c*, 520*c* when all the valve elements are set in the neutral position. The manifold 600*c* further includes an electronic actuator (not shown) disposed at each port to trigger movement of the valve element. In one example, the electronic actuator may be a solenoid, a motor, etc. The air management system 500*c* further includes a plurality of leveling sensors 630, including at least one leveling sensor 630 disposed at each side of the vehicle to detect vehicle height positions, air pressure of a respective air spring, or any other information pertinent to vehicle stability. The level sensors 630 are in electrical communication with a control unit 650*c*. The electrical communication may be established by a wired connection or a wireless connection. Each leveling sensor 630 is configured to transmit measurements to the control unit 650c as a vehicle leveling input. The control unit 650c is configured to determine vehicle height at each respective side of the vehicle based on the vehicle leveling input. The control unit 650c is further configured to control the electronic actuators at each port 640 to trigger the movement of the valve element to a desired position, thereby controlling the air flow to the first and second pneumatic circuits 510c, 520c.

In one configuration, the control unit 650c is configured to actuate the manifold 600c to establish cross-flow when the pressure differential or height differential between the air springs of the first and second pneumatic circuits 510c, 520c are within a predetermined threshold. The control unit 650c is configured to actuate the manifold 600c in the active mode to independently adjust the air pressure of its associated pneumatic circuit when the pressure differential or height differential between the air springs of the first and second pneumatic circuits 510c, 520c are greater than a predetermined threshold. The control unit 650c may determine the pressure or height differential of the air springs 530b based on measurement signals received from the sensors 630.

Figure 19:
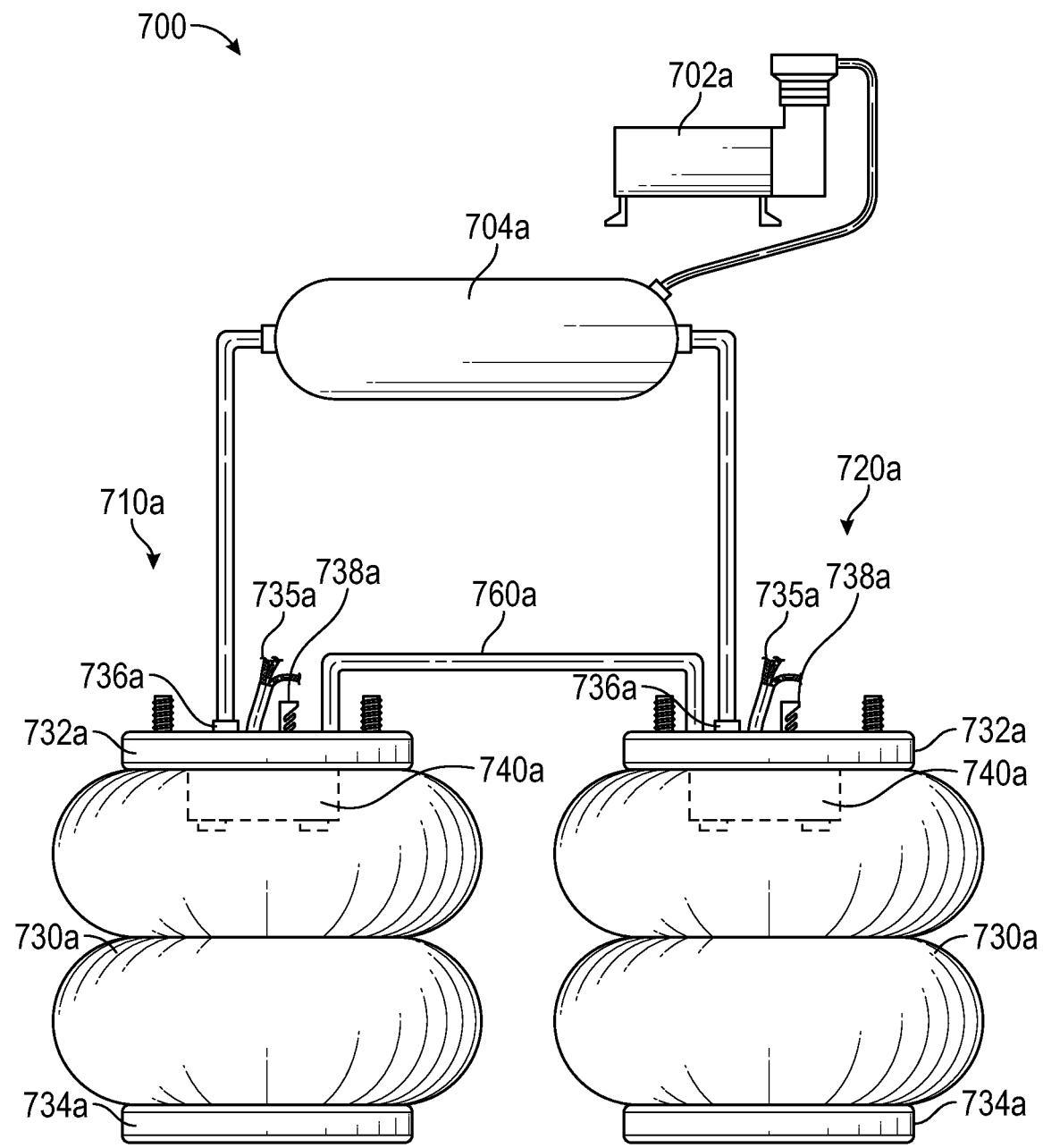
FIG. 19 is a schematic view of an air management system according to the present invention.
Figure 20:
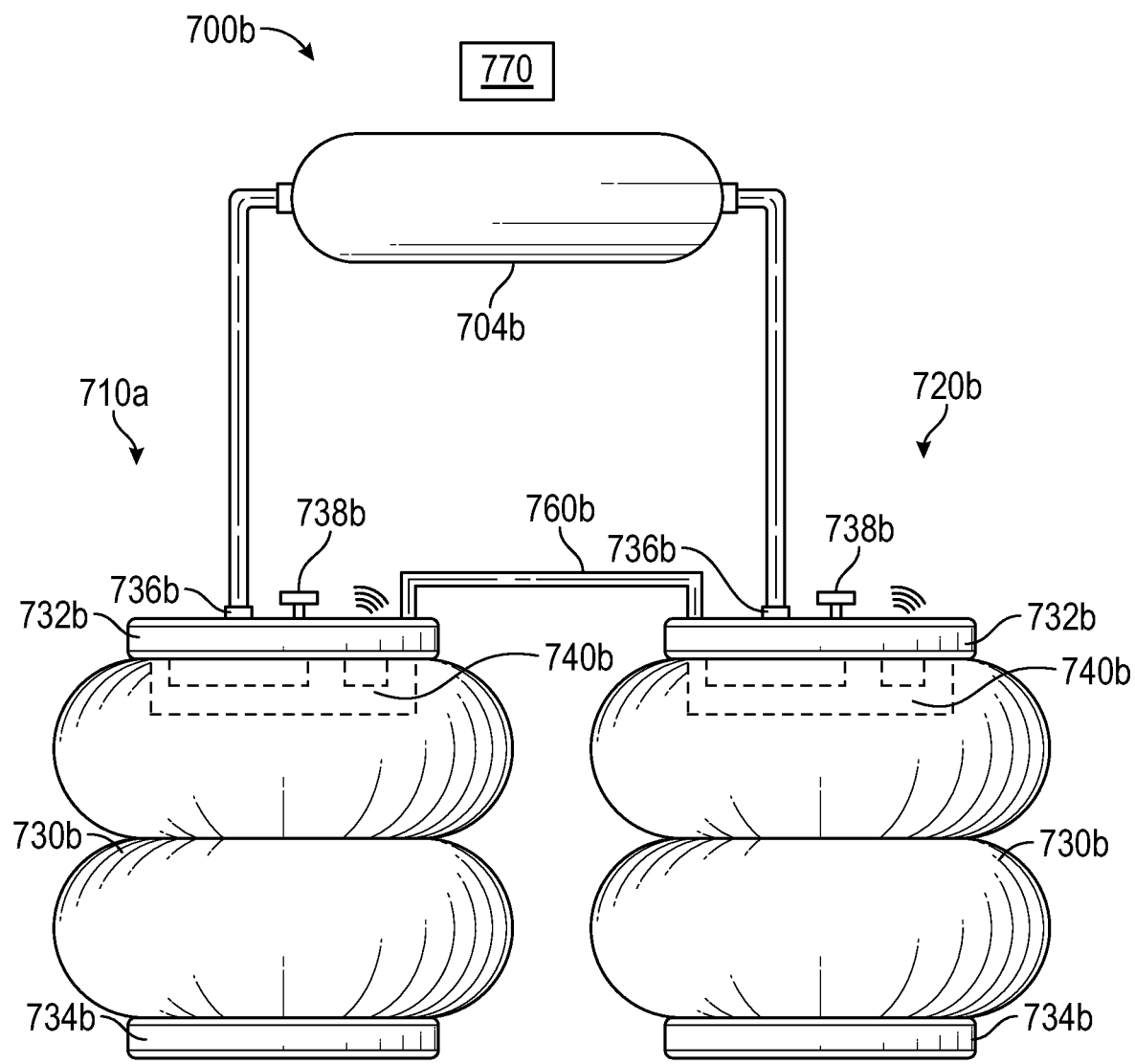
FIG. 20 is a schematic view of an air management system according to the present invention.

FIGS. 19 and 20 illustrate air management systems that sync control of air flow with a control unit associated with each air spring. FIG. 19 shows an air management system 700a comprising an air source 702a, a supply air tank 704a, a first pneumatic circuit 710a disposed on a first side of the vehicle, and a second pneumatic circuit 720a disposed on a second side of the vehicle. Each pneumatic circuit 710a, 720a, includes one or more air springs 730a. Each air spring 730a comprises a control unit 740a disposed within a chamber of the air spring 730a. The control unit 740a comprises a housing 780a mounted to a top plate 732a of the air spring 730a. By being disposed within the air spring 730, the control unit 740a is not exposed to the outside environment, thereby being protected from damage caused by debris or inclement weather conditions. The control unit 740a is configured to adjust the height of the air spring 730b to a desired height that is determined based on one or more operating conditions monitored by the control unit 740a. The control unit 740a may take into account conditions of other air springs 730a of the air management system 700a in determining the desired height for its associated air spring 730a, but the control unit 740a adjusts the height of its associated air spring 730a independent to the other control units 740a of the air management system 700a. As shown in FIG. 19, a cross-flow line 760a connects the control unit 740a of an air spring 730a in the first pneumatic circuit 710a to a control unit 740a of an air spring 730a in the second pneumatic circuit 720a. Each control unit 740a is configured to provide cross-flow between the two air springs 730a of the first and second pneumatic circuits 710a, 720a when neither air is supplied from the air source 702a to the air springs 730a nor air is removed from the air springs 730a to the atmosphere, i.e., in the neutral mode.

Figure 22:
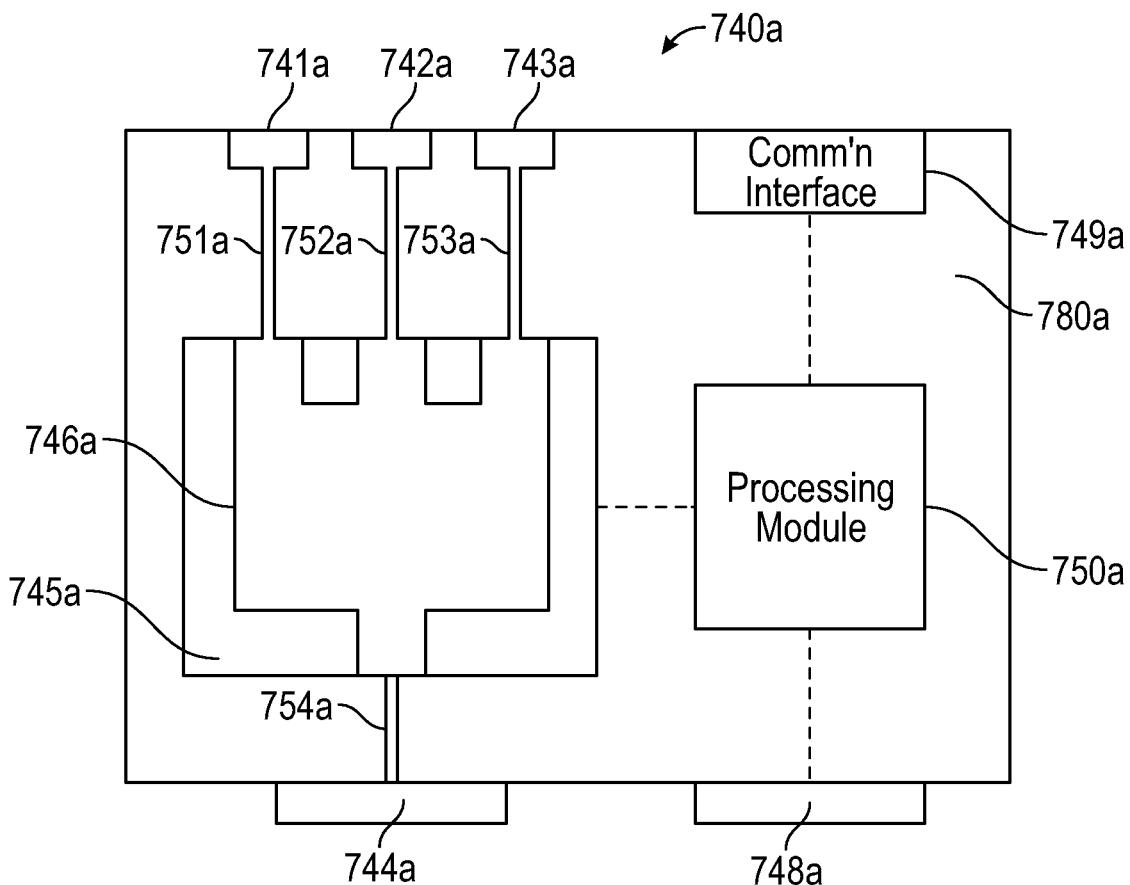
FIG. 22 is a schematic view of a control unit according to the present invention.

Referring to FIGS. 19 and 22, the control unit 740a comprises an inlet port 741a disposed along a first surface of the housing 780a, an outlet port 742a disposed along the first surface of the housing 780a, a cross-flow port 743a disposed along a first surface of the housing 780a, and a delivery port 744a disposed along a second surface of the housing 780a. The control unit 740a comprises a valve chamber 745a and a plurality of passages 751a-754a connecting the delivery port 744a, the inlet port 741a, the outlet port 742a, and the cross-flow port 743a to the valve chamber 745a. The inlet port 741a is configured to connect to a fitting 736a disposed on the top plate 732a, thereby establishing pneumatic communication between the air supply tank 704a and the control unit 740a. The outlet port 742a is configured to connect to an exhaust port 738a disposed on the top plate 732a, thereby establishing pneumatic communication between the atmosphere and the control unit 740a. The cross-flow port 743a is configured to connect to the cross-flow line 760a, thereby establishing pneumatic communication between a control unit 740a of a first air spring 730a and a control unit 740a of a second air spring 730a. The delivery port 744a is configured to establish pneumatic communication between the valve chamber 745a and the chamber of the air spring 730a such that air may be supplied into or released from the chamber of the air spring 730a.

As shown in FIG. 22, the control unit 740a comprises a valve 746a disposed in the valve chamber 745a for selectively controlling the supply and exhaust of air to and from the chamber of the air spring 730a. The valve 746a is configured to switch between a plurality of modes, including a first mode in which the air is released out of the chamber of the air spring 730a, a second mode in which the air is supplied into the chamber of the air spring 730a, a neutral mode in which the chamber of the air spring 730a is pneumatically connected to the cross-flow line 760a. In the first mode, the valve 746a establishes pneumatic communication between the inlet port 741a and the delivery port 744a. In the second mode, the valve 746a establishes pneumatic communication between the outlet port 742a and the delivery port 744a. When the valve 746a is set in the first or second modes, the valve 746a is independently adjusting the height of its associated air spring 730a (i.e., active mode) such that the valve 746a is not in pneumatic communication with other air springs 730a of the air management system 700a. In the neutral mode, the valve 746a establishes pneumatic communication between the cross-flow port 743a and the delivery port 744a, resulting in cross-flow between its associated air spring 730a and a second air spring 730a disposed on an opposite side of the vehicle.

The valve 746a may take any suitable form or configuration, such as a two-way, three-way, or variable position valve, to selectively control the flow of air in and out of the chamber of the air spring 730a at a plurality of flow rates. In one example (not shown), the valve 746a comprises a rotary member disposed in the valve chamber and an electronic actuator operatively linked to the rotary member. In one configuration, the electronic actuator is a stepper motor. The rotary member is configured to rotate between a plurality of positions including a first position establishing pneumatic communication between the inlet port and the delivery port, a second position establishing pneumatic communication between the outlet port and the delivery port, and a third position establishing pneumatic communication between the delivery port and the cross-flow port. The electronic actuator (e.g., stepper motor) is configured to receive energy from a power source and actuate movement of the rotary member between the plurality of positions. In some configurations, the rotary member is a disk comprising a plurality of holes configured to selectively overlie the plurality of passages at the first, second, and third positions, and the stepper motor includes a shaft that is rotatably coupled to the disk. In some configurations, the stepper motor is configured to actuate movement of the rotary member to a plurality of positions such that the volumetric flow rate for supplying or removing air from the chamber may vary at each respective position of the rotary member. Accordingly, the stepper motor may actuate movement of the rotary member to a first position, in which air is supplied or removed from the chamber of the air spring 730a at a first rate, and the stepper motor may actuate movement of the rotary member to a second position, in which air is supplied or removed from the chamber of the air spring 730a at a second rate that is greater or less than the first rate.

In another example (not shown), the valve 746a may include a plunger received in the valve chamber 745a and a solenoid operatively connected to the plunger. The plunger is configured to slide within the valve chamber 745a between a plurality of positions, including a first position establishing pneumatic communication between the inlet port and the delivery port, a second position establishing pneumatic communication between the outlet port and the delivery port, and a third position establishing pneumatic communication between the delivery port and the cross-flow port. The solenoid is configured to receive energy from a power source and actuate movement of the plunger between the plurality of positions. In some configurations, the solenoid is configured to actuate movement of the plunger to a plurality of positions such that the volumetric flow rate for supplying or removing air from the chamber may vary at each respective position of the plunger.

Figure 26A:
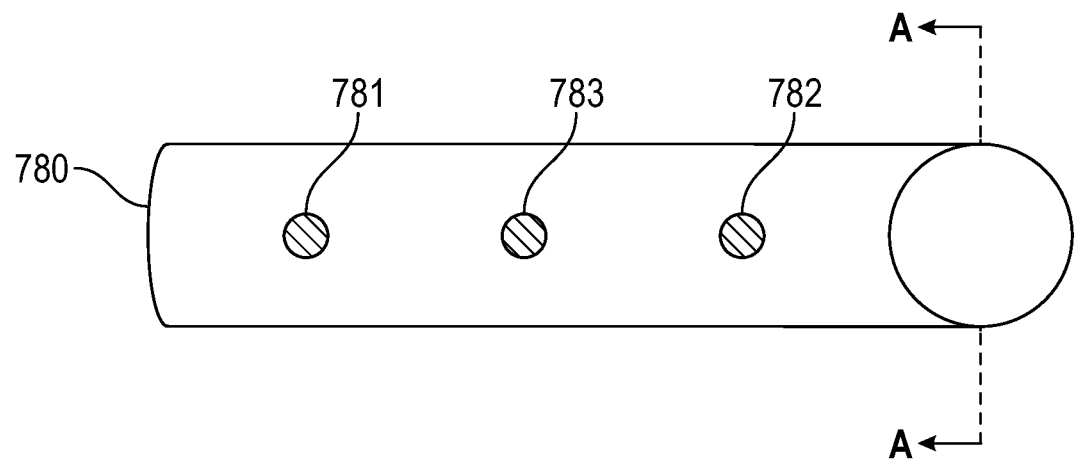
FIG. 26A is a schematic view of a valve according to the present invention.
Figure 26B:
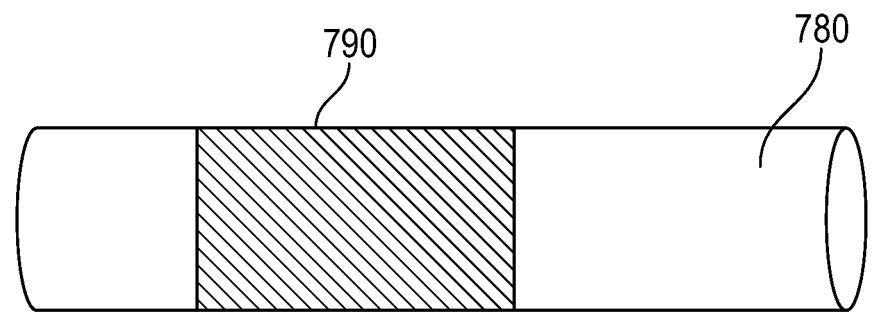
FIG. 26B is a cross-section view of a valve according to the present invention taken along line A in FIG. 26A.
Figure 27:
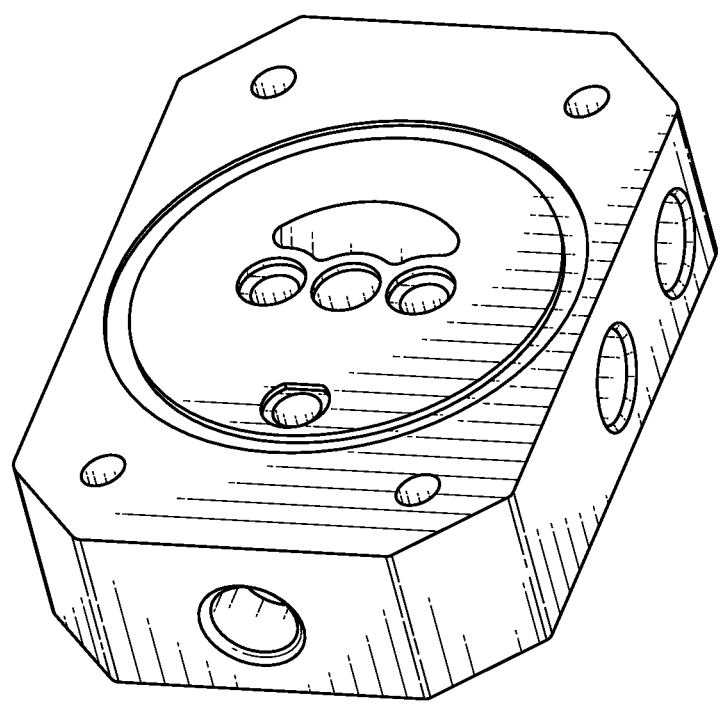
FIG. 27 is a top perspective view of a lower housing according to the present invention.
Figure 28:
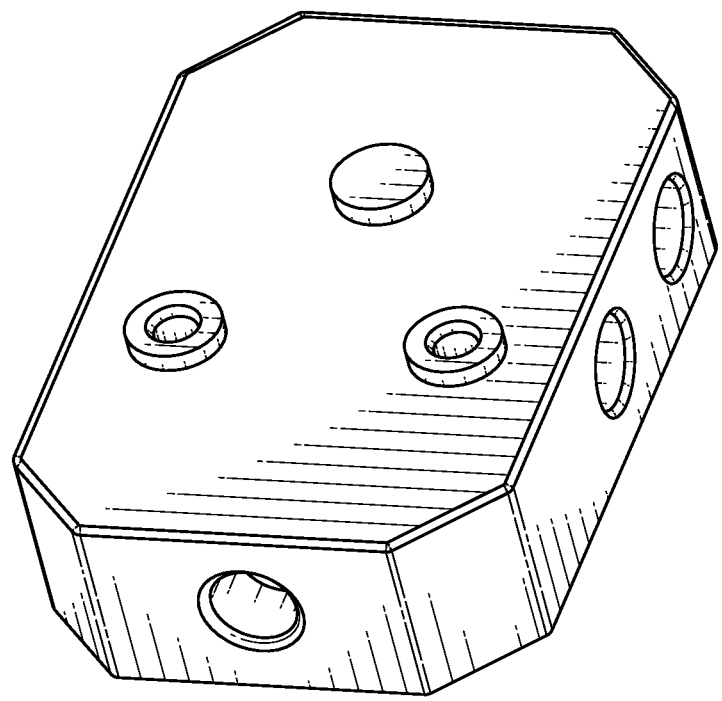
FIG. 28 is a bottom perspective view of a lower housing according to the present invention.
Figure 29:
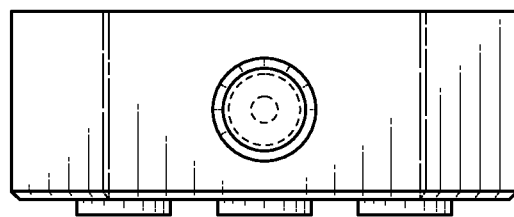
FIG. 29 is an end view of a lower housing according to the present invention.
Figure 30:
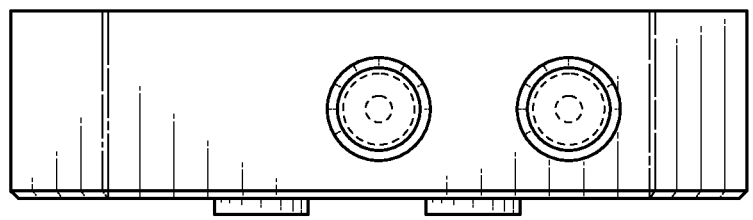
FIG. 30 is a side view of a lower housing according to the present invention.
Figure 31:
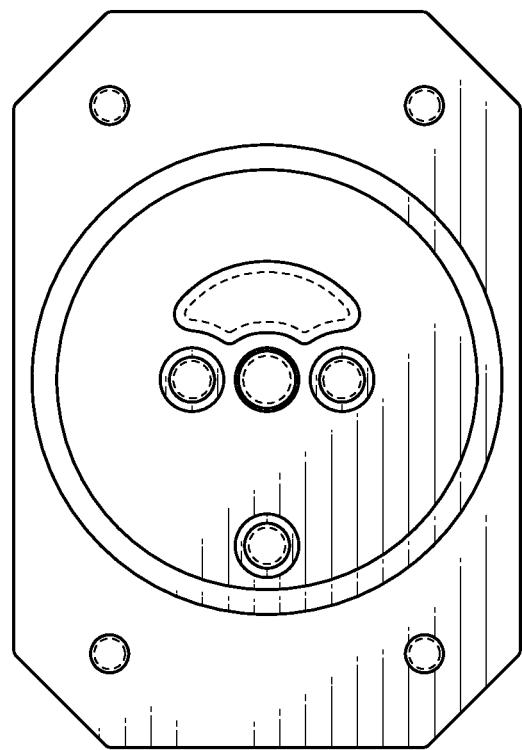
FIG. 31 is a top plan view of a lower housing according to the present invention.
Figure 32:
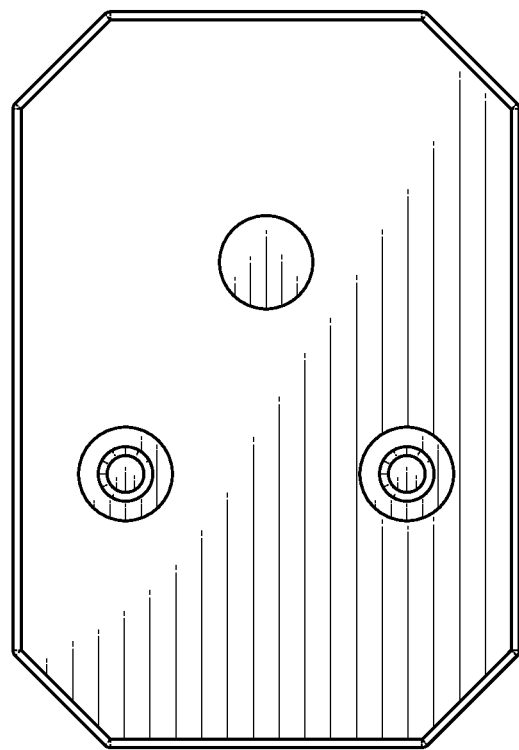
FIG. 32 is a bottom plan view of a lower housing according to the present invention.
Figure 33:
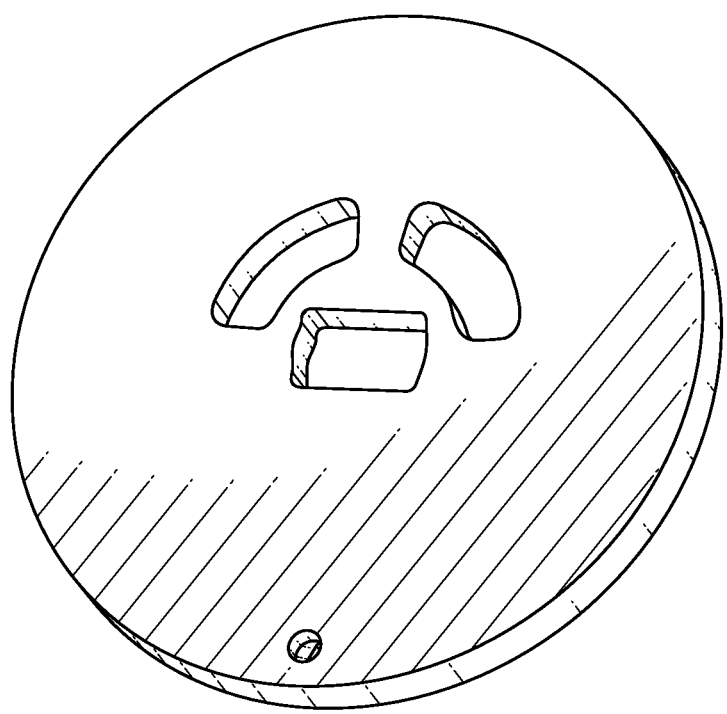
FIG. 33 is a perspective view of a rotary disk according to the present invention.
Figure 34:
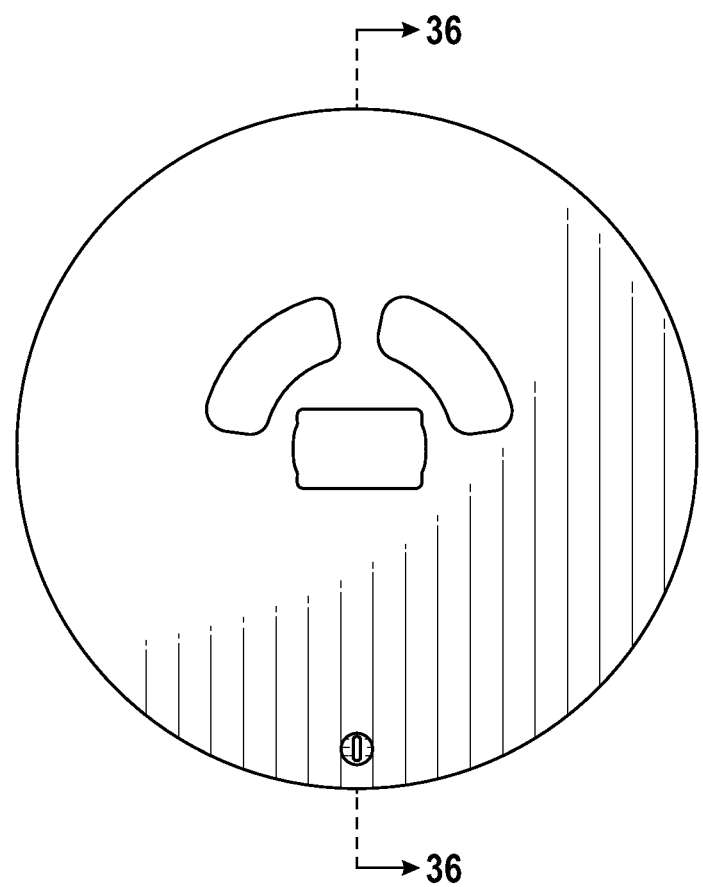
FIG. 34 is a top plan view of a rotary disk according to the present invention.
Figure 35:
FIG. 35 is a side view of a rotary disk according to the present invention.
Figure 36:
FIG. 36 is a side cross-sectional view of a rotary disk according to the present invention taken along line 36 in FIG. 34.
Figure 37:
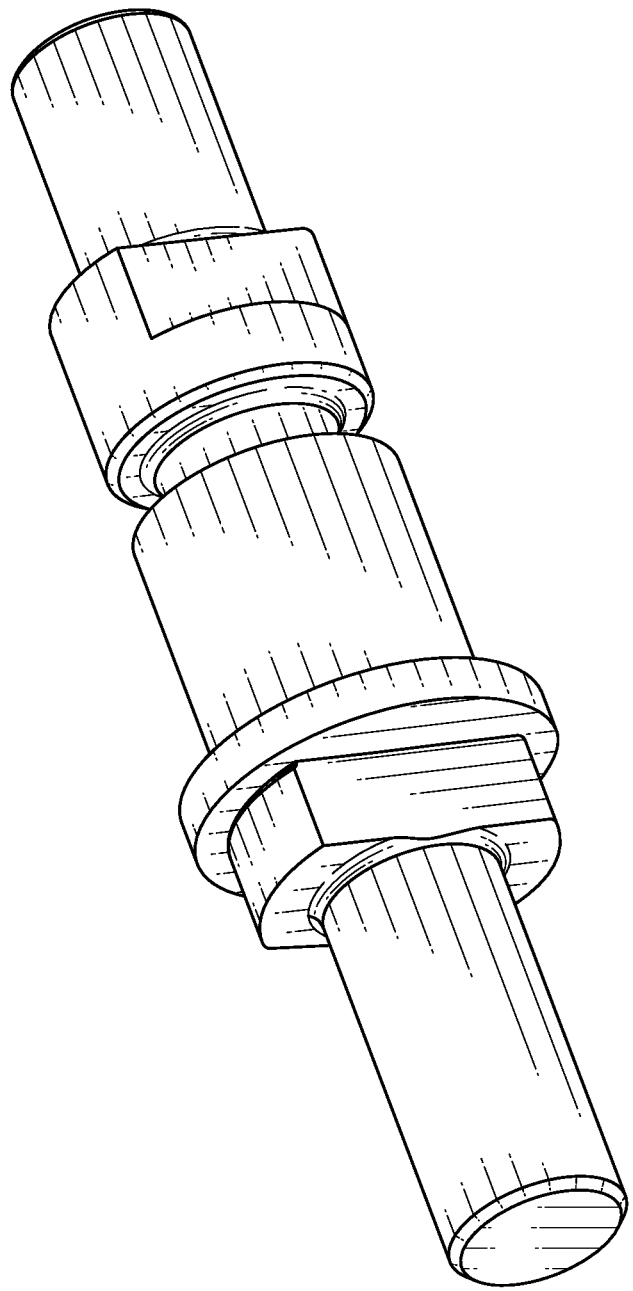
FIGS. 37 and 38 are perspective views of a shaft according to the present invention.
Figure 38:
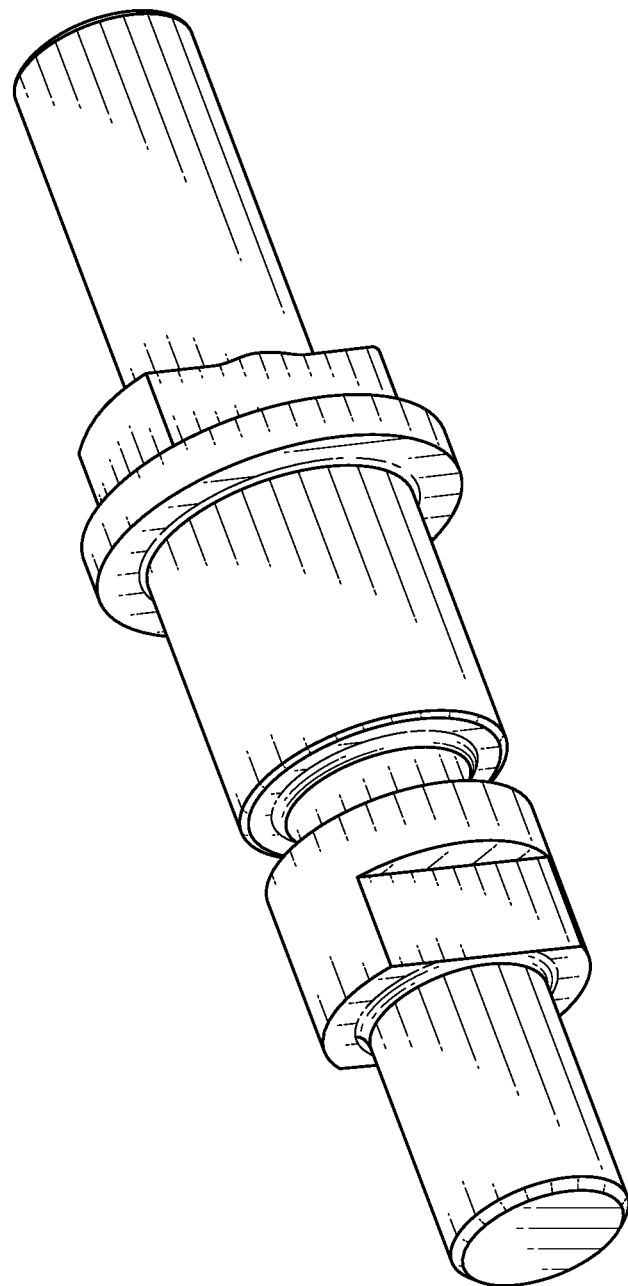
Figure 39:
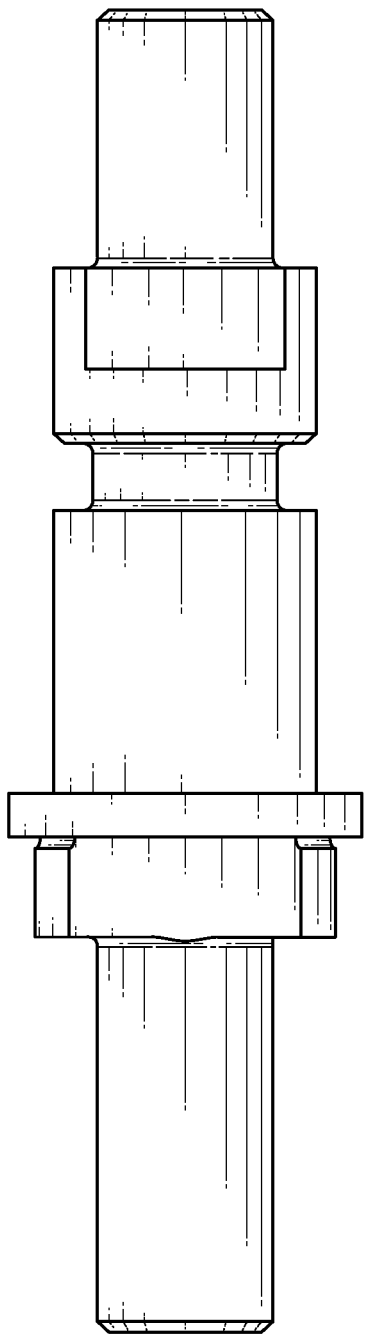
FIG. 39 is a side view of a shaft according to the present invention.
Figure 41:
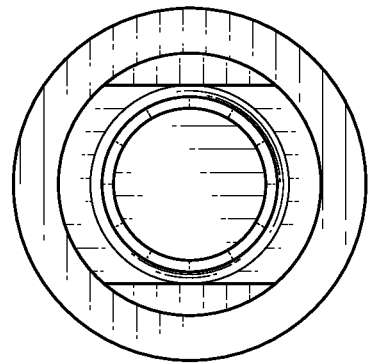
FIG. 41 is a top end view of a shaft according to the present invention.
Figure 40:
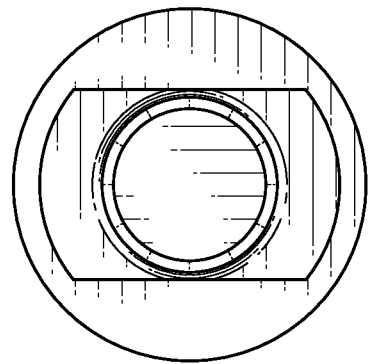
FIG. 40 is a bottom end view of a shaft according to the present invention.
Figure 42:
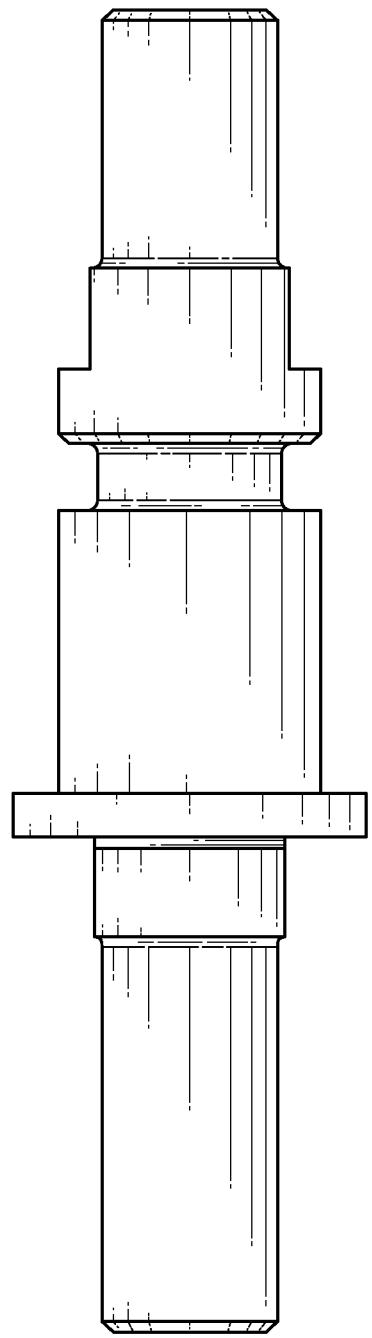
FIG. 42 is a side view of a shaft according to the present invention.

In another example as shown FIGS. 26A and 26B, the valve 746a may include a cylindrical-shaped manifold 780 and a throttle element 790 telescopically received in the manifold 780 such that the throttle element 790 is in sliding engagement with the interior surface of the manifold 780. In one configuration, the manifold 780 includes a plurality of openings 781-783 disposed along a surface of the manifold 780. The plurality of openings 781-783 include a first opening 781 disposed approximate a first end of the manifold 780, a second opening 782 disposed approximate a second end of the manifold 780, a third opening 783 disposed between the first and second openings 781, 782. The first opening 781 is configured to provide pneumatic communication between the inlet port 741a and the delivery port 744a of the control unit 740a. The second opening 782 is configured to provide pneumatic communication between the chamber of the air spring and the outlet port 742a of the control unit 740a. The third opening 783 is configured to provide pneumatic communication between the cross-flow port 743a and the chamber of the air spring.

In one configuration, the throttle element 790 is configured to receive an electric signal and slide along the longitudinal axis of the manifold 780 in response to receiving an electric signal. By sliding along the longitudinal axis of the manifold 780, the throttle element 790 is configured to control the exposure of the first, second, and third openings 781-783 such that the valve 746a is configured to selectively supply air, remove air, or establish cross-flow for the associated air spring 730a. The displacement of the throttle element 790 further controls the rate of air flow through the control unit 740a. The throttle element 790 may further be set in a position that isolates the air spring 730a from all other components of air management system 700 such that the air pressure of the air spring 730a remains static.

In another configuration (not shown), the throttle element is configured to rotate about the longitudinal axis of the manifold in response to receiving an electric signal. By rotating about the longitudinal axis of the manifold, the manifold is configured to control exposure of the first, second, and third openings such that the valve 746a is configured to selectively supply or remove air from the chamber of the air spring. The valve 746a may include an electronic actuator configured to trigger movement of the throttle element along the longitudinal axis of the manifold.

In another configuration (not shown), the manifold includes a plurality of openings disposed along a surface of the manifold. The plurality of openings include a first opening disposed approximate a first end of the manifold, a second opening disposed approximate a second end of the manifold, a third opening disposed between the first and second openings and disposed on an opposite side of the manifold to the first and second openings, and a fourth opening disposed between the first and second openings. The first opening is in direct pneumatic communication with the inlet port 741a. The second opening is in direct pneumatic communication with the outlet port 742a. The third opening is in direct pneumatic communication with the delivery port 744a. The fourth opening is in direct pneumatic communication with the cross-flow port 143a. In one configuration, the throttle element is configured to receive an electric signal and slide along the longitudinal axis of the manifold in response to receiving an electric signal. By sliding along the longitudinal axis of the manifold, the throttle element is configured to control the exposure of the first, second, third, and fourth openings such that the valve 746a is configured to selectively supply air, remove air, or establish cross-flow for the associated air spring 730a. The displacement of the throttle element further controls the rate of air flow through the control unit 740a. The throttle element may further be set in a position that isolates the air spring from all other components of air management system 700 such that the air pressure of the air spring remains static.

In another configuration (not shown), the throttle element is configured to rotate about the longitudinal axis of the manifold in response to receiving an electric signal. By rotating about the longitudinal axis of the manifold, the manifold is configured to control exposure of the first, second, and third openings such that the valve 746a is configured to selectively supply or remove air from the chamber of the air spring. The valve 746a may include an electronic actuator configured to trigger movement of the throttle element along the longitudinal axis of the manifold.

The control unit 740a comprises one or more sensors 748a, a communication interface 749a, and a processing module 750a operatively linked to the one or more sensors 748a and the communication interface 749a. In some configurations, the control unit 740a may comprise a power source (not shown), such as a rechargeable battery and/or a supercapacitor integrated with the housing 780a of the control unit 740a or external to the housing 780a of the control unit 740a, to provide operating power to the one or more sensors, communication interface, and processing module. The power source may be operatively linked to the power supply of the vehicle to receive a recharging current. In other configurations (not shown), the housing of the control unit 740a may extend above the top plate such that the valve chamber, the valve, and the processing module are mounted above the top plate and disposed outside the chamber of the air spring.

The one or more sensors 748a may be any suitable configuration or device for sensing a condition of the vehicle or any of the components of the air management system. In one example, the one or more sensors 748a include a height sensor configured to continuously monitor the axial distance between the top plate 732a and a base plate 734a of the air spring 730a. The height sensor is configured to generate a signal indicating a height or distance associated with the air spring 730a, such as the axial distance between the top plate 732a and the base plate 734a. In one configuration, the height sensor may be a ultrasonic sensor, in which sensor transmits ultrasonic waves, detects the waves reflected from base plate 734a, and determines the axial separation between the top and base plate based on the detected waves.

In another configuration, the height sensor may be an infrared sensor, in which the sensor transmits an infrared light by a transmitter, receives a reflected infrared light by a receiver, and determines the axial separation between the top and base plates based on the amount of infrared radiation reflected back to the receiver. The height sensor may be any other suitable type or configuration for monitoring the height of the air spring 730*a*, such as a potentiometer, linear position transducer, a laser sensor, or an electromagnetic wave sensor. In another example, the one or more sensors may include a pressure sensor configured to continuously monitor the internal air pressure of the air spring 730*a* and generate a signal indicating the internal air pressure of the air spring 730*a*. In one configuration, the pressure sensor is a pressure transducer.

The communication interface 749*a* may be any suitable device or component for relaying analog or digital signals to, from, and between the processing module 750*a* and the control units 740*a* of other air springs 730*a* of the air management system 700*a* and/or other vehicle operating systems. In the illustrated configuration shown in FIG. 19, the air spring 730*a* includes a plurality of leads 735*a* that connect the control unit 740*a* to the control units 740*a* of other air springs 730*a* of the air management system 700*a* and other vehicle operating systems, such as a CAN, RSC, ESC, ABS, PTC, AEB, collision avoidance systems, etc. The communication interface 749*a* is configured to receive any signals received from the wired leads 735*a* and relay those signals to the processing module 750*a*. The communication interface 749*a* is configured to receive any signals generated by the processing module 750*a* and transmit those signals over the wired leads to the control units 740*a* of other air springs 730*a* of the air management system 700 and other vehicle operating systems. Accordingly, the control unit 740*a* for each air spring 730*a* may be in electrical communication with the control units 740*a* of the other air springs 730*a* of the air management system 700 such that the control unit may directly transmit and receive data or commands to and from the control units 740*a* of the other air springs 730*a* without relaying the signals through other system components.

The processing module 750*a* of the control unit 740*a* may be any suitable device or component for receiving input signals from the one or more sensors 748*a* and the communication interface 749*a* and outputting commands to adjust height of the air spring 730*a* to a desired height based on the received input signals. The processing module 750*a* may comprise one or more processors, central processing units, application specific integrated circuits, microprocessors, digital signal processors, microcontrollers or microcomputers. The processing module 750*a* may further comprise memory, such as read-only memory, to store all necessary software that embodies the control strategy and mathematical formulations for the operation of the control unit 740*a*. The processing module 750*a* may comprise an oscillator and clock circuit for generating clock signals that allow the processing module 750*a* to control the operation of the control unit 740*a*. The processing module 750*a* may comprise a driver module, such as a driving circuit, operatively linked to the valve such that the processing module may selectively actuate valve. The processing module 750*a* may signal the driver module to actuate the valve in any suitable manner, such as by pulse width modulation or hit-and-hold actuation. For example, the processing module 750*a* may alter the rotation of the valve by modulating the electronic signal transmitted from the driver module to the electronic actuator of the valve. The processing module 750*a* may comprise a sensor interface for receiving signals generated by the one or more sensors. The processing module 750*a* may comprise an analog-to-digital converter linked to the sensor interface so that analog signals received from the one or more sensors may be converted to digital signals. In turn, the digital signals are processed by the processing module 750*a* to determine one or more conditions of the air spring 730*a*, such as spring height or internal air pressure. Accordingly, the processing module 750*a* is configured to receive all the necessary inputs to calculate a desired air pressure for the air spring 730*a*, determine the necessary air flow rate to alter the air pressure of the air spring 730*a*, and convey commands in terms of supplying or purging air to the valve 746*a* of the control unit 740*a*.

The control unit 740*a* operates as a closed-loop control system to adjust the height of its associated air spring 730*a* to a desired height based on the monitored operating conditions of the vehicle. In operation, the processing module 750*a* receives inputs from the one or more sensors 748*a*, such as the height sensor and the pressure sensor, to determine the height and the internal air pressure of the air spring 730*a*. The processing module 750*a* commands the communication interface 749*a* to transmit signals indicating the spring height and the internal air pressure of the air spring 730*a* to the control units 740*a* of the other air springs 730*a* of the air management system 700*a*. In return, the communication interface 749*a* may receive data signals from the control units 740*a* of the other air springs 730*a* and relay those data signals as inputs to the processing module 750*a*. The processing module 750*a* then determines the desired air pressure for its associated air spring 730*a* based on inputs from the one or more sensors 748*a* and data signals received from the other air springs 730*a* of the air management system 700. In determining the desired air pressure for its associated air spring 730*a*, the processing module 750*a* may take into account the differences in air pressures between all the air springs 730*a* of the air management system 700*a* so that the processing module 750*a* may determine the vehicle pitch and roll rates. The processing module 750*a* determines the flow rate needed to adjust the internal air pressure of its associated air spring 730*a* based on the vehicle roll and pitch rates. In one configuration, the calculated flow rate is based on how fast the height of the air spring 730*a* is changing in response to a load or displacement (i.e., height differential rate). Based on the height differential rate and the internal pressure of the air spring 730*a* and the differences between heights of the air springs 730*a* of the air management system 700*a*, the processing module 750*a* is configured to determine the desired air pressure and flow rate needed to adjust the air spring 730*a* to provide optimal stability and comfort for the vehicle. After determining the desired air pressure and flow rate, the processing module 750*a* is configured to control the flow rate of air being exhausted from or supplied to its associated air spring 730*a*. While each control unit 740*a* may determine the desired air pressure for its associated air spring 730*a* based at least partly on the spring heights of the other air springs 730*a*, each control unit 740*a* acts independent to other control units 740*a* of the air management system. Accordingly, the air pressure for each air spring 730*a* of the air management system may be adjusted at a different rate, which ultimately orients the vehicle in a stable position at a faster rate.

In one configuration, each control unit 740*a* is configured to provide cross-flow between the first and second pneumatic circuits 710*a*, 720*a* when neither air is supplied from the supply tank 704*a* to the air springs 730*a* nor air is removed from the air springs 730*a* to the atmosphere. In operation, each time that the processing module 750a determines that the height or the air pressure of its associated air spring 730a does not need to be adjusted independently, the processing module 750a actuates the valve 746a to switch to its neutral state establishing pneumatic communication between the delivery port 744a and the cross-flow port 743a. The processing module 750a may determine to actuate the valve 746a to its neutral mode based on sensor input signals from its associated sensors 748a and data signals from the control units 740a of the other air springs 730a. In one configuration, the processing module 750a is configured to take into account a difference between a spring height of its associated air spring 730a and a second spring height of the second air spring 730a in determining to actuate the valve between the active mode and the neutral mode. In one configuration, the processing module 750a is configured to take into account a difference between the air pressure of its associated air spring 730a and a second air pressure of the second air spring 730a in determining to actuate the valve 746a between the active mode and the neutral mode. Once each control unit 740a actuates its associated valve 746a to its neutral mode, then pneumatic communication is established between the air spring 730a in the first pneumatic circuit 710a and the air spring 730a in the second pneumatic circuit 720a via the cross-flow line 760a. Accordingly, pressure differences between air springs 730a disposed on opposite sides of the vehicle are eliminated, providing a more stable ride for the vehicle. In various embodiments, the control unit 740 is configured to provide cross-flow between the first and second pneumatic circuits when the vehicle is traveling at any speed, include velocities substantially above zero miles-per-hour or kilometers-per-hour, so that the pressure differences between air springs 730a disposed on opposite sides of the vehicle are eliminated at any time during vehicle operation.

In one configuration, the processing module 750a is configured to receive measurement signals, such as height and pressure measurements of the air spring 730a, from the one or more sensors 748a and data signals from the communication interface 749a. The data signals may include measurement signals from control units 740a of other air springs 730a of the air management system 700. Based on the measurement and data signals, the processing module 750a is configured to calculate a current state of its associated air spring 730a, the current state of the other air springs 730a of the air management system 700, and a dynamic operating state of the vehicle. Based on the calculated current states of the air springs 730a and the dynamic operating state of the vehicle, the processing module 750a is configured to determine to actuate the valve 746a between the active mode and the neutral mode. In one configuration, the processing module 750a is configured to calculate a pressure differential or a height differential between the air springs 730a of the air management system 400 based on the received measurement and data signals. The processing module 750a is configured to actuate the valve 746a in the active mode when the pressure differential or the height differential between the air springs 730a is above a predetermined threshold and actuate the valve in a neutral mode when the pressure differential or height differential is below a predetermined threshold. Accordingly, when there is a substantial height difference between respective sides of the vehicle, the control unit 740a is configured to independently adjust the height of its air spring to bring the vehicle to a level condition at a faster rate. The control unit 740a may actuate the valve 746a in an active mode at any vehicle speed. On the other hand, when there is only a slight height differential between the respective sides of the vehicle that does not trigger a rolling condition, the control unit 740a is configured to mitigate any pressure differential between the air springs by establishing cross-flow between the air springs. The control unit 740a may actuate the valve in a neutral mode at any vehicle speed.

The current state of an air spring may include the current height of the air spring, the current internal pressure of the air spring, the height differential rate of the air spring, and/or the internal pressure differential rate of the air spring. The dynamic operating state of the vehicle may include the vehicle pitch rate and the vehicle roll rate. Vehicle pitch is a relative displacement between the front and rear of a vehicle, which may be represented by a rotation about a lateral axis passing through the center of mass of the vehicle. Accordingly, the vehicle pitch rate refers to the angular motion velocity of the vehicle about its lateral axis, the axis extending from one side to the opposite side of the vehicle. Vehicle roll is a relative displacement between two sides of a vehicle, which may be represented by a rotation about a longitudinal axis passing through the center mass of the vehicle. Accordingly, the vehicle roll rate refers to the angular motion velocity of the vehicle body relative to its longitudinal axis, i.e., the axis that extends from the back of the vehicle to front.

FIG. 20 shows an air management system 700b comprising a supply air tank 704b, a first pneumatic circuit 710b disposed on a first side of the vehicle, and a second pneumatic circuit 720b disposed on a second side of the vehicle. Each pneumatic circuit 710b, 720b, includes one or more air springs 730b. Each air spring 730b comprises a control unit 740b disposed within a chamber of the air spring 730b. The air management system 700b further comprises a system controller 770 that is operatively linked to the air springs 730b. The system controller 770 allows the air management system 700b to selectively supply air to or remove air from each air spring 730b of the air management system 700b. As shown in FIG. 20, a cross-flow line 760b connects the control unit 740b of an air spring 730b in the first pneumatic circuit 710b to a control unit 740b of an air spring 730b in the second pneumatic circuit 720b. The system controller 770 is configured to command each control unit 740b to provide cross-flow between the two air springs 730b of the first and second pneumatic circuits 710b, 720b when neither air is supplied from the supply tank 704b to the air springs 730b nor air is removed from the air springs 730b to the atmosphere, i.e., in the neutral mode.

Figure 23:
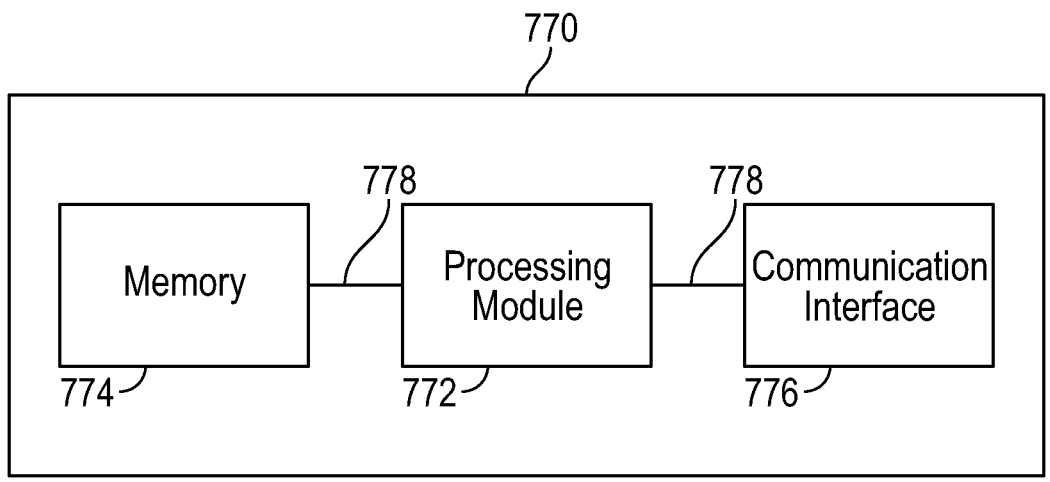
FIG. 23 is a schematic view of a system controller according to the present invention.

As shown in FIG. 23, the system controller 770 comprises a processing module 772 that may consist of one or more processors, central processing units, application specific integrated circuits, microprocessors, digital signal processors, microcontrollers or microcomputers. The system controller 770 comprises memory 774, such as read-only memory or random-access memory, to store all necessary software that embodies the control strategy and mathematical formulations for the operation of the system controller. The system controller 770 comprises a communication interface 776 for relaying signals to, from, and between the processing module 772 and the control units of other air springs 730b of the air management system 700b and/or other vehicle operating systems. The system controller 770 comprises a bus 778 that couples the various components of the system controller to the processing module 772. Accordingly, the system controller 770 is configured to receive all the necessary inputs to calculate a desired air pressure for each air spring 730b of the air management system 700b, determine the necessary air flow rate to alter the air pressure of each air spring 730b of the air management system 700b, and convey commands in terms of supplying or purging air to the control unit 740b of each air spring 730b of the air management system 700b.

Figure 24:
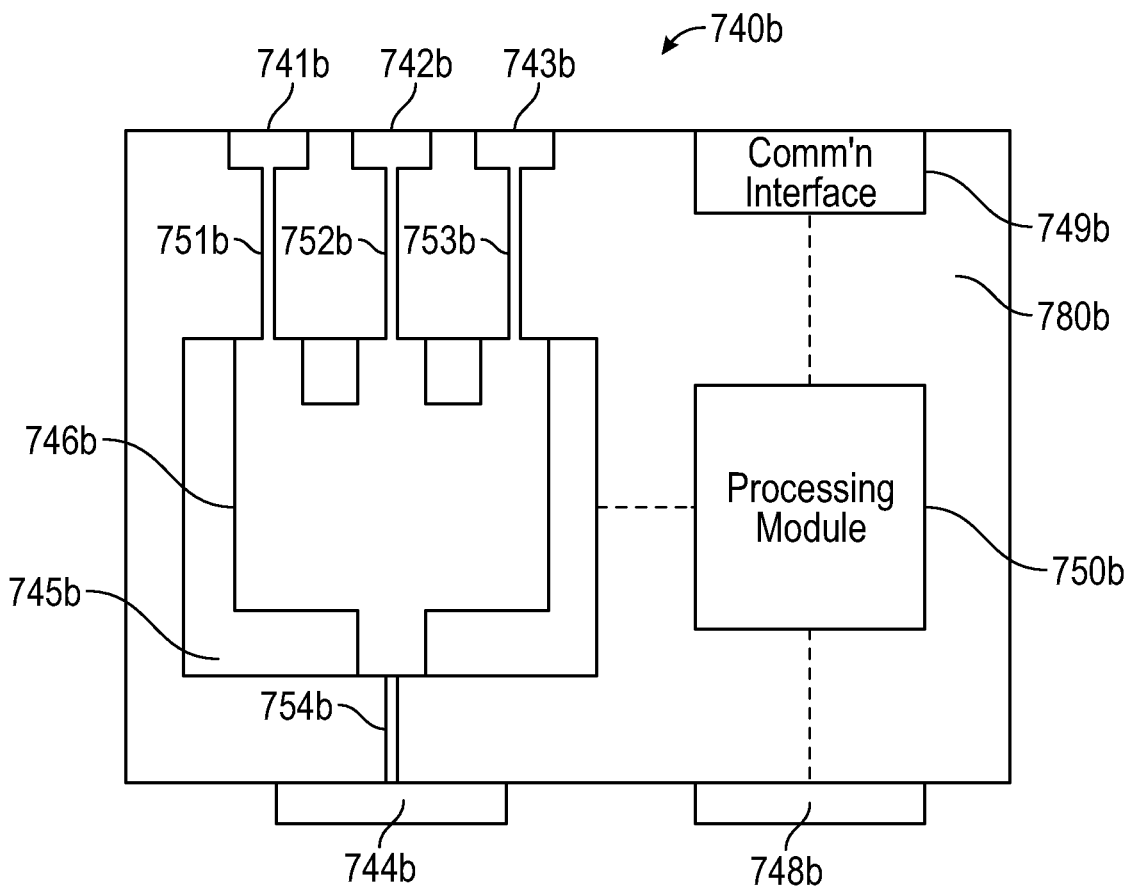
FIG. 24 is a schematic view of a control unit according to the present invention.

Similar to the control unit 740a shown in FIG. 22, the control unit 740b shown in FIG. 24 comprises an inlet port 741b disposed along a first surface of the housing 780b, an outlet port 742b disposed along the first surface of the housing 780b, a cross-flow port 743b disposed along a first surface of the housing 780b, a delivery port 744b disposed along a second surface of the housing 780b, a valve 746b disposed in a valve chamber 745b, one or more sensors 748b, a communication interface 749b, and a processing module 750b operatively linked to the one or more sensors 748b and the communication interface 749b. The control unit 740b differs from the control unit 740a shown in FIG. 22 in that the communication interface 749b comprises an antenna (not shown) that is configured to communicate wirelessly to the system controller 770.

The system controller 770 and the control units 740b are linked together to operate as a closed-loop control system to adjust the height of each air spring 730b to a desired height based on the monitored operating conditions of the vehicle. In operation, each control unit 740b transmits signals indicating the spring height and the internal air pressure of its associated air spring 730b to the system controller 770. In return, the system controller 770 determines the desired air pressure and the desired volumetric flow rate to remove and supply air to and from each air spring 730b based on the signals received from the control units 740b. In determining the desired air pressure for each air spring 730b, the system controller 770 may take into account the differences in air pressures and spring heights between all the air springs 730b of the air management system 700b. After determining the desired air pressure and flow rate for each air spring 730b, the system controller 770 transmits commands to the control unit of each air spring 730b of the air management system 700b, in which the command includes actuating the valves 746b of each control unit 740b between the active and neutral modes.

In one configuration, the system controller 770 is configured to provide cross-flow between the first and second pneumatic circuits 710b, 720b when neither air is supplied from the supply tank 704b to the air springs 730b nor air is removed from the air springs 730b to the atmosphere. In operation, each time that the system controller 770 determines that the height of the air springs 730b do not need to be adjusted independently, the system controller 770 transmits command signals to the control units 740b to actuate its respective valve 746b to its neutral mode. The system controller 770 may determine to command each control unit 740b to switch to its neutral mode based on height measurement signals received from the control units 740b. Once each control unit 740b actuates its associated valve 746b to its neutral mode, then pneumatic communication is established between the air spring 730b in the first pneumatic circuit 710b and the air spring 730b in the second pneumatic circuit 720b via the cross-flow line 760b. Accordingly, pressure differences between air springs 730b disposed on opposite sides of the vehicle are eliminated, providing a more stable ride for the vehicle.

Figure 21A:
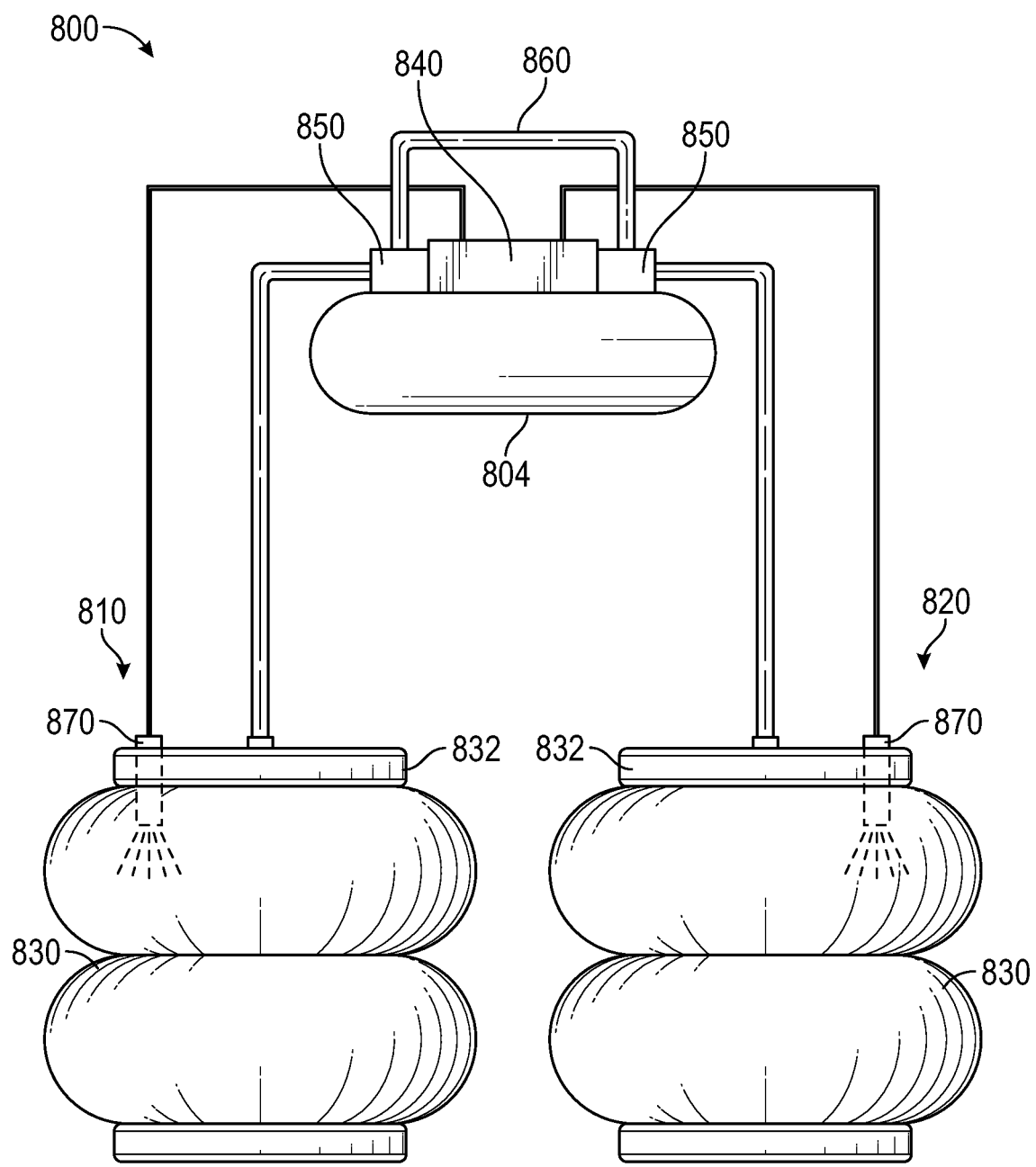
FIG. 21A is a schematic view of an air management system according to the present invention.

FIG. 21A shows an air management system 800 comprising a supply air tank 804, a first pneumatic circuit 810 disposed on a first side of the vehicle, and a second pneumatic circuit 820 disposed on a second side of the vehicle. Each pneumatic circuit 810, 820 includes one or more air springs 830. The air management system 800 further comprises a system controller 840 and a plurality of valves 850 operatively linked to the system controller 840. Referring to FIG. 21A, one of the valves 850 is deposed in the first pneumatic circuit 810, and the other one of the valves 850 is disposed in the second pneumatic circuit 820. The system controller 840 allows the air management system 800 to selectively supply air to or remove air from each air spring 830 of the air management system 800 by actuating the plurality of valves 850.

As shown in FIG. 21A, a cross-flow line 860 connects one valve 850 in the first pneumatic circuit 810 to a valve 850 in the second pneumatic circuit 820, thereby establishing a pneumatic connection between the air springs 830 of the first and second pneumatic circuits 810, 820. Each valve 850 is configured to switch between a plurality of states, including a first mode in which air is released out of the air spring 830, a second mode in which the air is supplied into the spring 830, a neutral mode in which the air spring 830 is pneumatically connected to the cross-flow line 860. The system controller 840 is configured to command each valve 850 to switch to a neutral mode to provide cross-flow between the two air springs 830 of the first and second pneumatic circuits 810, 820 when neither air is supplied from the supply tank 804 to the air springs 830 nor air is removed from the air springs 830 to the atmosphere.

Referring to FIG. 21A, a height sensor 870 is disposed in the top plate 832 of each air spring 830 and is configured to continuously monitor the height of its associated air spring 830. The height sensor 870 may be any suitable device for monitoring the axial height of the air spring, such as the examples described above. Each height sensor 870 is wired to the system controller 840 so that each height sensor 870 may transmit signals indicating the height of its associated air spring 830 to the system controller 840. In other configurations, the air management system 800 may include an air pressure sensor disposed in the top plate of the 832 of each air spring 830. The air pressure sensor is configured to monitor the air pressure of its associated air spring 830 and generate a signal indicating the air pressure of its associated air spring.

Figure 25:
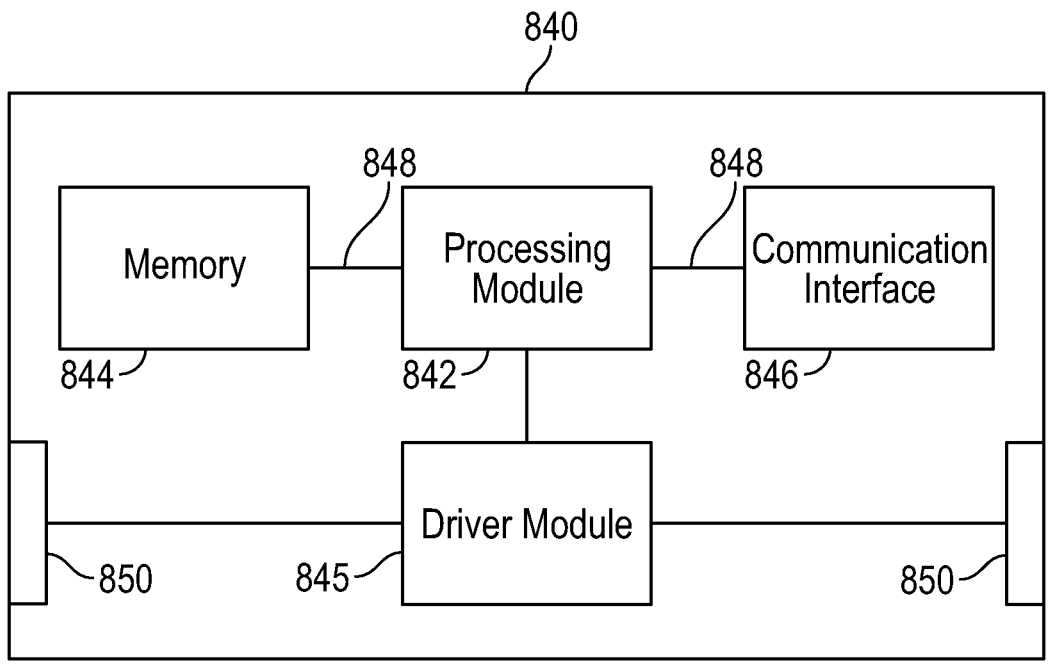
FIG. 25 is a schematic view of a system controller according to the present invention.

Similar to the system controller shown in FIG. 23, the system controller 840 shown in FIG. 25 comprises a processing module 842 for determining the desired air pressure and flow rate for each air spring 830 of the air management system 800, a communication interface 846 for relaying signals to and from the processing module 842 and the height sensors of the air springs 830, a memory 844 for storing all necessary software that embodies the control strategy and mathematical formulations for the operation of the system controller 840, and a bus 848 connecting the communication interface 846 and memory 84 to the processing module 842. The system controller 840 further comprises a driver module 845, such as a driving circuit, operatively linking the processing module 842 to each valve 850 such that the system controller 840 may selectively actuate valve 850. The processing module 842 of the system controller 840 may signal the driver module 845 to actuate the valve 850 in any suitable manner, such as by pulse width modulation or hit-and-hold actuation. Accordingly, the system controller 840 is configured to receive all the necessary inputs to calculate a desired air pressure for each air spring of the air management system 800, determine the necessary air flow rate to alter the air pressure of each air spring 830 of the air management system 800, and actuate at least one of the valves 850 to adjust the air pressure and height of at least one of the springs 830 of the air management system 800.

In one configuration, the system controller 840 is configured to provide cross-flow between the first and second pneumatic circuits 810, 820 when neither air is supplied from the supply tank 804 to the air springs 830 nor air is removed from the air springs 830 to the atmosphere. In operation, each time that the system controller 840 determines that air does not need to be removed or added to the air springs 830, the system controller 840 actuates each valve 850 to its neutral mode. The system controller 840 may determine to actuate the valves 850 to the neutral mode when the pressure differentials between the air springs 830 are within a predetermined tolerance. The system controller 840 may calculate the pressure differentials between the air springs 830 based on signals received from the pressure sensors of the air springs 830. The system controller 840 may determine to actuate the valve 850 to its neutral mode based on height measurement signals received from the height sensors 870. The system controller 840 may take into account the height differences between the air springs 830 when determining whether to actuate the valves to an active mode (i.e., the first or second modes) or a neutral mode. Once each valve 850 is actuated to its neutral mode, then pneumatic communication is established between the air spring 830 in the first pneumatic circuit 810 and the air spring 830 in the second pneumatic circuit 820 via the cross-flow line 860. Accordingly, pressure differences between air springs 830 disposed on opposite sides of the vehicle are eliminated, providing a more stable ride for the vehicle.

Figure 21B:
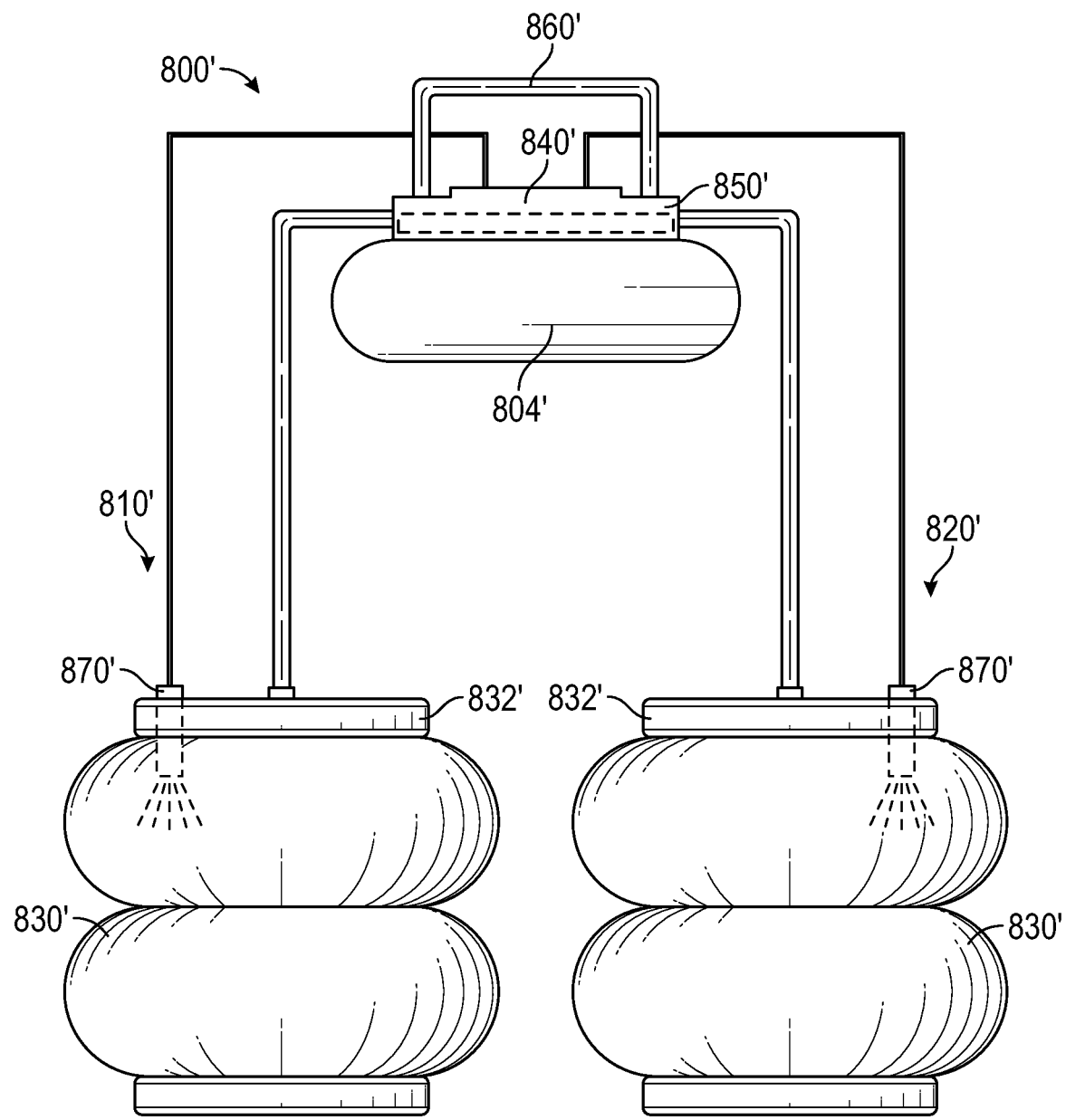
FIG. 21B is a schematic view of an air management system according to the present invention.

FIG. 21B illustrates an air management system 800' according to one configuration of the present invention. The air management system 800' is similar to the air management system 800 of FIG. 21A except that the system controller 840' comprises a single valve 850' that is pneumatically connected to each air spring 830 of the air management system 800'. Accordingly, the system controller 840' may selective supply or remove air from the air springs 830 through the use of only one valve 850'. In one configuration, the system controller 840' is configured to calculate a difference between the air pressures of the air springs 830 based on received measurement signals from the sensor. If the system controller 840' determines that the difference between the air pressures of the air springs 830 is within a predetermined tolerance, then system controller 840' actuates the valve 850' to set the air pressure of each air spring 830 to the same air pressure.

In each configuration of the air management system shown in FIGS. 19-21B, the control units or the system controller may be configured to execute a dump cycle such that the air is released from each air spring of the air management at the same time. In each air management system shown in FIGS. 19-21B, the air management system may include a user interface unit operatively linked to the control units or the system controller and configured transmit a command to the system controller or the control units to execute a dump cycle so that air is released from all the air springs. The user interface unit may be disposed in the vehicle dashboard or configured as an application downloaded on a display device, such as a smartphone or handheld computer.

All the configurations of the air management systems described herein may be incorporated with any type of vehicle, trailer, or towable, including but not limited to, sport-utility vehicles, passenger vehicles, racing vehicles, pick-up trucks, dump trucks, freight carriers, trailers of any type including trailers for boats, cattle, horses, heavy equipment, tractors, agriculture implements (e.g., granular spreaders, fertilizer sprayers and other types of sprayers, feeders and spreaders), liquid hauling vehicles, baffled and unbaffled liquid tankers, machinery, towing equipment, rail vehicles, road-rail vehicles, street cars, and any other type of chassis having air bags, etc.

The air management systems described herein have been found to significantly increase tire life both in terms of reducing wear and resulting in even wear, even when the tires are not rotated. In one exemplary embodiment, it has been observed that truck tires having an average life of 100,000 km when mounted on trucks that were not equipped with the air management systems described herein, experience significantly reduced wear when mounted on identical trucks that are equipped with the air management systems described herein. In certain embodiments, average truck tire life is extended by at least 20%, and in some instances by up to 30%, 40%, 50%, or more. As such, an unexpected and significant financial, time (reduced time waste in rotating, changing, retreading, and replacing tires), and environmental savings is realized as additional surprising advantages of the inventions of this disclosure.

The air management systems described herein have been found to significantly reduce the unsafe effects of wind shears on vehicles traveling at speed, particularly on truck trailers. Wind shears destabilize trucks hauling trailers at highway speeds and have caused such trailers to overturn leading to devastating injuries and losses of life, cargos, and multi-vehicle wrecks. In one exemplary embodiment, trailers and recreational vehicles that are equipped with the air management systems described herein may be significantly more stable and resistant to wind shear forces at highway speeds. As such, an unexpected and significant safety and comfort advantage is realized as additional surprising advantages of the inventions of this disclosure.

The air management systems described herein have been found to significantly reduce road noise, vibrations, and discomfort for drivers, passengers as well as live cargo including livestock, horses and the like. In one exemplary embodiment, it has been observed that road noise, vibrations, and discomfort are significantly reduced such that drivers that could previously drive large vehicles only a few hundred miles per day due to discomfort were able to drive significantly longer distances due to the reduction in aches, pains, discomfort and fatigue, which was achieved from very noticeably improved ride quality and stability. As such, an unexpected and significant comfort advantage is realized as additional surprising advantages of the inventions of this disclosure.

The air management systems described herein have been found to significantly reduce or even eliminate vehicle nose-diving when braking. Such nose-diving can create unsafe conditions, is highly uncomfortable for drivers and passengers, and puts increased stress on numerous vehicle components. By reducing and in many cases eliminating such nose-diving, an unexpected and significant safety and comfort advantage is realized as additional surprising advantages of the inventions of this disclosure.

The air management systems described herein have been found to significantly increase traction resulting in improved handling, even in slippery conditions. In one exemplary embodiment, it has been observed that trucks requiring use of four-wheel drive mode (when not equipped with the air management systems described herein) to drive through uneven and/or slippery terrain were able to be drive through the same terrain in two-wheel drive mode without losing traction and becoming immobilized. As such, an unexpected and significant safety and utility advantage is realized as additional surprising advantages of the inventions of this disclosure.

The air management systems described herein may enhance brake performance. In vehicles equipped with electronic stability systems, e.g., any electronic stability control (ESC), including, but not limited to electronic stability program (ESP), dynamic stability control (DSC), vehicle stability control (VSC), automatic traction control (ATC), the air management systems described herein have been found to reduce the incidence rate of such electronic systems applying brakes because the vehicle is maintained in a level and stable position, and thereby avoids activation of such electronic systems, which may enhance brake performance and life.

In the present context, the phrase "adjust independently" refers to a state in which the leveling valve is adjusting the air pressure of air springs in one pneumatic circuit while the leveling valve is not in pneumatic communication with any components of another pneumatic circuit.

As used herein, the terms "substantially" and "substantial" refer to a considerable degree or extent. When used in conjunction with, for example, an event, circumstance, characteristic, or property, the terms can refer to instances in which the event, circumstance, characteristic, or property occurs precisely as well as instances in which the event, circumstance, characteristic, or property occurs to a close approximation, such as accounting for typical tolerance levels or variability of the examples described herein.

As used herein, the term "about" when used in connection with a numerical value should be interpreted to include any values which are within 5% of the recited value. Furthermore, recitation of the term about and approximately with respect to a range of values should be interpreted to include both the upper and lower end of the recited range.

As used herein, the terms "attached," "connected," or "fastened," may be interpreted to include two elements that are secured together with or without contacting each other.

The present disclosure includes methods, kits, and systems for retrofitting vehicles that have been manufactured without air springs including but not limited to coil spring or leaf spring suspension systems. A symmetrically dynamic equalized volume and pressure distributing air management system may be installed as a retrofit on such vehicles by providing a kit comprising an air tank, a compressor, a symmetrically dynamic equalized volume and pressure distributing pneumatic valve on each of the left and right sides of the vehicle, at least one air spring connected to each symmetrically dynamic equalized volume and pressure distributing pneumatic valve, and a plurality of air hoses connecting the air management system components as described and illustrated herein. In some configurations of the present disclosure, the plurality of air hoses may have equal lengths and diameters.

In the appended claims, the term "including" is used as the plain-English equivalent of the respective term "comprising." The terms "comprising" and "including" are intended herein to be open-ended, including not only the recited elements, but further encompassing any additional elements. Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure. Various embodiments of the invention comprise one or more of the following items:

1. An air management system for a vehicle, the air management system comprising: a first pneumatic circuit having a first leveling valve configured to adjust independently the height of a first side of the vehicle; a second pneumatic circuit having a second leveling valve configured to adjust independently the height of a second side of the vehicle; and a cross-flow line connecting the first leveling valve with the second leveling valve; wherein the first and second leveling valves are configured to establish pneumatic communication between the first and second pneumatic circuits when the first leveling valve is not independently adjusting the height of the first side of the vehicle and the second leveling valve is not independently adjusting the height of the second side of the vehicle.

2. The air management system of item 1, wherein the first and second leveling valves each include a housing body and a control arm pivotably connected to a shaft extending through the housing body, and the control arm is configured to pivot from a neutral position to one or more response positions.

3. The air management system of items 1 or 2, wherein the first and second leveling valves are configured to establish pneumatic communication between the first and second pneumatic circuits when the control arm of both the first and second level valves are set in the neutral position, and the first and second leveling valves are configured to prevent pneumatic communication between the first and second pneumatic circuits when the control arm of one of the first and second leveling valves is set to the one or more response positions.

4. The air management system of any of items 1-3, wherein the first and second leveling valves each include a control arm sensor configured to detect the position of the control arm.

5. The air management system of any of items 1-4, further comprising a control unit in electrical communication with each control arm sensor, wherein each control arm sensor is configured to transmit the position of the control arm as a control arm position input to the control unit, and the control unit is configured to determine a vehicle height relative to the axle at the first and second sides of the vehicle based on the control arm position input.

6. The air management system of any of items 1-5, wherein the first pneumatic circuit comprises a first set of air springs disposed on a first side of the vehicle, a first supply tank, a first plurality of air lines pneumatically connecting the first set of air springs with the first leveling valve, and a first supply line pneumatically connecting the first leveling valve with the first supply tank; and the second pneumatic circuit comprises a second set of air springs disposed on a second side of the vehicle, a second supply tank, a second plurality of air lines pneumatically connecting the second set of air springs with the second leveling valve, and a second supply line pneumatically connecting the second leveling valve with the second supply tank.

7. The air management system of any of items 1-6, wherein the first plurality of air lines and the second plurality of air lines being of the substantially the same diameter and length, and the first supply line and the second supply line being of substantially the same diameter and length.

8. The air management system of any of items 1-7, wherein the first and second leveling valves are each rotary valves comprising a housing body and a rotary disk configured to rotate within the housing body to alter communication between the between the first and second pneumatic circuits.

9. The air management system of any of items 1-8, wherein the first and second leveling valves each include a manifold housing, a valve element disposed in a bore of the manifold housing, and an electronic actuator, wherein the valve element is configured to move in the bore of the manifold housing to one or more positions including at least a neutral position to establish pneumatic communication between the first and second pneumatic circuits and a supply position to supply air to a respective pneumatic circuit from an air supply tank, and an exhaust position to remove air from the respective pneumatic circuit into the atmosphere, and the electronic actuator is configured to trigger movement of the plunger between the one or more positions.

10. The air management system of any of items 1-9, wherein the valve element is selected from the group consisting of a plunger, a rotary disk, and a poppet.

11. The air management system of any of items 1-10, wherein the electronic actuator is selected from the group consisting of a solenoid, a servomotor, and a stepper motor.

12. The air management system of any of items 1-11, further comprising a control module in electrical communication with the electronic actuator of each leveling valve, wherein the control module is configured to transmit a command to each electronic actuator to trigger movement of the valve element between the neutral, supply, and exhaust positions.

13. The air management system of any of items 1-12, further comprising one or more leveling sensors, wherein each leveling sensor is configured to detect vehicle height relative to the axle along a position of the vehicle and transmit the detected vehicle height to the control module as a vehicle leveling input, and the control module is configured to determine a vehicle height relative to the axle at the first and second sides of the vehicle based on the vehicle leveling input.

14. The air management system of any of items 1-13, wherein the first pneumatic circuit comprises one or more air springs, and the second pneumatic circuit comprises one or more air springs; and wherein the first leveling valve and the second leveling valve are each an electronically-actuated valve disposed in a chamber of a respective air spring.

15. The air management system of any of items 1-14, wherein the first and second leveling valves each include, a cylindrical-shaped manifold, a valve member disposed in the manifold and in sliding engagement with an interior surface of the manifold, and an electronic actuator operatively linked to the valve member; wherein the manifold comprises a plurality of openings disposed along a side surface of the manifold, and the electronic actuator is configured to actuate the valve member to slide along the longitudinal axis of the manifold to control the exposure of the plurality of openings such that a respective leveling valve is configured to selectively: (i) supply air to a respective pneumatic circuit, (ii) remove air from a respective pneumatic circuit, or (iii) establish cross-flow between the first and second pneumatic circuits.

16. A leveling valve comprising: an upper housing mounted on a lower housing to form a valve body, wherein the valve body defines a chamber extending between the upper housing and the lower housing; the lower housing comprising a plurality of ports communicating with the chamber, wherein the plurality of ports include a supply port, an exhaust port, one or more spring ports, and a cross-flow port; a control arm having a first end attached to a shaft extending through an upper surface of the upper housing, wherein the control arm is configured to rotate about the valve body in response to extension or compression of the vehicle suspension; a rotary disk positioned in the chamber of the valve body and connected to the control arm by the shaft, wherein the rotary disk is configured to rotate about the supporting element within the chamber of the valve body; and wherein the rotary disk is configured to establish communication between the one or more spring ports and the cross-flow port while neither establishing communication between the one or more spring ports and the supply port nor the one or more spring ports and the exhaust port.

17. The leveling valve of item 16, wherein the lower housing comprises a dump port, wherein the cross-flow port is disposed on a first side of the lower housing and the dump port is disposed on a second side of the lower housing opposite to the first side.

18. The leveling valve of any of items 16-17, wherein the control arm induces the rotary disk to rotate between a plurality of angular positions to alter communication between the supply port, the exhaust port, the one or more spring ports, and the cross-flow port, wherein the plurality of angular positions include (i) a neutral position, in which the one or more spring ports pneumatically communicate with the cross-flow port, and neither the supply port nor the exhaust port pneumatically communicates with the one or more spring ports, (ii) a supply position, in which the one or more spring ports pneumatically communicate with the supply port, and neither the exhaust port nor the cross-flow port pneumatically communicates with the one or more spring ports, and (iii) an exhaust position, in which the one or more spring ports pneumatically communicate with the exhaust port, and neither the supply port nor the cross-flow port pneumatically communicates with the one or more spring ports.

19. The leveling valve of any of items 16-18, wherein the lower housing comprises a first surface mating with a lower surface of the upper housing, wherein the first surface defines a supply hole directly communicating with the supply port; an exhaust hole directly communicating with the exhaust port; a reservoir cavity directly communicating with the one or more spring ports.

20. The leveling valve of any of items 16-19, wherein the rotary disk comprises a central aperture for receiving the shaft, a plurality of oblong-shaped slots, and a cross-flow slot, wherein the plurality of oblong-shaped slots and cross-flow slot are spaced around the central aperture with dead band defined there between and along the periphery of the rotary disk.

21. The leveling valve of any of items 16-20, wherein each oblong-shaped cavity is configured to at least partially overlie the reservoir cavity of the lower housing and the cross-flow slot over is configured to overlie the cross-flow hole of the lower housing when the rotary disk is set at the neutral position.

22. The leveling valve of any of items 16-20, wherein the oblong-shaped slots are symmetrically spaced from a central axis extending along a face of the rotary disk, and the cross-flow slot overlies the central axis.

23. A method for controlling stability of a vehicle comprising: providing an air management system comprising: a first pneumatic circuit having a first leveling valve configured to adjust independently the height of a first side of the vehicle; a second pneumatic circuit having a second leveling valve configured to adjust independently the height of a second side of the vehicle; and a cross-flow line connecting the first leveling valve with the second leveling valve; establishing, by the first and second leveling valves, pneumatic communication between the first and second pneumatic circuits when the first leveling valve is not independently adjusting the height of the first side of the vehicle and the second leveling valve is not independently adjusting the height of the second side of the vehicle.

24. The method of item 23, wherein the first and second leveling valves each include a housing and a control arm pivotably connected to a shaft extending through the housing, and the control arm is configured to pivot from a neutral position to one or more response positions.

25. The method of item 24, further comprising: establishing, by the first and second leveling valves, pneumatic communication between the first and second pneumatic circuits when the control arm of both the first and second level valves are set in the neutral position, and preventing, by the first and second leveling valves, pneumatic communication between the first and second pneumatic circuits when the control arm of one of the first and second leveling valves is set to the one or more response positions.

26. The method of any of items 23-25, wherein the first pneumatic circuit comprises a first set of air springs disposed on a first side of the vehicle, a first supply tank, a first plurality of air lines pneumatically connecting the first set of air springs with the first leveling valve, and a first supply line pneumatically connecting the first leveling valve with the first supply tank; and the second pneumatic circuit comprises a second set of air springs disposed on a second side of the vehicle, a second supply tank, a second plurality of air lines pneumatically connecting the second set of air springs with the second leveling valve, and a second supply line pneumatically connecting the second leveling valve with the second supply tank.

27. The method of any of items 23-26, wherein the first plurality of air lines and the second plurality of air lines being of the substantially the same diameter and length, and the first supply line and the second supply line being of substantially the same diameter and length.

28. The method of any of items 23-27, wherein the first pneumatic circuit comprises one or more air springs, and the second pneumatic circuit comprises one or more air springs; and wherein the first leveling valve and the second leveling valve are each an electronically-actuated valve disposed in a chamber of a respective air spring.

29. The method of any of items 23-28, wherein the first and second leveling valves each include, a cylindrical-shaped manifold, a valve member disposed in the manifold and in sliding engagement with an interior surface of the manifold, and an electronic actuator operatively linked to the valve member; wherein the manifold comprises a plurality of openings disposed along a side surface of the manifold, and the electronic actuator is configured to actuate the valve member to slide along the longitudinal axis of the manifold to control the exposure of the plurality of openings such that a respective leveling valve is configured to selectively: (i) supply air to a respective pneumatic circuit, (ii) remove air from a respective pneumatic circuit, or (iii) establish cross-flow between the first and second pneumatic circuits.

30. A method for adjusting air pressure of an air management system of a vehicle comprising one or more air supply tanks, a first pneumatic circuit disposed on a first side of the vehicle, and a second pneumatic circuit disposed on a second side of the vehicle, the method comprising: adjusting independently the air pressure of the first pneumatic circuit by a first leveling valve such that the first leveling valve is either supplying air from the one or more air supply tanks to the first pneumatic circuit or removing air from the first pneumatic circuit to the atmosphere, adjusting independently the air pressure of the second pneumatic circuit by a second leveling valve such that the second leveling valve is either supplying air from the one or more air supply tanks to the second pneumatic circuit or removing air from the second pneumatic circuit to the atmosphere, and establishing pneumatic communication between the first pneumatic circuit and the second pneumatic circuit only when both the first leveling valve and the second leveling valve are set in a neutral mode such that each leveling valve is neither supplying air from the one or more air supply tanks or removing air into the atmosphere.

31. The method of item 30, wherein each leveling valve includes a housing body comprising a supply port connected to the air supply tank, an exhaust port for purging air into the atmosphere, one or more ports connected to one or more air springs, and a cross-flow port connected to the other one of the first or second leveling valves.

32. The method of item 31, wherein each leveling valve includes a valve element disposed in a chamber of the housing body and an actuator configured to trigger movement of the valve element, wherein the valve element is configured to move between a plurality of positions to alter communication between the plurality of ports.

33. The method of item 32, wherein the plurality of positions include a neutral position to establish pneumatic communication between the first and second pneumatic circuits, a supply position to supply air from the one or more air supply tanks to a respective pneumatic circuit, and an exhaust position to remove air from the respective pneumatic circuit into the atmosphere.

34. The method of items 32 or 33, wherein the valve element is selected from the group consisting of a plunger, a rotary disk, and a poppet.

35. The method of any of items 32-34, wherein the actuator is a control arm pivotably connected to a shaft extending through the housing body and the valve element is a rotary disk.

36. The method of any of items 32-35, wherein the control arm is configured to pivot from a neutral position to one or more response positions, and each leveling valve is set in the neutral mode when the control arm is set in the neutral position, and each leveling valve is adjusting independently the air pressure of a respective pneumatic circuit when the control arm is set to the one or more response positions.

37. The method of any of items 32-36, wherein the actuator is an electronic actuator selected from the group consisting of a solenoid, a servomotor, and a stepper motor.

38. The method of item 37, further comprising a control module in electrical communication with the electronic actuator of each leveling valve, wherein the control module is configured to transmit a command to each electronic actuator to trigger movement of the valve element between the plurality of positions.

39. The method of item 38, further comprising one or more leveling sensors, wherein each leveling sensor is configured to detect vehicle height relative to the axle along a position of the vehicle and transmit the detected vehicle height to the control module as a vehicle leveling input, and the control module is configured to determine a vehicle height relative to the axle at the first and second sides of the vehicle based on the vehicle leveling input.

40. The method of any of items 30-39, wherein the first pneumatic circuit comprises a first set of air springs disposed on the first side of the vehicle, a first plurality of air lines pneumatically connecting the first set of air springs with the first leveling valve, and a first supply line pneumatically connecting the first leveling valve with at least one of the one or more air supply tanks; and the second pneumatic circuit comprises a second set of air springs disposed on the second side of the vehicle, a second plurality of air lines pneumatically connecting the second set of air springs with the second leveling valve, and a second supply line pneumatically connecting the second leveling valve with at least one of the one or more air supply tanks.

41. The method of any of items 30-40, wherein the first pneumatic circuit comprises one or more air springs, and the second pneumatic circuit comprises one or more air springs; and wherein the first leveling valve and the second leveling valve are each an electronically-actuated valve disposed in a chamber of a respective air spring.

42. A control unit associated with an air spring of an air management system for a vehicle, the control unit comprising: a housing configured to be mounted to a top plate of the air spring, wherein the housing comprises a valve chamber; a valve disposed in the valve chamber, wherein the valve is configured to switch between a plurality of modes including: (i) an active mode wherein the valve is adjusting independently a height of the associated air spring, and (ii) a neutral mode wherein the valve is establishing pneumatic communication between the associated air spring and a cross-flow line connected to a second air spring of the air management system when the valve is not in the active mode; one or more sensors configured to monitor at least one condition of the air spring and generate a measurement signal indicating the at least one condition of the air spring; a communication interface configured to transmit and receive data signals to and from a second control unit associated with the second air spring of the air management system; and a processing module operatively linked to the valve, the one or more sensors, and the communication interface; wherein the processing module is configured to: (i) receive measurement signals from the one or more sensors and data signals from the communication interface, and (ii) actuate the valve to switch between the active mode and the neutral mode based on the received measurement signals from the one or more sensors and the data signals from the communication interface.

43. The control unit of item 42, wherein the housing comprises: an inlet port configured to receive air flow from an air source, an outlet port configured to release air to the atmosphere, a cross-flow port configured to connect to the cross-flow line connected to the second air spring of the suspension system and a delivery port configured to supply or release air to and from a chamber of the air spring, wherein the valve chamber is connected to the inlet port, the outlet port, and the delivery port by a plurality of passages.

44. The control unit of items 42 or 43, wherein the one or more sensors comprises a height sensor configured to monitor the height of the air spring and generate a signal indicating the height of the air spring.

45. The control unit of item 44, wherein the height sensor is an ultrasonic sensor, an infrared sensor, an electromagnetic wave sensor, or a potentiometer.

46. The control unit of any of items 42-45, wherein the processing module is configured to take into account a difference between a spring height of its associated air spring and a second spring height of the second air spring in determining to actuate the valve between the active mode and the neutral mode.

47. The control unit of any of items 42-46, wherein the valve chamber, the valve, and the processing module are mounted below the top plate and disposed in the chamber of the air spring.

48. The control unit of any of items 42-47, wherein the valve chamber, the valve, and the processing module are mounted above the top plate and disposed outside the chamber of the air spring.

49. The control unit of any of items 42-48, wherein the valve comprises a cylindrical-shaped manifold, a valve member disposed in the manifold and in sliding engagement with an interior surface of the manifold, and an electronic actuator operatively linked to the valve member and the processing module; wherein the manifold comprises a plurality of openings disposed along a side surface of the manifold, and the electronic actuator is configured to actuate the valve member to slide along the longitudinal axis of the manifold to control the exposure of the plurality of openings such that the valve switches between the active mode and neutral mode.

50. An air management system for a vehicle, the air management system comprising: a first pneumatic circuit having one or more air springs disposed at a first side of a vehicle; a second pneumatic circuit having one or more air springs disposed on a second side of a vehicle; and one or more cross-flow lines, wherein each cross-flow line extends from an air spring associated with the first pneumatic circuit to an air spring associated with the second pneumatic circuit; wherein each air spring comprises a control unit, and each control unit comprises: a housing configured to be mounted to a top plate of an associated air spring, wherein the housing comprises a valve chamber; a valve disposed in the valve chamber, wherein the valve is configured to switch between a plurality of modes including: (i) an active mode wherein the valve is adjusting independently a height of the associated air spring, and (ii) a neutral mode wherein the valve is establishing pneumatic communication between the associated air spring and a respective cross-flow line when the valve is not in the active mode; one or more sensors configured to monitor at least one condition of the associated air spring and generate a measurement signal indicating the at least one condition of the associated air spring; a communication interface configured to directly transmit and receive data signals to and from other control units associated with other air springs of the suspension system; and a processing module operatively linked to the valve, the one or more sensors, and the communication interface; wherein the processing module is configured to: (i) receive measurement signals from the one or more sensors and data signals from the communication interface, and (ii) actuate the valve to switch between the active mode and the neutral mode based on the received measurement signals from the one or more sensors and the data signals from the communication interface.

51. The air management system of item 50 comprising a system controller in electrical communication with the communication interface of each control unit of the air management system, and wherein the system controller is configured to: (i) receive measurement signals from each control unit of the air management system, (ii) determine a desired volumetric flow rate for removing or supplying air to and from the chamber of each air spring of the air management system based on the received measurement signals, and (iii) transmit commands to each control unit of the air management system such that each control unit actuates its associated valve between the active mode and the neutral mode.

52. The air management system of items 50 or 51, wherein the housing comprises: an inlet port configured to receive air flow from an air source, an outlet port configured to release air to the atmosphere, a cross-flow port configured to connect to the cross-flow line connected to the second air spring of the air management system and a delivery port configured to supply or release air to and from a chamber of the air spring, wherein the valve chamber is connected to the inlet port, the outlet port, and the delivery port by a plurality of passages.

53. The air management system of any of items 50-52, wherein the valve chamber, the valve, and the processing module are mounted below the top plate and disposed in the chamber of the air spring.

54. The air management system of any of items 50-53, wherein the valve chamber, the valve, and the processing module are mounted above the top plate and disposed outside the chamber of the air spring.

55. A method for controlling the stability of a vehicle comprising an air management system, wherein the air management system comprises a first pneumatic circuit having one or more air springs disposed at a first side of a vehicle; a second pneumatic circuit having one or more air springs disposed on a second side of a vehicle; and one or more cross-flow lines, wherein each cross-flow line extends from an air spring associated with the first pneumatic circuit to an air spring associated with the second pneumatic circuit, the method comprising: monitoring, by a height sensor and an air pressure sensor, a height and an air pressure of a respective air spring; generating, by the height sensor and air pressure sensor, a signal indicating the height and air pressure of the respective air spring; receiving, by a processing module, the signal indicating the height and air pressure of the respective air spring; calculating, by the processing module, a height differential rate and pressure differential rate of the respective air spring based on the received signal indicating the height and air pressure of the respective air spring; determining, by the processing module, whether to adjust the height and air pressure of the air spring independently or establish pneumatic communication between the air spring and a respective cross-flow line; and actuating, by the processing module, a valve to switch to one of the modes: (i) an active mode wherein the valve is adjusting independently a height of the associated air spring, and (ii) a neutral mode wherein the valve is establishing pneumatic communication between the associated air spring and a respective cross-flow line when the valve is not in the active mode; wherein the height sensor, processing module, and the valve are disposed in a chamber of the air spring.

56. A method for reducing vehicle nose-diving when braking, avoiding rollover of a vehicle, trailer or towable due to wind shear or rapidly changing road conditions, increasing tire life of a tire on a vehicle, reducing brake wear of a vehicle, and/or increasing traction of a vehicle, comprising providing a vehicle equipped with an air management system according to any of items 1-55; driving the vehicle under changing road conditions; managing air in a plurality of pneumatic circuits in the vehicle according to any of items 1-55 such that the vehicle experiences at least one of reduced vehicle nose-diving when braking, avoids rollover of the vehicle or a trailer or towable attached thereto, increased tire life of a tire on the vehicle, reduced brake wear of the vehicle, and increased traction of the vehicle.

57. A kit comprising two or more symmetrically dynamic equalized volume and pressure distributing pneumatic valve, at least one air spring configured to be connected to each symmetrically dynamic equalized volume and pressure distributing pneumatic valve, a plurality of air hoses configured to be connect the air management components as described and illustrated in any of items 1-56, and optionally an air tank, a compressor, pressure protection valve, and/or dump valve.

58. An air management system for a vehicle, the air management system comprising: a first pneumatic circuit having a first leveling valve configured to adjust independently the height of a first side of the vehicle; a second pneumatic circuit having a second leveling valve configured to adjust independently the height of a second side of the vehicle; and a cross-flow line connecting the first leveling valve with the second leveling valve; wherein the first and second leveling valves are configured to establish pneumatic communication between the first and second pneumatic circuits when the first leveling valve is not independently adjusting the height of the first side of the vehicle and the second leveling valve is not independently adjusting the height of the second side of the vehicle; wherein the air management system is configured to perform the method of item 30.

59. The air management system of item 58 further comprising the subject matter of any one of items 2-14.

60. An air management system for a vehicle, the air management system comprising: a first pneumatic circuit having one or more air springs disposed at a first side of a vehicle; a second pneumatic circuit having one or more air springs disposed on a second side of a vehicle; and one or more cross-flow lines, wherein each cross-flow line extends from an air spring associated with the first pneumatic circuit to an air spring associated with the second pneumatic circuit; wherein each air spring comprises a control unit, and each control unit comprises: a housing configured to be mounted to a top plate of an associated air spring, wherein the housing comprises a valve chamber; a valve disposed in the valve chamber, wherein the valve is configured to switch between a plurality of modes including: (i) an active mode wherein the valve is adjusting independently a height of the associated air spring, and (ii) a neutral mode wherein the valve is establishing pneumatic communication between the associated air spring and a respective cross-flow line when the valve is not in the active mode; one or more sensors configured to monitor at least one condition of the associated air spring and generate a measurement signal indicating the at least one condition of the associated air spring; a communication interface configured to directly transmit and receive data signals to and from other control units associated with other air springs of the suspension system; and a processing module operatively linked to the valve, the one or more sensors, and the communication interface; wherein the processing module is configured to: (i) receive measurement signals from the one or more sensors and data signals from the communication interface, and (ii) actuate the valve to switch between the active mode and the neutral mode based on the received measurement signals from the one or more sensors and the data signals from the communication interface; wherein the air management system is configured to perform the method of item 55.

61. The air management system of item 60 further comprising the subject matter of any one of items 52-54.

The present disclosure includes the ornamental design for a leveling valve, its lower housing, its top housing, one or more rotary disks, a shaft, and any other embodiment of the present disclosure, as shown and described.

While the subject matter of this disclosure has been described and shown in considerable detail with reference to certain illustrative embodiments, including various combinations and sub-combinations of features, those skilled in the art will readily appreciate other embodiments and variations and modifications thereof as encompassed within the scope of the present disclosure. Moreover, the descriptions of such embodiments, combinations, and sub-combinations is not intended to convey that the claimed subject matter requires features or combinations of features other than those expressly recited in the claims. Accordingly, the scope of this disclosure is intended to include all modifications and variations encompassed within the spirit and scope of the following appended claims.

The invention claimed is:

1. An air management system for a vehicle, the air management system comprising:
 a first pneumatic circuit having a first leveling valve configured to independently adjust air pressure or height of a first side of the vehicle;
 a second pneumatic circuit having a second leveling valve configured to independently adjust air pressure or height of a second side of the vehicle; and
 a cross-flow line connecting the first pneumatic circuit with the second pneumatic circuit;
 wherein each of the first leveling valve and the second leveling valve comprises:
 an upper housing mounted on a lower housing to form a valve body, wherein the valve body defines a chamber extending between the upper housing and the lower housing;
 the lower housing comprising a plurality of ports communicating with the chamber, wherein the plurality of ports include a supply port, an exhaust port, one or more spring ports, and a cross-flow port;
 a control arm having a first end attached to a shaft extending through an upper surface of the upper housing, wherein the control arm is configured to rotate about the valve body in response to extension or compression of a vehicle suspension;
 a rotary disk positioned in the chamber of the valve body and connected to the control arm by the shaft extending through the upper housing, wherein the rotary disk is configured to rotate about the shaft within the chamber of the valve body; and
 wherein the rotary disk is configured to establish communication between the one or more spring ports and the cross-flow port in a cross-flow mode while neither establishing communication between the one or more spring ports and the supply port nor the one or more spring ports and the exhaust port.

2. The air management system of claim 1, wherein the lower housing of each of the first leveling valve and the second leveling valve comprises a dump port, wherein the cross-flow port of each of the first leveling valve and the second leveling valve is disposed on a first side of the lower housing of each of the first leveling valve and the second leveling valve and the dump port of each of the first leveling valve and the second leveling valve is disposed on a second side of the lower housing opposite to the first side.

3. The air management system of claim 1, wherein, for each of the first leveling valve and the second leveling valve: the control arm induces the rotary disk to rotate between a plurality of angular positions to alter communication between the supply port, the exhaust port, the one or more spring ports, and the cross-flow port, wherein the plurality of angular positions include (i) a neutral position, in which the one or more spring ports pneumatically communicate with the cross-flow port, and neither the supply port nor the exhaust port pneumatically communicates with the one or more spring ports, (ii) a supply position, in which the one or more spring ports pneumatically communicate with the supply port, and neither the exhaust port nor the cross-flow port pneumatically communicates with the one or more spring ports, and (iii) an exhaust position, in which the one or more spring ports pneumatically communicate with the exhaust port, and neither the supply port nor the cross-flow port pneumatically communicates with the one or more spring ports.

4. The air management system of claim 3, wherein, for each of the first leveling valve and the second leveling valve: the lower housing comprises a first surface mating with a lower surface of the upper housing, wherein the first surface defines a supply hole directly communicating with the supply port; an exhaust hole directly communicating with the exhaust port; a reservoir cavity directly communicating with the one or more spring ports.

5. The air management system of claim 4, wherein, for each of the first leveling valve and the second leveling valve: the rotary disk comprises a central aperture for receiving the shaft, a plurality of oblong-shaped slots, and a cross-flow slot, wherein the plurality of oblong-shaped slots and the cross-flow slot are spaced around the central aperture with dead band defined there between and along the periphery of the rotary disk.

6. The air management system of claim 5, wherein, for each of the first leveling valve and the second leveling valve: the cross-flow slot is configured to overlie the cross-flow hole of the lower housing when the rotary disk is set at the neutral position.

7. The air management system of claim 5, wherein, for each of the first leveling valve and the second leveling valve: the oblong-shaped slots are symmetrically spaced from a central axis extending along a face of the rotary disk, and the cross-flow slot overlies the central axis.

8. The air management system of claim 1, wherein the air management system is configured to establish pneumatic communication between the first and second pneumatic circuits through the cross-flow line when the air management system is simultaneously switched to a cross-flow mode to establish pneumatic communication through a first cross-flow port in fluid communication with the first pneumatic circuit and a second cross-flow port in fluid communication with the second pneumatic circuit, and wherein the air management system is configured to not independently adjust the air pressure or height of the first side of the vehicle and the air pressure or height of the second side of the vehicle in the cross-flow mode.

9. The air management system of claim 1, wherein the first and second leveling valves are configured to establish pneumatic communication between the first and second pneumatic circuits when the control arm of both the first and second level valves are set in the neutral position, and the first and second leveling valves are configured to prevent pneumatic communication between the first and second pneumatic circuits when the control arm of one of the first and second leveling valves is set to the one or more response positions.

10. The air management system of claim 1, wherein the first and second leveling valves each include a control arm sensor configured to detect a position of the control arm of the first and second leveling valves, respectively.

11. The air management system of claim 10, further comprising a control unit in electrical communication with each control arm sensor, wherein each control arm sensor is configured to transmit the position of the control arm of the first and second leveling valves, respectively, as a control arm position input to the control unit, and the control unit is configured to determine a vehicle height relative to the axle at the first and second sides of the vehicle based on the control arm position input.

12. The air management system of claim 1, wherein the first pneumatic circuit comprises a first set of air springs disposed on the first side of the vehicle, a first supply tank, a first plurality of air lines pneumatically connecting the first set of air springs with the first leveling valve, and a first supply line pneumatically connecting the first leveling valve with the first supply tank; and
the second pneumatic circuit comprises a second set of air springs disposed on the second side of the vehicle, a second supply tank, a second plurality of air lines pneumatically connecting the second set of air springs with the second leveling valve, and a second supply line pneumatically connecting the second leveling valve with the second supply tank.

13. The air management system of claim 12, wherein the first plurality of air lines and the second plurality of air lines have substantially the same diameter and length, and the first supply line and the second supply line have substantially the same diameter and length.

14. The air management system of claim 1, wherein the first and second leveling valves are each rotary valves comprising a housing body and the rotary disk in each of the first and second leveling valves is configured to rotate within the housing body to alter communication between the first and second pneumatic circuits.

15. The air management system of claim 1, wherein the first pneumatic circuit comprises one or more air springs, and the second pneumatic circuit comprises one or more air springs; and
wherein the first leveling valve and the second leveling valve are each an electronically-actuated valve disposed in a chamber of a respective air spring.

16. The air management system of claim 1, wherein the first and second leveling valves each include, a cylindrical-shaped manifold, a valve member disposed in the manifold and in sliding engagement with an interior surface of the manifold, and an electronic actuator operatively linked to the valve member;
wherein the manifold comprises a plurality of openings disposed along a side surface of the manifold, and the electronic actuator is configured to actuate the valve member to slide along the longitudinal axis of the manifold to control the exposure of the plurality of openings such that a respective leveling valve is configured to selectively: (i) supply air to a respective pneumatic circuit, (ii) remove air from a respective pneumatic circuit, or (iii) establish cross-flow between the first and second pneumatic circuits.

17. The air management system of claim 1, further comprising one or more air pressure sensors or one or more air flow sensors in fluid communication with each of the first pneumatic circuit and the second pneumatic circuit, wherein said one or more air pressure sensors or one or more air flow sensors are configured to output information regarding air pressure or air flow within one or both of the first pneumatic circuit and the second pneumatic circuit to an electronic system of the vehicle, wherein operation of the air management system is synced with braking operation and/or steering control of the vehicle.

18. The air management system of claim 1, wherein the air management system further comprises or is in fluid communication with an air pressure sensor, an air flow sensor, a ride height sensor, a stability control sensor, or a combination thereof.

19. The air management system of claim 1, wherein the air management system further comprises or is in fluid communication with one or more sensors configured to detect and communicate information regarding air pressure or air flow within the air management system to an electronic system of the vehicle.

20. The air management system of claim 1 in communication with an electronic stability control (ESC) system, further comprising a controller linking the air management system with the ESC,
wherein operation of the air management system is synced with braking operation and/or steering control of the vehicle, and
wherein the ESC system includes one or more of electronic stability program (ESP), dynamic stability control (DSC), vehicle stability control (VSC), automatic traction control (ATC), and roll stability control (RSC) systems.

* * * * *